United States Patent
Schemmann et al.

(10) Patent No.: US 7,194,211 B2
(45) Date of Patent: Mar. 20, 2007

(54) METHOD AND SYSTEM FOR 80 AND 160 GIGABIT-PER-SECOND QRZ TRANSMISSION IN 100 GHZ OPTICAL BANDWIDTH WITH ENHANCED RECEIVER PERFORMANCE

(75) Inventors: Marcel F. C. Schemmann, Maria-Hoop (NL); Zoran Maricevic, Manlius, NY (US); Bogdan Hoanca, Anchorage, AK (US)

(73) Assignee: Teradvance Communications LLC, Fayetteville, NY (US)

( * ) Notice: Subject to any disclaimer, the term of this patent is extended or adjusted under 35 U.S.C. 154(b) by 0 days.

(21) Appl. No.: 11/449,445

(22) Filed: Jun. 7, 2006

(65) Prior Publication Data

US 2006/0228118 A1 Oct. 12, 2006

Related U.S. Application Data

(60) Division of application No. 09/998,578, filed on Nov. 16, 2001, now Pat. No. 7,082,268, which is a continuation-in-part of application No. 09/871,216, filed on May 31, 2001.

(51) Int. Cl.
*H04B 10/04* (2006.01)

(52) U.S. Cl. ................... 398/183; 398/182; 398/184; 398/185; 398/186; 398/187; 398/188; 398/189; 398/190; 398/191; 398/192; 398/200; 398/201; 375/295; 375/298

(58) Field of Classification Search ............... 398/183, 398/184, 186, 188, 189, 190, 191, 192, 198, 398/140, 147, 154, 158, 182, 185, 187, 200, 398/201; 325/298, 295
See application file for complete search history.

(56) References Cited

U.S. PATENT DOCUMENTS

| | | | |
|---|---|---|---|
| 5,311,346 A | 5/1994 | Haas et al. | |
| 5,659,412 A | 8/1997 | Hakki | |
| 5,917,638 A | * | 6/1999 | Franck et al. ............... 398/201 |

(Continued)

*Primary Examiner*—Hanh Phan
(74) *Attorney, Agent, or Firm*—Kenyon & Kenyon LLP

(57) ABSTRACT

Optical transmitter/receivers for use in a DWDM systems are provided. Transmission of data signals in a quadrature-return-to-zero (QRZ) format achieves a data transmission rate equal to eight times a base data rate, i.e., 80 Gbps over a 100 GHz channel if the base data rate is 10 Gbps, with high non-linear performance by setting the polarization state of the data bands such that non-linear effects induced by PMD are reduced. Additionally, a transmitter achieves a transmission data rate equal to 16 times the base data rate by sharpening the QRZ pulses and interleaving pulse-sharpened QRZ data signals in the time domain, further doubling the data rate. Using counterpropagation in the transmitter, carrier signals and data signals traverse the same length of fiber, reducing fringing effects in the transmitter. Related techniques enhance reception and detection of data at high data rates. A local pulse-sharpened carrier is mixed with a QRZ data signal at a detector reducing amplification noise by a factor of two. A bi-directional Erbium-doped fiber amplifier is used to amplify a carrier signal while limiting fringing effects by sending carrier and data signals along equal optical path lengths. Non-linear effects are reduced by transmitting carrier signals in an othogonal polarization state with respect to data signals, and PMD phase noise effects are compensated for in both single channel and DWDM multi-channel systems by using delay management.

2 Claims, 35 Drawing Sheets

U.S. PATENT DOCUMENTS

| | | |
|---|---|---|
| 6,104,515 A | 8/2000 | Cao |
| 6,559,996 B1 * | 5/2003 | Miyamoto et al. .......... 398/183 |
| 6,646,774 B1 | 11/2003 | Willner et al. |
| 6,658,215 B1 | 12/2003 | Strasser et al. |
| 6,671,464 B1 | 12/2003 | Kikuchi |
| 6,674,972 B1 | 1/2004 | Mecozzi et al. |

* cited by examiner

METHOD AND SYSTEM FOR 80 AND 160 GIGABIT-PER-SECOND QRZ TRANSMISSION IN 100 GHZ OPTICAL BANDWIDTH WITH ENHANCED RECEIVER PERFORMANCE

CROSS-REFERENCES TO RELATED APPLICATIONS

This application is a divisional of prior application Ser. No. 09/998,578, filed Nov. 16, 2001 now U.S. Pat. No. 7,082,268, which is a continuation-in-part of prior application Ser. No. 09/871,216, filed May 31, 2001, the entire disclosures of which are hereby incorporated by reference.

FIELD OF THE INVENTION

The present invention relates to optical data communication, and in particular, relates to an optical data communication system and optical communication method that achieves high spectral efficiency in part by exploiting properties of a quadrature return-to-zero (QRZ) modulation format, and also achieves minimal spectral overlap such that tolerance to polarization mode dispersion is maximized.

BACKGROUND INFORMATION

Currently, optical data communication systems are being upgraded from a 10 Gb/s data transmission rate up to a 40 Gb/s transmission rate. However, data transmission at 40 Gb/s (or higher) presents extensive design challenges because optical fiber dispersion, including both polarization mode dispersion (PMD) and chromatic dispersion, and fiber non-linear effects, such as cross-phase modulation, become more dominant at the higher transmission rates. For example, the limit of tolerable polarization mode dispersion, usually defined as 14% of the data bit duration, is only 3.5 ps at a 40 Gb/s transmission rate. A 3.5 ps polarization mode dispersion translates to an attainable reach of several hundred kilometers over single mode fiber which has a typical fiber PMD of 0.1 ps/km$^{1/2}$.

Commonly owned and assigned patent application Ser. No. 09/782,354 describes how side carriers transmitted with orthogonally polarized data bands occupying the same optical frequency band can be used to effectively separate the data streams in the orthogonally polarized data bands, providing for an increase in the amount of data that can be received within the frequency band, or, phrased alternatively, an increase in spectral efficiency. Furthermore, commonly owned and assigned patent application Ser. No. 09/871,216 describes a quadrature-return-to-zero modulation technique in which the power of a transmitted quadrature-modulated data signal drops to zero between data symbols, rendering the power of the data signal independent of data content. The techniques described in these applications, which are expressly incorporated by reference herein, provide intrinsic benefits in terms of spectral efficiency and nonlinear performance. These benefits can be harnessed and extended through techniques and systems that increase the data rate and spectral efficiency of an optical data communication system beyond 40 Gbps (gigabits per second) over a 100 GHz channel, and that also provide robust performance by further minimizing the dominant dispersion and nonlinear effects. Additionally, the techniques can also be extended to enhance the signal-to-noise and nonlinear performance of data transmission at any desired data rate.

SUMMARY OF THE INVENTION

The present invention provides methods and systems for improving high data rate optical transmission and reception.

On the transmission side, methods are provided for high data rate transmission with high tolerance to PMD and nonlinear effects. A method for transmitting eight (8) times a base data rate within a spectral range of 10 times the data rate is provided. According to this method, first and second pairs of data streams are modulated onto respective first and second non-overlapping data bands in QRZ format. Third and fourth pairs of data streams are then modulated onto respective third and fourth non-overlapping data bands in QRZ format, with each of the four data bands having the same base data rate. The second and third adjacent data bands are forced into orthogonal polarization states to reduce nonlinear effects.

An additional method is provided for further increasing the transmitted data rate to sixteen (16) times a base data rate within a spectral range of 10 times the base data rate. A first set of four pairs of data streams is modulated in a pulse-sharpened QRZ format into a first signal, the first signal having a first set of four data bands in the frequency domain. A second set of four pairs of data streams is modulated in a pulse-sharpened QRZ format into a second signal, the second signal having a second set of four data bands in the frequency domain. The second signal is delayed by one pulse slot with respect to the first signal in the time domain and interleaved with the first signal in the time domain.

The present invention also provides an additional method for generated a data signal in QRZ format. A first data signal and an inverted data signal are clocked using gates. Non-inverted and inverted versions of both the clocked data signal and the clocked inverted data signal are output and combined. The combined signal is input to a modulator operated in push pull mode. A second data signal is input to a second modulator, the second data signal having first and second portions, the second portion shifted 90 degrees in phase with respect to the first portion.

The present invention also provides methods for reducing nonlinear effects by transmitting an optical data signal over optical fiber in which carrier signals are set into an orthogonal polarization state with respect to data bands included in the data signal.

On the reception side, the present invention provides several method for reducing and/or canceling phase noise, amplified spontaneous emission noise, interferometric fringing, and PMD effects to enhance the quality of high-data rate optical communication.

In one aspect, the present invention provides a method of reducing effects of amplified spontaneous emission in reception of a QRZ data signal. A local carrier signal is generated at a receiver and pulsed so that its power transitions to zero during data symbols transition of the transmitted QRZ data signal.

According to an another aspect, the present invention provides a method of amplifying a first signal with respect to a second signal in a fiber amplifier without generating interferometric fringing between the first and second signals. The method includes counterpropagating the first signal and the second signal through the fiber amplifier to match their respective optical path lengths. To cancel the effects of amplifying the second signal, the second signal is attenuated before and after amplification in the fiber amplifier by a controlled amount.

In another aspect, the present invention provides a method of doubling a data rate of a received multi-channel data signal to a detector. Upper and lower side carrier signals are generated from carrier signals within the multi-channel data signal, the upper and lower side carrier signals centered in data bands of the data signal. The side carrier signals are pulsed at the data rate with a pulse having a reduced width and the upper and lower side carrier signals are demultiplexed. At least one of the upper and lower side carrier signals are then delayed with respect to the other side carrier signals. The undelayed and delayed carrier signals are multiplexed into a single carrier signal stream for mixing with the data signal.

A method of canceling phase noise in a received QRZ signal is also provided. A received signal is first split into a first signal traveling on a first optical path and second signal traveling on a second optical path. The second signal is delayed on the second optical path and combined with the first signal before the first and second signals are mixed at a detector.

An alternative method for compensating for phase noise, chromatic dispersion and high order PMD effects electronically is also provided according to the present invention. A set of I and Q data streams is received an input to a first stage. In the first stage, frequency-independent phase noise is compensated for and then output to a second stage. In the second stage, frequency dependent chromatic disperion and high order PMD effects are compensated for.

The present invention also provides a simplified method of generating a plurality of equally spaced wavelengths. Amplified spontaneous emission is generated and then filtered using at least one high-Q filter. The filtered amplified spontaneous emission is reamplified. The filtering and reamplification are repeated for a threshold number of sequential rounds to generated highly amplified, highly filtered output.

In accordance with the present invention, further benefits are provided by a reflective modulator. The reflective modulator comprises at least one optical path, the at least one optical path including at least one reflection, and at least one transmission line, each transmission line carrying electrical modulation signals along one of the at least one optical path. The at least one transmission line includes a turned section for reuse of the electrical modulation signals.

DETAILED DESCRIPTION

80/160 Gigabit Per Second Transmission

In accordance with the present invention, a transmitter that generates data signals in a QRZ (pulsed) format achieves a total data transmission rate equal to eight times a base data rate, i,e, 80 Gigabits per second (Gbps) over a 100 GHz channel if the base data rate is 10 Gbps, with high non-linear performance by setting the polarization state of the data bands such that cross-talk induced by PMD and cross-phase modulation are reduced. Additionally, according to the invention, a transmitter achieves a total transmission data rate equal to 16 times the base data rate, i.e., 160 Gbps over a 100 Ghz channel, by sharpening the QRZ pulses and then interleaving two pulse-sharpened QRZ data signals in the time domain, thus further doubling the data rate. Furthermore, using counterpropagation in the transmitter, carrier signals and data signals traverse the same length of fiber and thereby experience the same total fiber-induced phase delay, reducing fringing effects in the transmitter.

Figure 1:
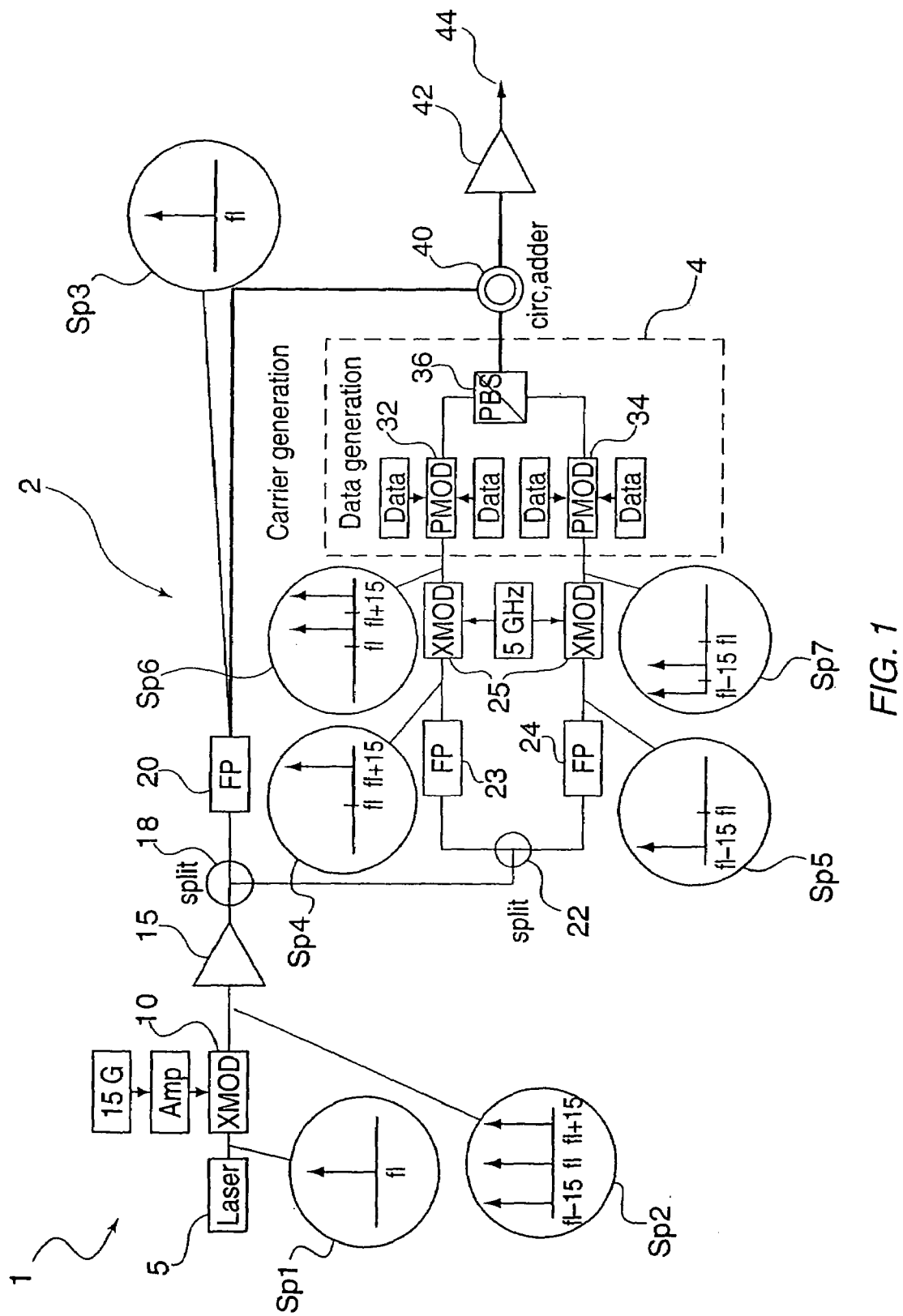
FIG. 1 is a block diagram of an embodiment of a QRZ transmitter module according to the present invention.

FIG. 1 illustrates an embodiment of a QRZ transmitter module 1 according to the present invention. The transmitter module 1 includes a data generation section 4 shown within dashed line, and a carrier generation portion 2 comprising the parts of the transmitter module lying outside of the dashed line. Although the carrier generation section 2 and the data generation section 4 are depicted as co-located sections, the two sections 2, 4 may equally be separated within a general vicinity and coupled via optical fibers. As shown in FIG. 1, a coherent optical carrier source 5, which may be implemented, for example, as a laser, generates an optical carrier signal at a single frequency f1. The spectrum at the output of the carrier source 5 is shown at spectrum Sp1. The source carrier signal is input to an external modulator 10 which modulates the carrier at f1 with a 15 GHz sinusoid signal, which creates two side carriers off of the carrier signal. The output from the external modulator 10 is shown in Sp2. As can be discerned, the output spectrum at Sp2 includes the source carrier signal at f1 accompanied by side carriers located at f1−15 GHz and f1+15 GHz. The central frequency and side frequencies are amplified in optical amplifier 15, which may be implemented, for example, as an Erbium Doped Fiber Amplifier (EDFA), or alternatively as a Semiconductor Optical Amplifier (SOA), and then split at optical splitter 18, which outputs a first portion of the optical signal to a Fabry-Perot (FP) filter 20, and a second portion to a further splitter 22.

The FP filter 20 passes as an output the original source frequency f1 shown at output spectrum Sp3. The portion of the optical signal passed to splitter 22 is delivered to respective upper and lower FP filters 23, 24 which each pass one of the side bands (e.g., the upper filter 23 passes f+15 GHz shown in spectrum Sp4 and the lower filter 24 passes f−15 GHz shown at Sp5). Each filter 23, 24 outputs one of the side bands to an input of external modulator 25 which further modulates a 5 GHz sinusoid onto each of side bands with a near 100% modulation index, resulting in respective upper and lower outputs shown in Sp6 and Sp7. The upper output of Sp6 includes side bands located at f1+15−5 GHz=f1+10 GHz and f1+15+5 GHz=f1+20 GHz. Similarly, the lower output of Sp7 includes side bands at f1−10 GHz and f1−20 GHz. The upper output is supplied to a phase modulator 32 within the data generation section 4, and the lower output is supplied to a separate phase modulator 34 of the data generation section.

As described in prior application Ser. No. 09/871,216, data modulators 32, 34 imprint distinct I and Q data streams in quadrature onto the pairs of side carriers. According to one implementation, each of the I and Q data streams carry 10 Gbps of data, 10 Gbps being the base data rate in this implementation. Each pair of I,Q data streams is imprinted into a data band centered at f1−15 GHz and f1+15 GHz respectively, spread over 30 GHz, i.e., in QRZ format. These data bands are shown by the trapezoidal spectra in FIG. 2. The output from the phase data modulators 32, 34 is combined using a combiner or a polarization beam splitter (PBS) 36 (shown). The combined data signal contains-two pairs of I,Q streams at 10 Gbps each, so that the total data rate carried by the combined signal=2×2×10 Gps=40 Gbps. Afterwards, the combined data signal is combined with the source carrier signal at f1 passed by FP filter 20 in either a combiner or a circulator 40 (shown). Using a circulator 40, the combined data signal is first routed backwards to the FP filter 20 where all frequencies except for f1, i.e., the entire spectrum of the data signal, are reflected and consequently travel forward with the source carrier frequency f1 back to the circulator. At the circulator 40, the combined source carrier signal and data signal are routed to the output 44 through optical amplifier 42. An advantage of using the circulator 40, is that if the data signal contains any component of its power at the source frequency f1, this component is passed through the FP filter 20 rather than reflected. Hence, this power component is not passed to the module output 44 and does not interfere with the source carrier signal at f1.

Figure 2:
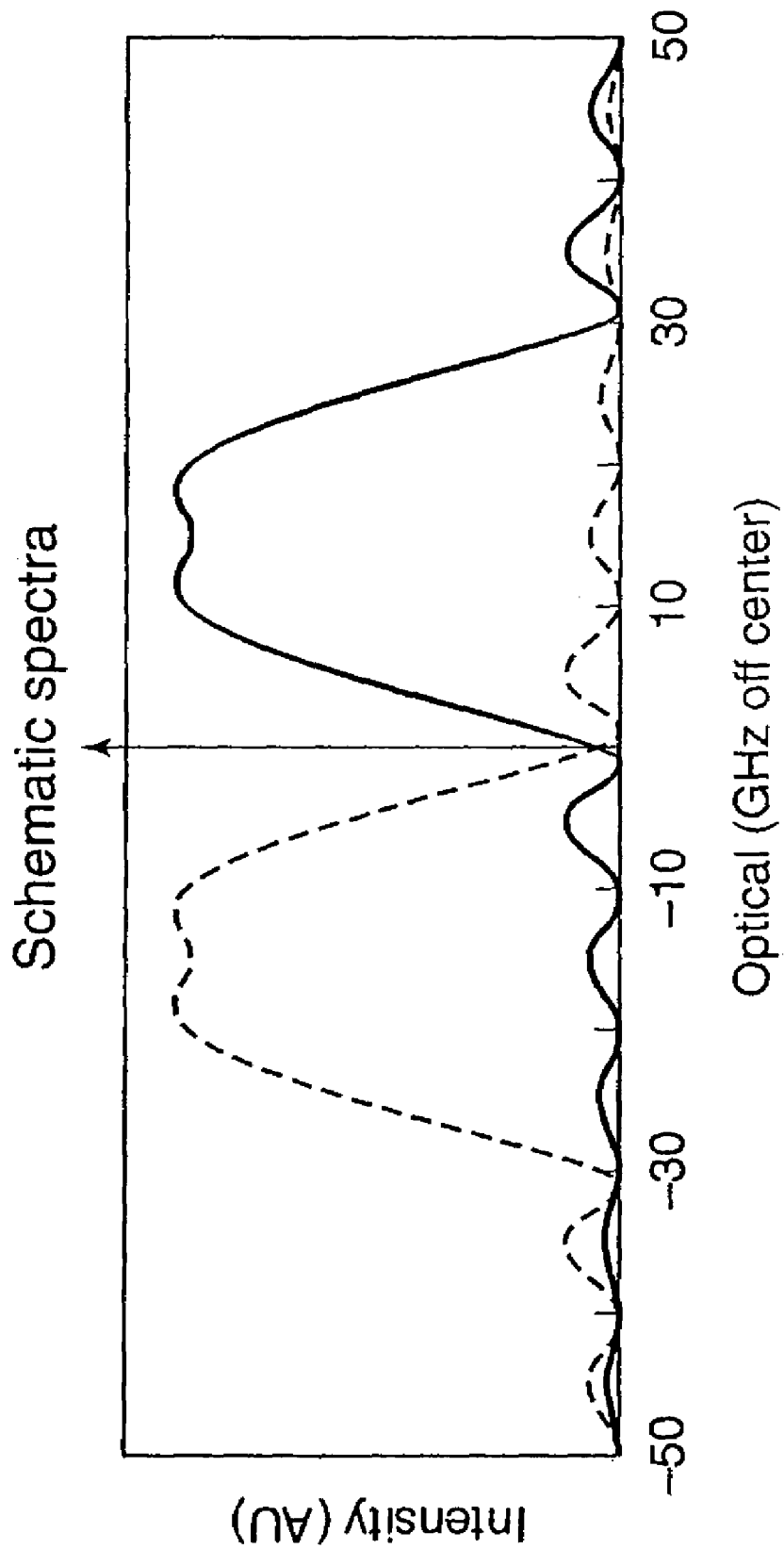
FIG. 2 is an illustration of the frequency spectrum at the output of the transmitter module of FIG. 1.

FIG. 2 shows the spectrum at the output 44, which includes a first data band spread from f−30 GHz to f1, having the majority of its power concentrated within the f1−20 to f1−10 GHz band, the source carrier at f1, and a second data band spread from f1 to f1+30 GHz, having the majority of its power concentrated within the f1+10 to f1+20 GHz band. Additionally, the first and second data bands are orthogonally polarized by the polarization beam splitter 36 in FIG. 1 which sets the two data signals input to it into orthogonal polarization states at its output. Accordingly, FIG. 2 shows the data bands as orthogonally polarized with a dashed line indicating a first polarization state, and a solid line indicating a second polarization state orthogonal to the first polarization state. Having the adjacent bands orthogonal helps keep crosstalk and cross-phase modulation low when the polarization states are perturbed by PMD during transmission over optical fiber.

Figure 3:
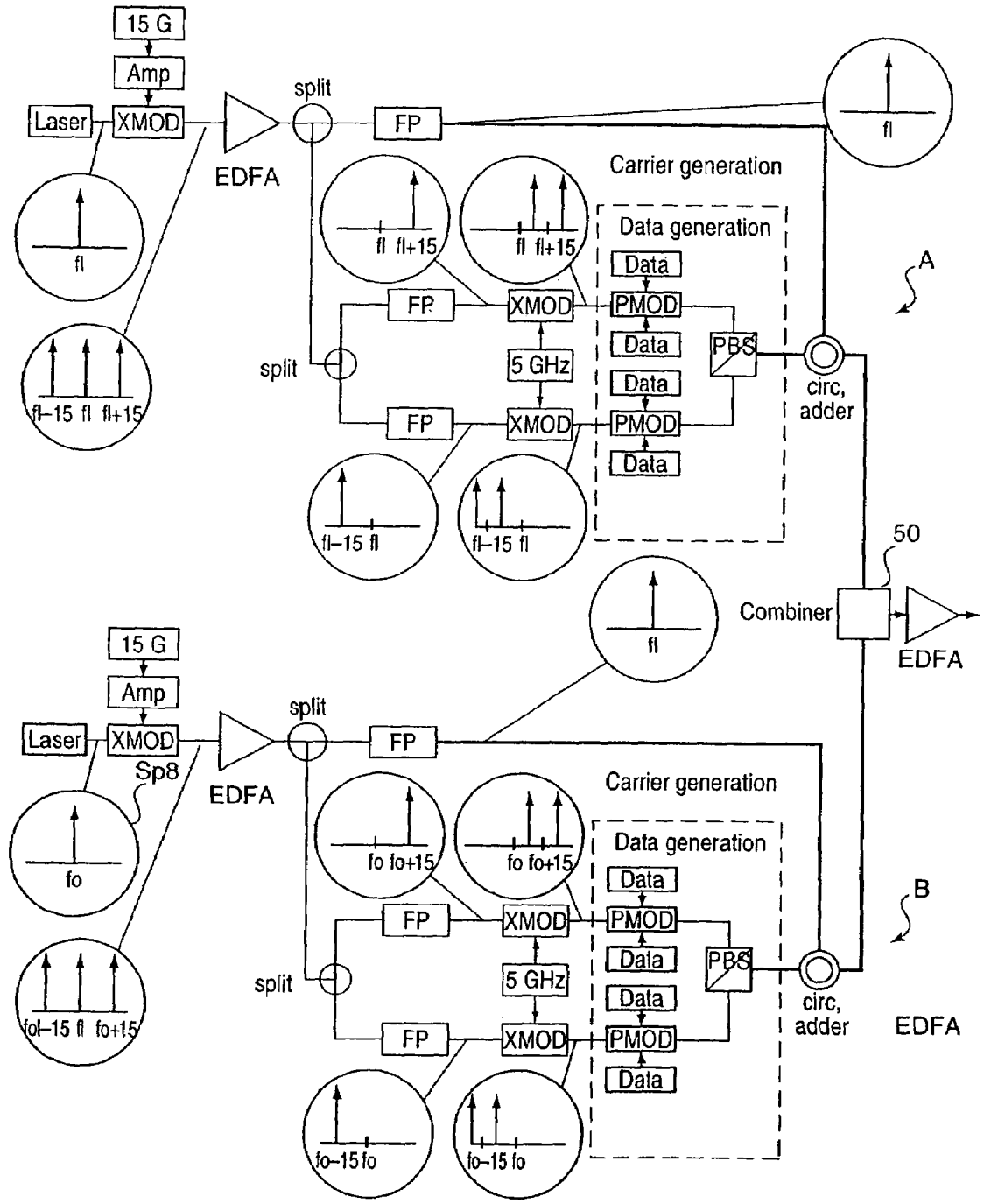
FIG. 3 shows an embodiment of a transmitter according to the present invention that includes two QRZ transmitter modules of the type shown in FIG. 1.
Figure 4:
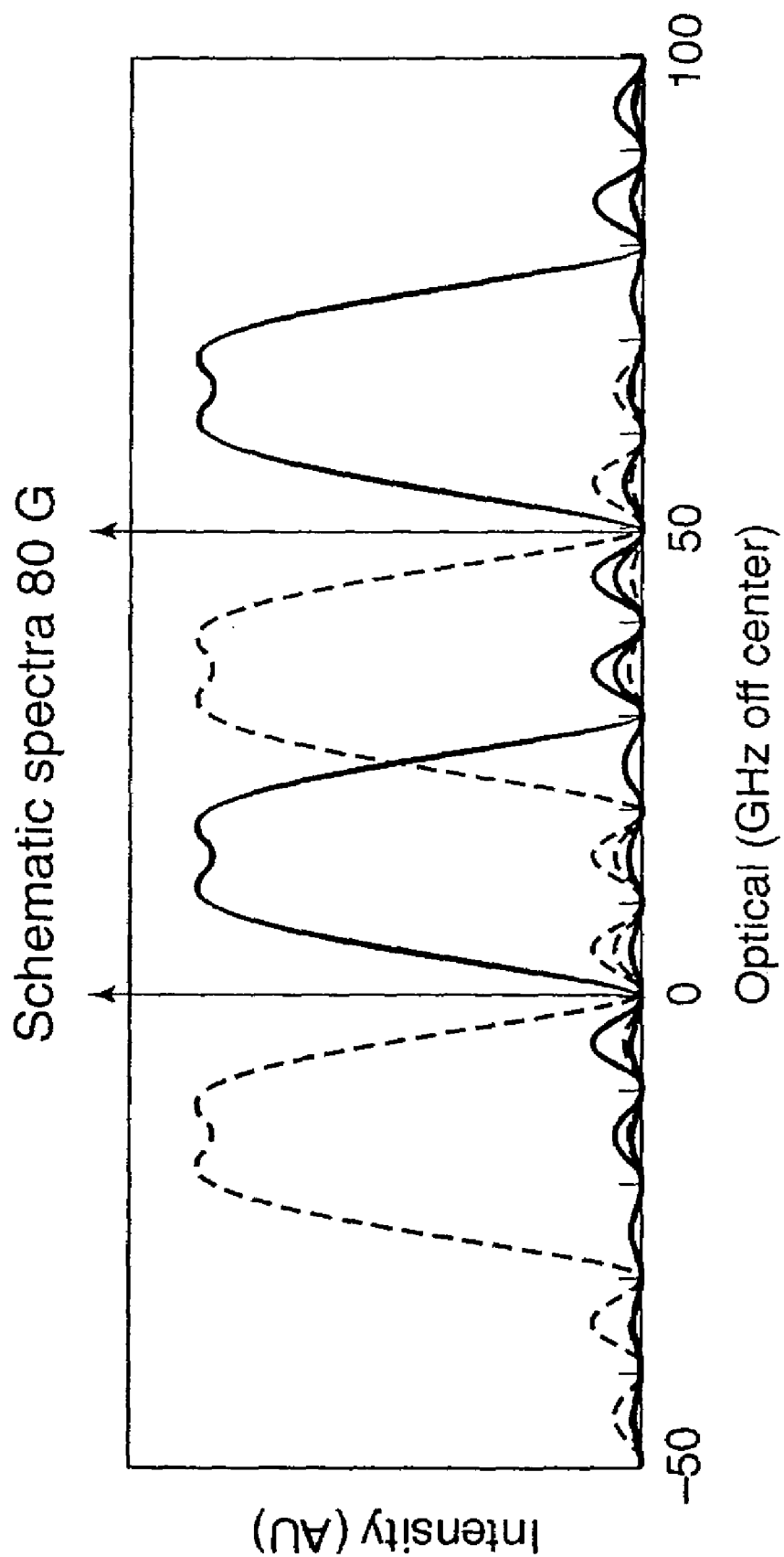
FIG. 4 is an illustration of the frequency spectrum over a 100 GHz channel at the output of the transmitter shown in FIG. 3.

FIG. 3 shows an embodiment of a transmitter according to the present invention that includes two QRZ transmitter modules A, B of the type described above with reference to FIG. 1. Transmitter module A is precisely equivalent to the module shown in FIG. 1, while transmitter module B has a source carrier frequency at frequency f0, separate from f1, shown at spectrum Sp8. Each transmitter module, according to the illustrated embodiment, produces a 40 Gbps QRZ data stream over a 100 GHz channel. The outputs of transmitter modules A and B combined at combiner 50 can be arranged in the frequency domain so that 80 Gbps are transmitted over a 100 GHz channel with minimal crosstalk, doubling the spectral efficiency of transmission without a performance penalty. FIG. 4 shows a spectrum illustrating the combined output of modules A and B according to an embodiment of the present invention.

In FIG. 4, the data bands 101 and 102 represent the two data bands generated by transmitter B. The source carrier signal at f0 is centered between data bands 101 and 102. According to one embodiment, the polarization states of these two bands 101, 102 are set orthogonal to each other (the dashed and solid lines represent orthogonal polarization states). Data bands 103 and 104 represent the data bands generated by transmitter A centered at f1. Similarly, according to one embodiment the polarization states of data bands 103, 104 are set orthogonal to each other. According to another embodiment, data bands 101, 102 are set to a first polarization state, and data bands 103, 104 are also set to a second polarization state. In this alternate embodiment, the first and second polarization states are mutually orthogonal. This alternate embodiment can be implemented by removing the polarization beam splitters in the transmitter modules and using a polarization transformer in one of the modules to set the output of one, for example transmitter B, orthogonal to the output of the other, transmitter A.

If f1 and f0 are selected to be separated by approximately 50 GHz (or more generally at a cycle rate equal to 5 times the base data rate) the entire spectrum nominally covers 110 GHz (=50 GHz for the portion between the source carrier frequencies f0, f1 plus 2*30 GHz for the portions outside f0, f1) but contains nearly all the transmitted intensity within a 100 GHz channel. However, as can be discerned in FIG. 4, there is a small overlap between data bands 102 and 103. To reduce the cross-talk between the overlapping sections of the data bands 102, 103, they are also set in mutually orthogonal states, which as described above, can be achieved either by having the polarization state of each data band mutually orthogonal to adjacent bands (as shown in FIG. 4), or having data bands 101, 102 in a first polarization state and data bands 103, 104 in a second polarization state orthogonal to the first polarization state. Since the overlap between data bands 102, 103 is small, and since, in addition, they are set in mutually orthogonal polarization states, the effects of PMD are minimized. Furthermore, the source carrier frequencies f0 and f1 reside at nulls in the data bands so that these carriers are not perturbed by the data. The combined 80 Gbps spectrum can readily be decoded at the receiver by generating, frequency-shifting and power-boosting a carrier out of a transmitted pilot signal in the receiver at the center of the data band of interest and matching the polarization state of that carrier with that of the data band of interest. Advantageously, no further polarization management is required for detection.

It is noted that while 80 Gbps transmission is described, the nominal data rate is merely exemplary since the technique described effectively outputs a data bit rate (80 Gbps) equivalent to eight time the base data rate (10 Gbps). Thus, if the base data rate is higher or lower than 10 Gbps, the output data rate will be accordingly higher or lower in proportion.

Figure 5A:
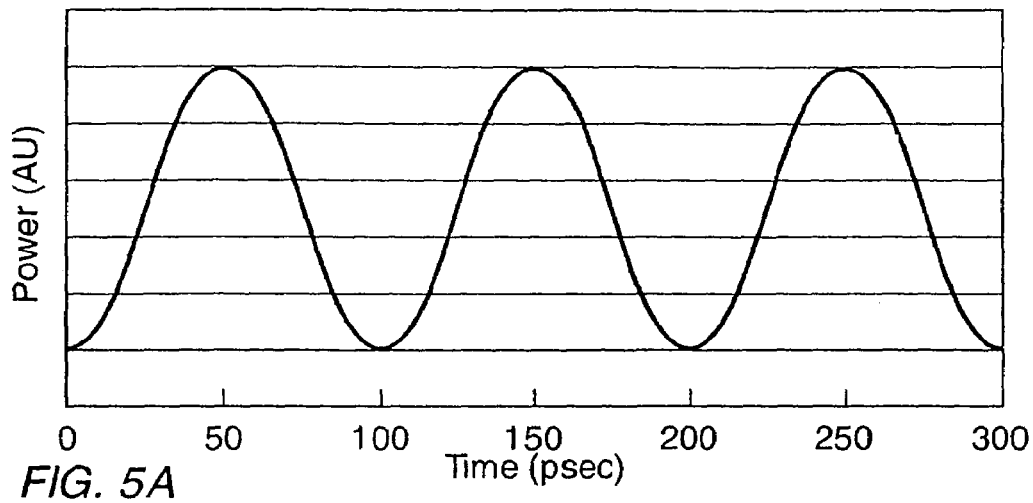
FIG. 5A is a graph of the variation in power of a QRZ signal over time.

FIG. 5A shows how the power of a transmitted QRZ signal varies in the time domain. As illustrated, the power envelope is a pulse train that reduces to zero every 100 picoseconds. All of the information in the signal is carried by the phase of the pulses when the power is high, and the power goes to zero (is off) in between data symbols. Therefore, half of the pulse train carries no information. Using the embodiment of a transmitter module according to the present invention shown in FIG. 6, the pulse trains of a first QRZ signal can be sharpened allowing a second QRZ data signal to be interleaved in the time domain with the first QRZ signal, so that when the first QRZ signal is off, the second QRZ signal is on, and vice versa. By interleaving the signals in the time domain in this manner, the data rate of the signal can be doubled. Thus, if the first QRZ signal contains 80 Gbps of data in accordance with the embodiment described with reference to FIG. 3 and FIG. 4, by pulse sharpening and interleaving, the data rate can be increased to 160 Gbps over the same 100 GHz channel.

Figure 5B:
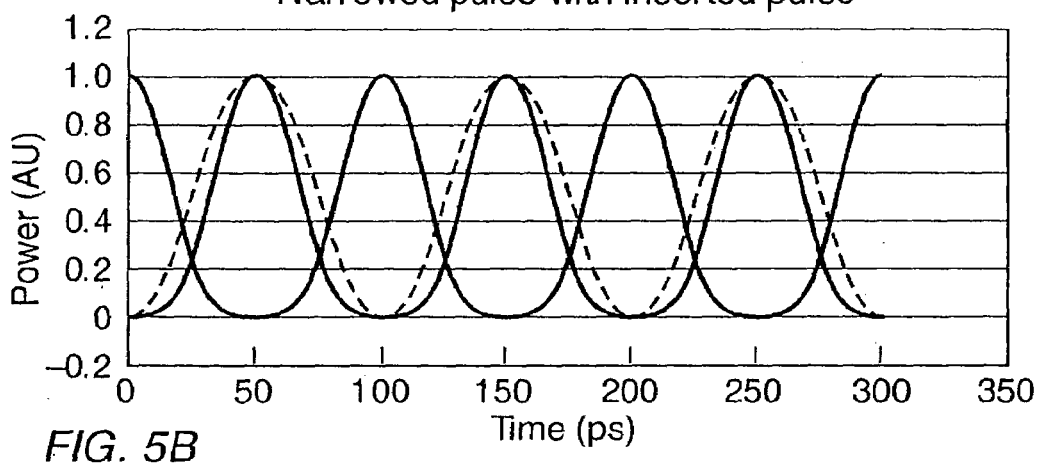
FIG. 5B shows a graph of the variation in power of a pulse-sharpened QRZ signal over time in accordance with the present invention.
Figure 6:
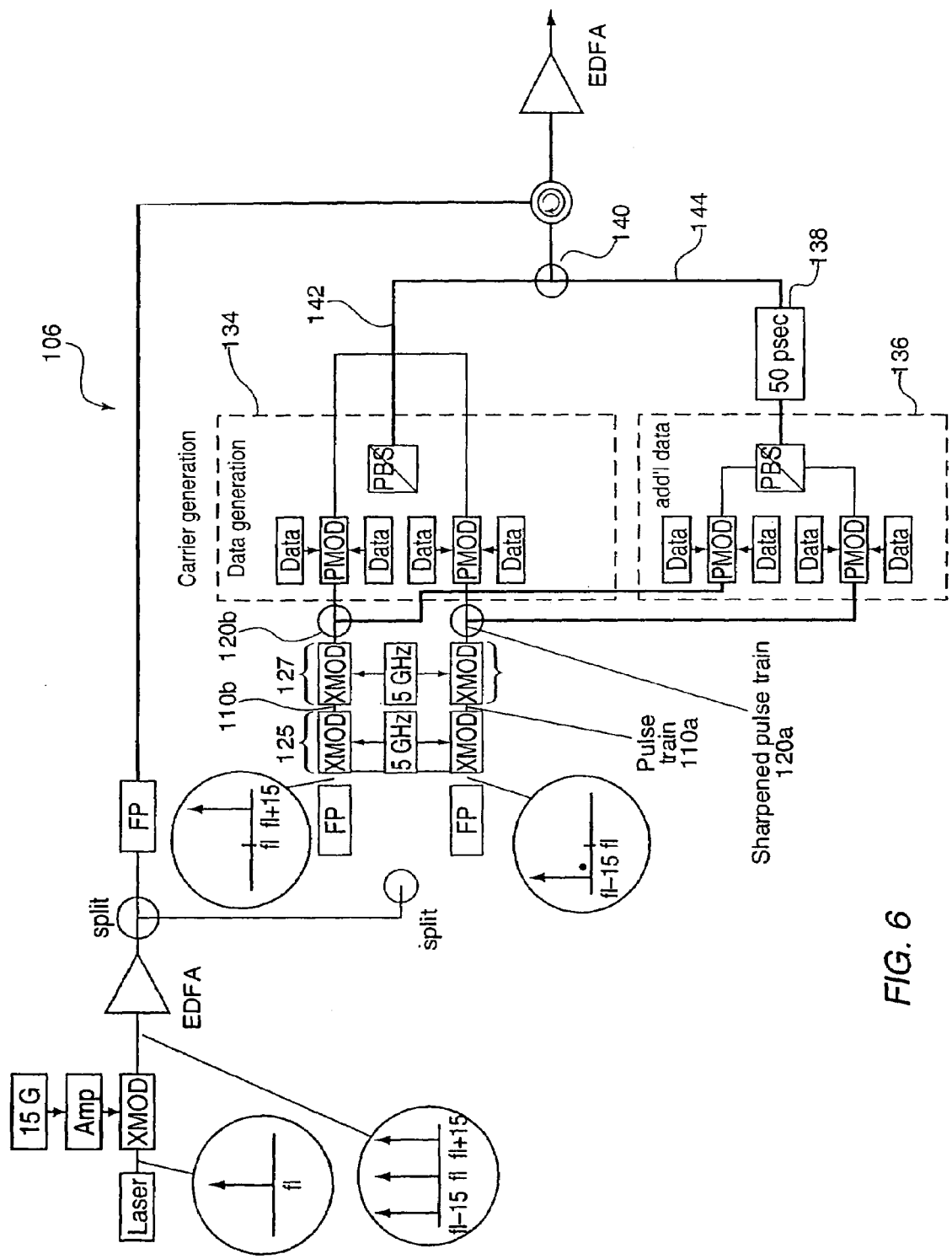
FIG. 6 is a block diagram of an embodiment of a transmitter module that provides for pulse sharpening and time-interleaving of QRZ signals according to the present invention.

As can be discerned from FIG. 6, the initial portion of the carrier processing stage of the transmitter module 106 is identical to the embodiment shown in FIG. 1. A source carrier is modulated by a 15 GHz external modulator to generate side carriers, amplified, and then split and filtered three ways, separating the source carrier, and the upper and lower side carriers. As in the transmitter module of FIG. 1, the upper and lower side carriers are further modulated by a 5 GHz sinusoid at external modulator 125 to pulse the side carriers in the time domain. However, in this case, the pulse train outputs 110a, 110b from modulator 125 are input to a further external modulator 127 which modulates the pulse train with a 10 GHz sinusoid. The effect of the second 10 GHz modulation is to narrow, or sharpen, the pulses of the side carriers in the time domain. This sharpening is shown in FIG. 5B where the solid line indicates the sharpened pulse train 120*a*, 120*b* output from the modulator 127 and the dashed line indicates an unnarrowed pulse train.

Figure 5C:
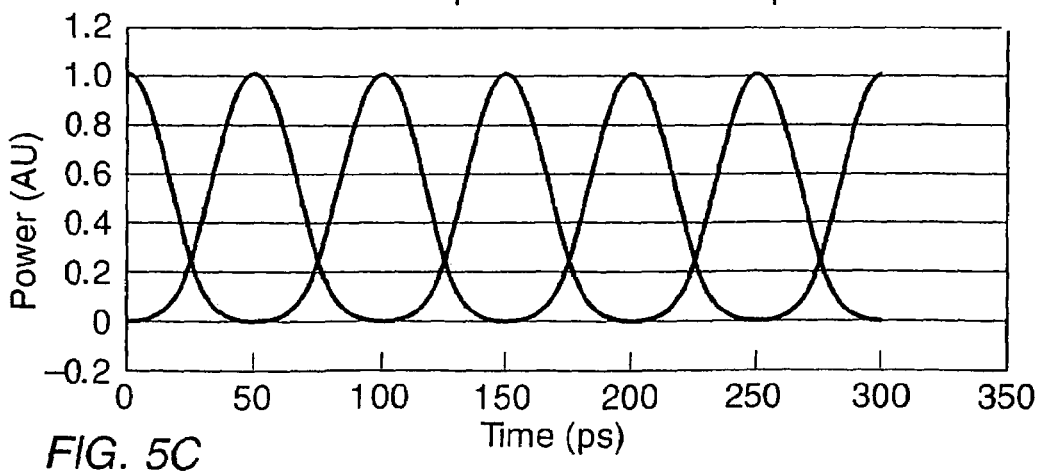
FIG. 5C shows a graph of an interleaved QRZ signal in the time domain, indicating a doubling of the data transmission rate according to the present invention.

The sharpened pulses 120*a*, 120*b* are fed to splitters, each with two outputs. Each splitter output feeds two separate data modulator stages 134, 136, with each data modulator stage identical to the data modulator stage shown in FIG. 1. Each data modulator stage 134, 136 imprints different data streams in quadrature onto both lower and upper pairs of side carriers as described above. Each data modulator 134, 136 supplies a QRZ data signal output to a combiner (polarization beam splitter). The combined output of data modulator stage 136 is delayed in the time domain with respect to the first QRZ data signal 142 output from data modulator stage 134 by feeding it through a 50 picosecond optical delayer 138. The first QRZ data signal is then added to the delayed second QRZ data signal 144 at combiner 140. Delaying the second QRZ data signal with respect to the first data signal by 50 picoseconds ensures that the sharpened pulse trains of the second QRZ data signal are interleaved with sharpened pulse train of the first QRZ signal in the time domain. The interleaved signals are shown in FIG. 5C. The 10 GHz modulation before the data modulators creates a spectrum with peaks at +/−15 GHz+/−5 GHz (i.e. +/−10 and +/−20 GHz) and at 15+/−15 GHz (i.e. 0 and +/−30 GHz). The 5 and 10 GHz driven modulators 125, 127 can also be implemented as a single modulator driven by a more complex electrical signal, such as a narrower pulse. The more complex modulation signals can be generated using an electroabsorption modulator, for example.

Figure 7A:
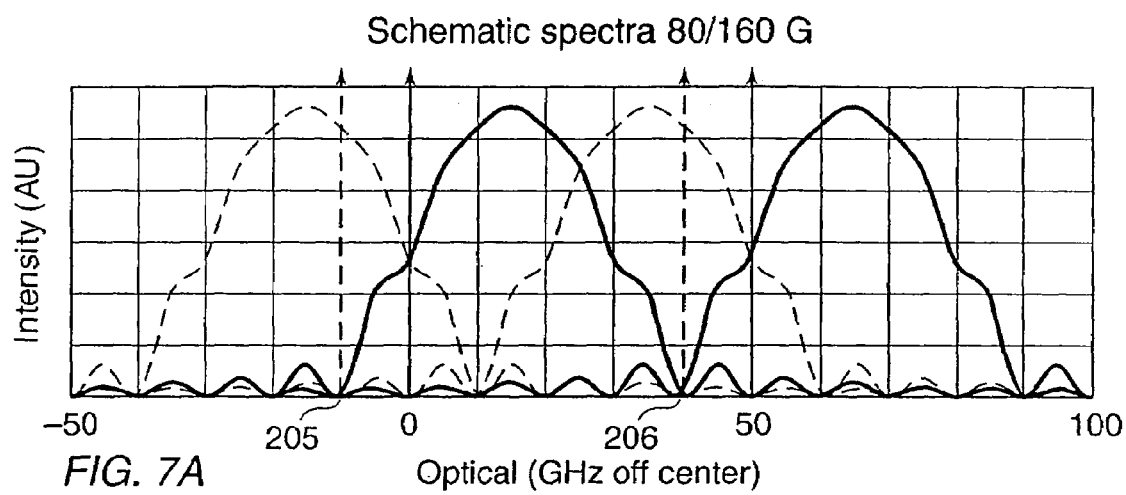
FIG. 7A is an illustration of the frequency spectrum at the output of a transmitter that incorporates two of the transmitter modules of FIG. 6 according to the present invention. The spectrum shows four data bands in alternating polarizations spread of approximately a 100 GHz channel, each data band carrying a 40 Gigabits-per-second data rate.

When two transmitter modules 106 are combined in a single 100 GHz transmitter in the manner described with reference to FIG. 3 (using two source carrier frequencies f0 and f1), 160 Gbps can be transmitted over a 100 GHz channel without undue penalties in terms of nonlinear effects. FIG. 7A shows a frequency spectrum of the 160 Gbps output data signal according to this implementation. As shown, the spectrum includes four data bands 201, 202, 203, 204 with each data band carrying 40 Gbps of data, 20 Gbps from quadrature modulation and 20 Gbps from double sharpened-pulse interleaving. As in the spectra discussed above, the dashed and solid lines indicate mutually orthogonal polarization states. Because of the extra carriers resulting from the additional 10 GHz modulation, each data band is wider than the 30 GHz bands in the spectra of unmodified QRZ signals. It can be seen that the data bands still only have limited overlap, and almost zero overlap in the same polarization state. Since the data bands have their null offset from the original null frequencies (at solid arrows representing f0 and f1), the source carriers inserted by the transmitter can optionally be shifted down by 10 GHz at the transmitter (by using a 10 GHz driven modulator) to new frequencies 205, 206 represented by dashed arrows where data bands 202, 204 reach data nulls. This shifting advantageously reduces interference between the data bands 202, 204 and the carriers 205, 206. Similarly, in a polarization multiplexed scheme the carriers can be shifted up by 10 GHz and given an orthogonal polarization state (represented by dashed lines) to reduce interference with data bands 201, 203.

Figure 7B:
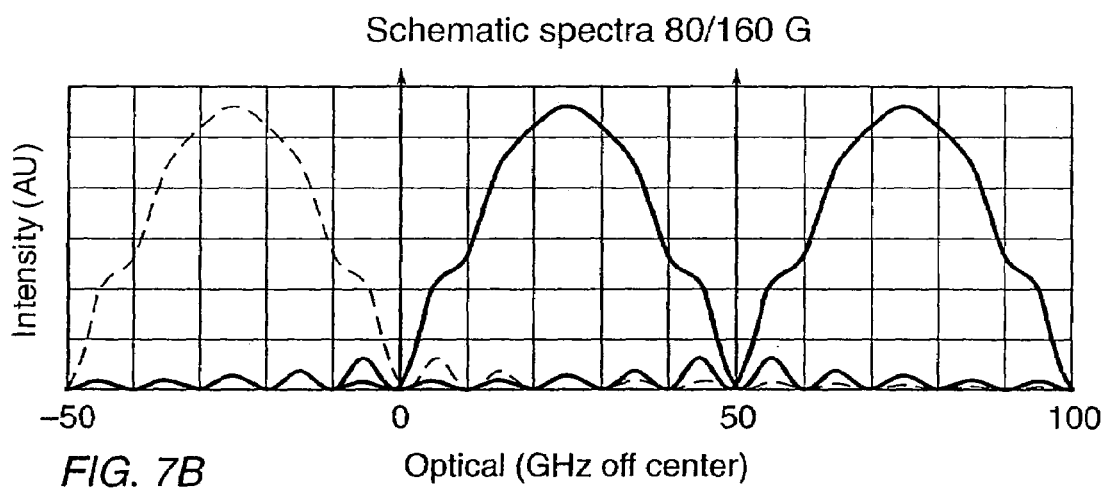
FIG. 7B is an illustration of an alternative output spectrum of a transmitter incorporating two of the transmitter modules of FIG. 6 according to the present invention. In this implementation, data bands that completely overlap in the frequency spectrum are polarization multiplexed.

In an alternative implementation, the spectra can be modified so that the orthogonal data bands 202, 203 fully overlap in frequency as shown in FIG. 7B. This spectrum provides data nulls at f0, f1 for positioning the source carriers so that they do not need to be shifted in frequency to reduce interference effects.

Figure 7C:
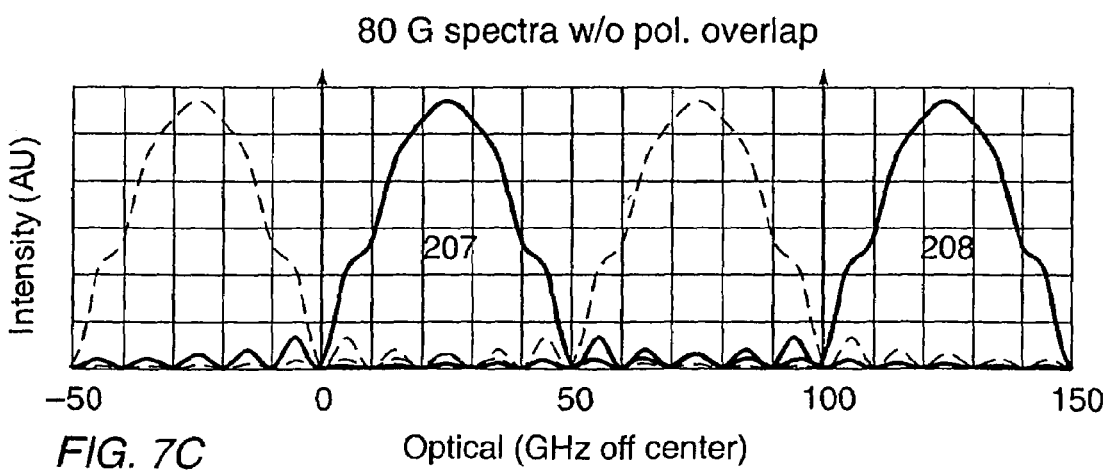
FIG. 7C is an illustration of an alternative output spectrum of a transmitter incorporating two of the transmitter modules of FIG. 6 according to the present invention. In this implementation, there is no overlap of data bands and a 80 Gigabits-per second data rate is carried within a 100 GHz channel.

In a further alternative implementation, the double pulse transmitter technique can be applied in the absence of polarization multiplexing to achieve a spectrum without significant polarization state overlap, as shown in FIG. 7C. In this spectrum, two data bands 207, 208 having orthogonal polarization states are positioned in a 100 GHz channel. Given a 10 Gbps base data rate, data bands 207, 208 each carry 40 Gbps, adding to a total of 80 Gbps (rather than 160 Gbps) in the 100 GHz channel. One of the advantages of having no significant polarization state overlap is that, in the receiver, the polarization state of the carrier can be selected to have any desirable state. For instance, when the polarization state of the carrier is aligned with the polarization state of the data band, maximum signal detection is provided, and when the polarization state of the carrier is orthogonal to the data band, very little signal is detected due to the fact that there is no other signal in the orthogonal polarization state present in the same frequency band. Therefore, an imperfect alignment of the carrier and data band polarization states does not have a large impact on the detected signal properties as would be the case if orthogonally polarized data signals were present in the same frequency band. For this reason, it is feasible to offset the carrier polarization state in the receiver to match one of the so-called principal polarization states of the data signal. A principal polarization state is a polarization state at the output of a fiber wherein all signal content, nearly independent of optical frequency, has undergone the same amount of delay. There are two such polarization states in a given optical fiber, which are mutually orthogonal. The two principal polarizations states have different delay which is the root cause of PMD. The principal states depend on the fiber and are time varying. The transmitter launches light into both principal polarization states and the amount of light apportioned between the two states is not controllable. However, at the receiver, the principal polarization state with the most power content can be selected in lieu of maximizing total signal content by detecting both principal states simultaneously. This provides the advantage that signal degradation from detecting the same signal twice with different delays from PMD is avoided. The selection of the principal state is accomplished by setting the carrier polarization state and tracking the strongest principal axis. Occasional jumps may be required if the other principal axis gains more power. This ensures that at all times a single signal is detected without degradation from PMD. Hence, very large amounts of PMD, up to the point at which higher order PMD effects dominate, can be handled since the delay difference between both principal axes is irrelevant when only one of them is detected.

Figure 11:
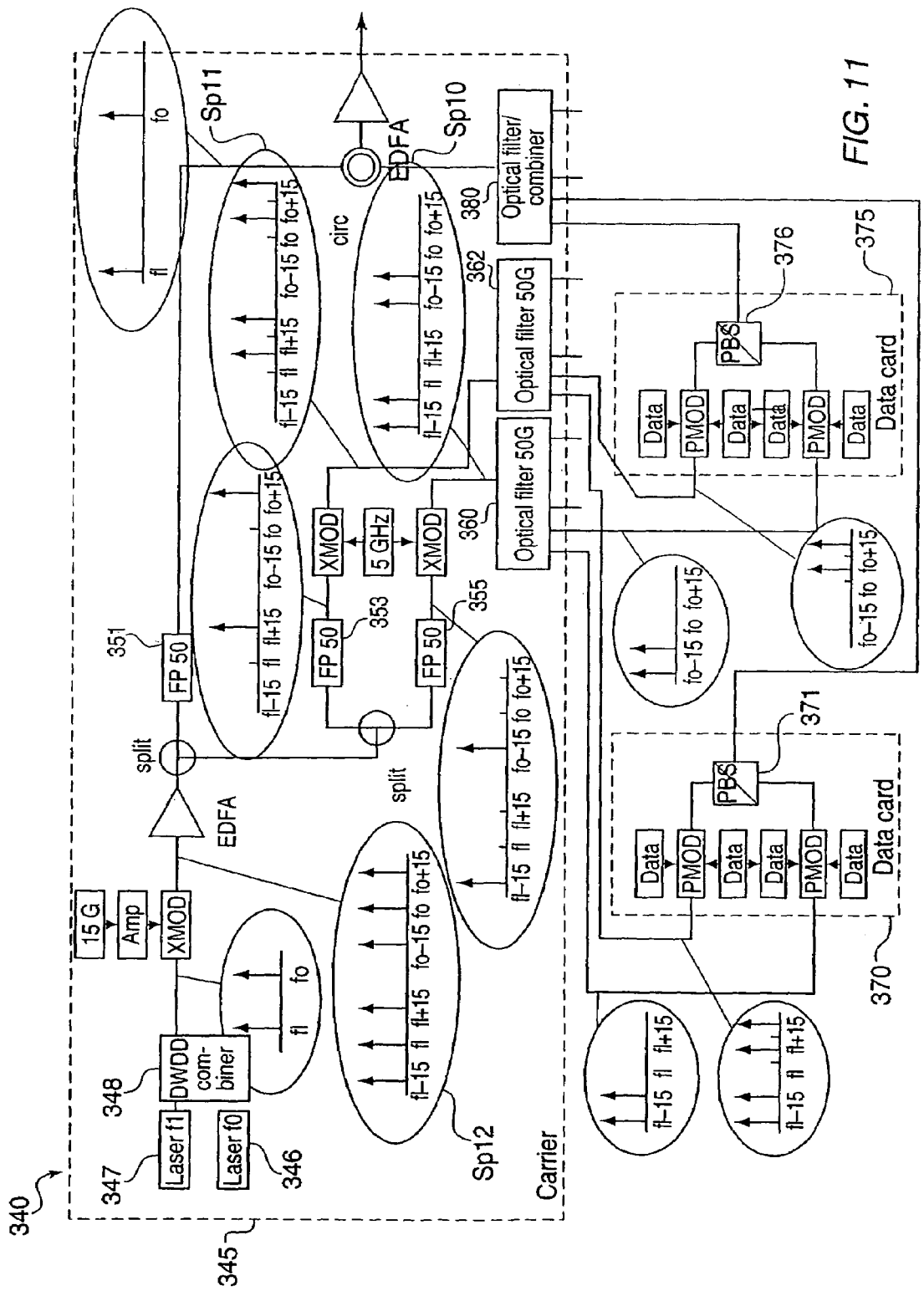
FIG. 11 shows a block diagram of an additional embodiment of a transmitter module in which a single carrier generation section is used in combination with two data generation sections according to the present invention.

FIG. 11 shows an alternate embodiment of a transmitter module for transmitting eight times the base data rate that uses a single carrier generation section 345 in combination with two data generation sections. A carrier generation section 345 similar to the carrier generation portion of the transmitter of FIG. 1 is used to generate and output bimodal QRZ pulsed carrier signals shown in respective spectra Sp10 and Sp11. As shown, two lasers 346, 347 emitting at f0 and f1 (approximately 50 GHz apart) are combined in a DWDM multiplexer 348 and then sent through a 15 GHz side-carrier modulator, amplifier, and three-way splitter section identical to those shown in FIG. 1. The spectrum of the split signal prior to filtering is shown in Sp12. Each portion of the split signal is then filtered through a respective 50 GHz FP filter 351, 353, 355, which outputs respective bimodal carrier signals at <f1, f0>, <f1+15 GHz, f0+15 GHz> and <f1−1.5 GHz, f0−15 GHz>. The latter two bimodal signals are input to a 5 GHz modulator to generate pulse carrier signals shown in spectra Sp10, Sp11 which are then input to 50 GHz-wide optical filters 360, 362. The optical filters 360, 362 separate the signal contributions from the respective lasers f0, f1 and route output carrier signals offset from f1 to data card 370 and route output carrier signals offset from f0 to data card 375. In this manner, data cards 370, 375 require no wavelength-dependent components because all frequency shifting and filtering operations occur in the carrier generation section 345. Each data card 370, 375 combines two 20 Gbps output data streams in respective polarization beam splitters 371, 376 which render the two 20 Gbps streams in mutually orthogonal polarization states. The output from polarization beam splitters 371, 376 is fed to an optical combiner/output filter 380 where the two 40 Gbps data streams are combined such that adjacent data bands have mutually orthogonal polarization states (as in the spectrum shown in FIG. 4). The optical combiner output is then combined with the laser frequencies f1 and f0 and amplified to generate the final transmitted signal. Accordingly, this implementation requires only one carrier generation block to generate and transmit two 40 GBps output streams having data bands in alternating polarization states.

Figure 16:
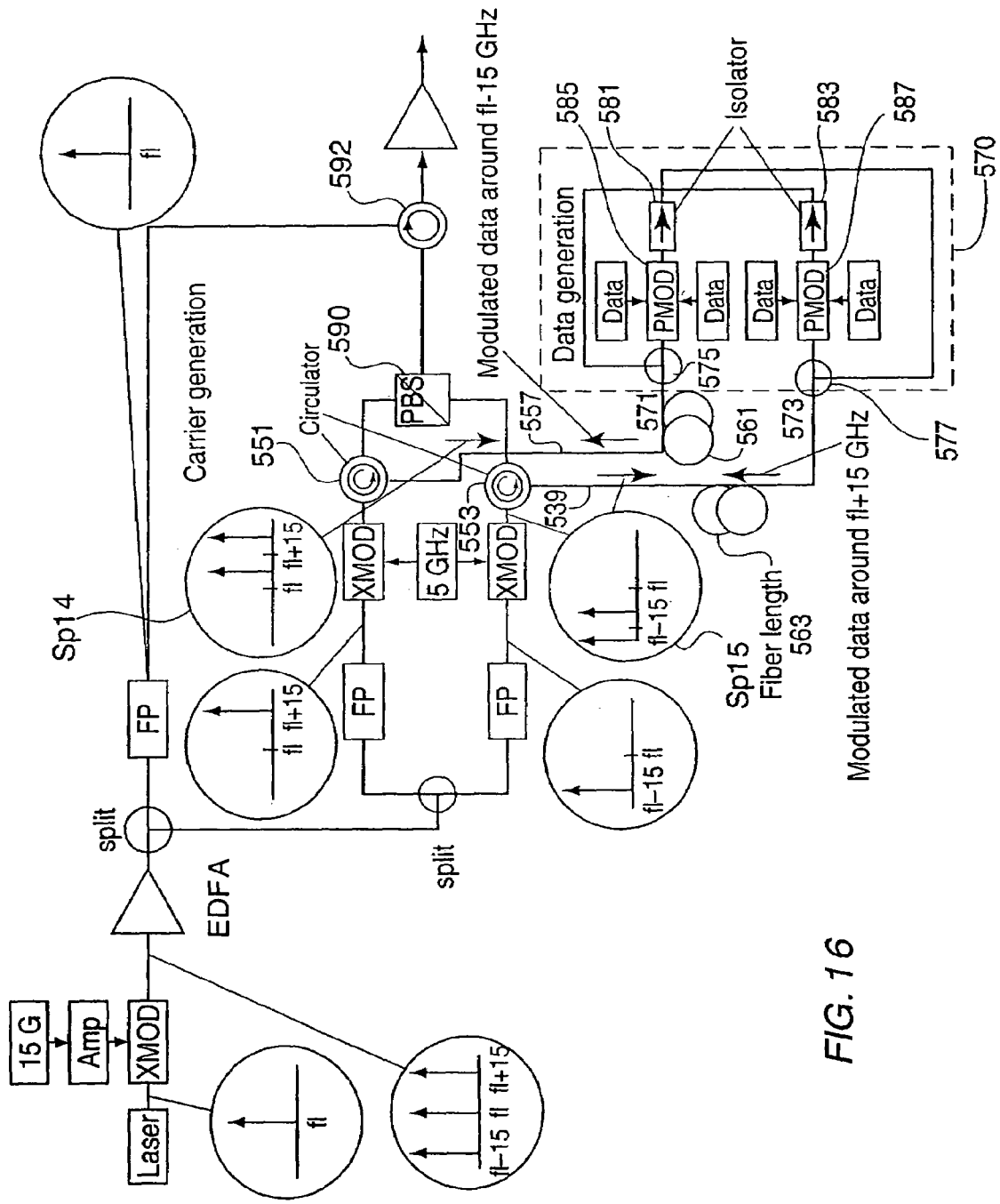
FIG. 16 shows a block diagram of an embodiment of a transmitter module according to the present invention in which counterpropagation is used to reduce fringing effects within the module.

FIG. 16 shows an embodiment of a transmitter module according to the present invention in which counterpropagation is used to reduce fringing effects within the transmitter. The carrier generation portion of the transmitter module is identical to the carrier generation portion of FIG. 1, but differs at the point where QRZ modulated side carriers are delivered to the data generation section. As shown, pairs of side carriers 5 located 5 GHz off of f1+15 GHz and f1−15 GHz shown in respective spectra Sp14, Sp15, are fed to respective circulators 551, 553. The QRZ carrier signal entering circulator 551 is routed down optical path 557 and the QRZ carrier signal entering circulator 553 is routed down optical path 559. Both optical paths 557, 559 comprise fiber lengths 561, 563 which are approximately equal, and which lead toward inputs 571, 573 of data generation card 570. At input 571, the carrier signal transmitted through optical path 557 is split at splitter/combiner 575 with one portion being modulated at the data modulator 585 and another being routed to isolator 581 where it is absorbed. Likewise the carrier signal transmitted through optical path 559 is split at splitter/combiner 577 with one portion being modulated at data modulator 587 and another being routed to isolator 583 where it is absorbed. The output from modulators 585, 587 are connected to respective isolators 581, 583 that pass the modulator outputs to the counterpart splitter/combiner 577, 575 such that each output travels in a backward direction over the counterpart fiber 563, 561 towards the circulators 553, 551 at the 5 GHz modulator. The backward-traveling signals that carry the modulated data are fed towards the next output of the circulators into the PBS 590 that combines the data bands in orthogonal polarization. At the output circulator 592 the original carrier signals f1 are added. Among the advantages of this arrangement are that the need for a stand-alone output fiber from the data modulator is removed and also that both data streams traverse the same lengths of fiber (either 561 and 563, or 561 and then 563, either way total length=561+563) so that they receive exactly the same amount of total phase delay. This is beneficial in handling fringing effects in the transmitter that are caused by heating/cooling and mechanical stress of the fibers to the data cards.

Figure 17A:
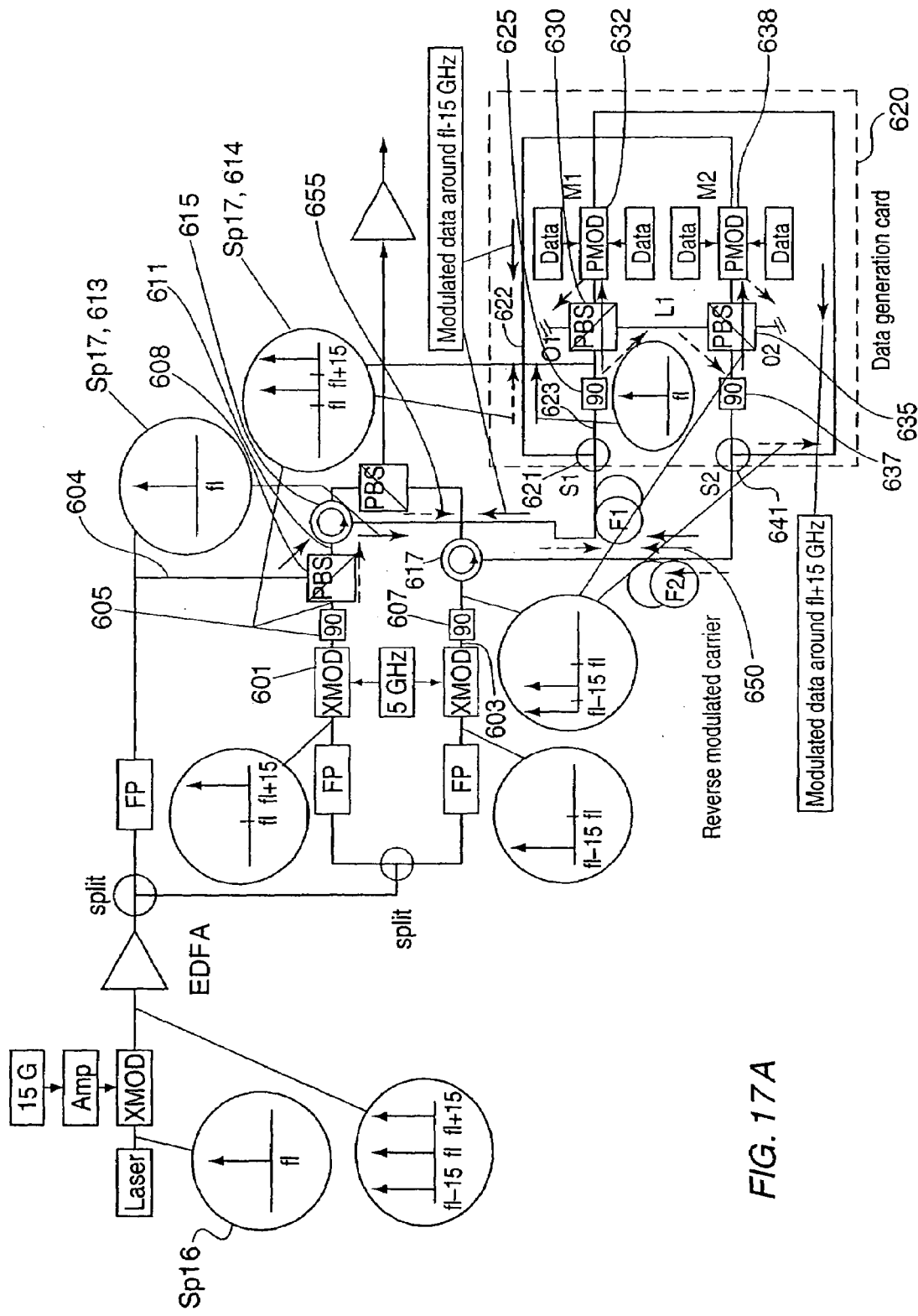
FIG. 17A shows an additional embodiment of the transmitter of FIG. 16 in which counterpropagation of data streams in forward and backward directions is achieved through differential routing of signals in orthogonal polarization states.

Counterpropagation of data streams in forward and backward directions can also be achieved through differential routing of signals in orthogonal polarization states. In this implementation, shown in FIG. 17A, isolators are not required. As shown, the transmitter module of FIG. 17A is similar to the embodiment shown in FIG. 16 with the initial difference that the original carrier signal f1 shown in spectrum Sp16 is also fed through the fibers to the data generation card so that the carrier acquires the same phase delay as the data signals to further suppress fringing effects between the carrier and the data signals.

In FIG. 17A, the respective outputs of the 5 GHz modulator 601, 603 are first fed through a 90 degree polarization state rotation at respective 90 degree polarization rotators 605, 607, which change the polarization state from one linear state X to an orthogonal linear state Y, or on PM fibers, from the slow axis to the fast axis. The output signal 601 is then fed through a polarization beam splitter (PBS) 608 which adds the carrier signal 604 in polarization state X. It is noted that signals in the X polarization state are indicated with solid arrows, and signals in the Y polarization state are indicated with dashed arrows. Polarization beam splitter 608 combines signals 601 and 604 and outputs a combined signal 611 to circulator 615 which directs the signal into the fiber F1 coupled to the data modulator card 620. The combined signal contains laser carrier frequency f1 in X polarization (shown in Sp17 and also depicted as solid line 613) and carriers at f1+10 and f1+20 GHz in Y polarization (shown in Sp18 and also depicted as dashed line 614). The combined signal 611 (613+614) reaches splitter/combiner 621 where it is divided into an upper branch signal 622 and a lower branch signal 623. The lower branch signal 623 is fed to another 90 degree rotator 625 which rotates the polarization state of the signal so that at the output, the laser frequency f1 is in the Y polarization state and the carriers at f1+10 and f1+20 GHz are in the X polarization state. This rotated output is input to a polarization beam splitter (PBS) 630 that passes the portion of the signal in X polarization straight on into the data modulator 632 and diverts the Y polarization off into the waveguide L1 which delivers the Y-polarized carrier f1 to polarization beam splitter 635. The upper branch signal 622, having carriers at f1+10 and f1+20 GHz in Y polarization and the laser frequency f1 in X polarization, is supplied in a backward direction to data modulator 638 which reverse-imprints data onto the signal and outputs a reverse-modulated signal to the PBS 635. At lower PBS 635, the laser frequency f1 (in pol.-state Y) from the lower branch is combined with the data-modulated upper branch signal in polarization state X. The output from data modulator 638 in polarization state Y is deflected to terminated output O2 of the PBS 635 where it is dissipated. Only a reverse-modulated version of this laser frequency in X polarization is passed backwards by PBS 635. The lower PBS 635 outputs to another 90 degree rotator 637 which converts the reverse-modulated laser frequency in X polarization into Y polarization and the unmodulated laser from L1 into X polarization. These converted carrier signals are input to splitter/combiner 641 where they meet the modulated data output of the data modulator 632 around f1+15 GHz in X polarization. This total signal 650 containing an unmodulated carrier f1 in X polarization, a reverse-modulated carrier f1 in Y polarization and a data signal about f1+15 GHz in X polarization is fed to fiber F2 and is transmitted in a backward direction. The signal propagates up to the lower circulator 617 which redirects the signal forward to the output polarization combiner 655 which passes the X polarization state to the output and rejects the Y polarization state. Hence the output contains laser frequency f1 and modulated data around f1+15 GHz.

Similarly, the lower circulator also outputs f1−10 GHz and f1−20 GHz in Y polarization from the 90 degree rotator 607 into fiber F2 in forward direction. This reaches the lower splitter/combiner 641 where one part passes through the 90 degree rotator 637 to enter the modulator 638 in X polarization. The modulator output is fed to the upper splitter/combiner 621 of the data modulation card 620 where the signal is fed into fiber F1 in backward direction and in X polarization. Thus the modulated data signal 659 around f1−15 GHz reaches the upper circulator 615 and is passed to the output PBS 655 where it is combined with the carrier and data band around f1+15 GHz in orthogonal polarization. The lower branch out of splitter 641 enters the upper modulator in backwards direction and the Y polarized signal is directed to output O1 of the PBS where it is dissipated.

Figure 17B:
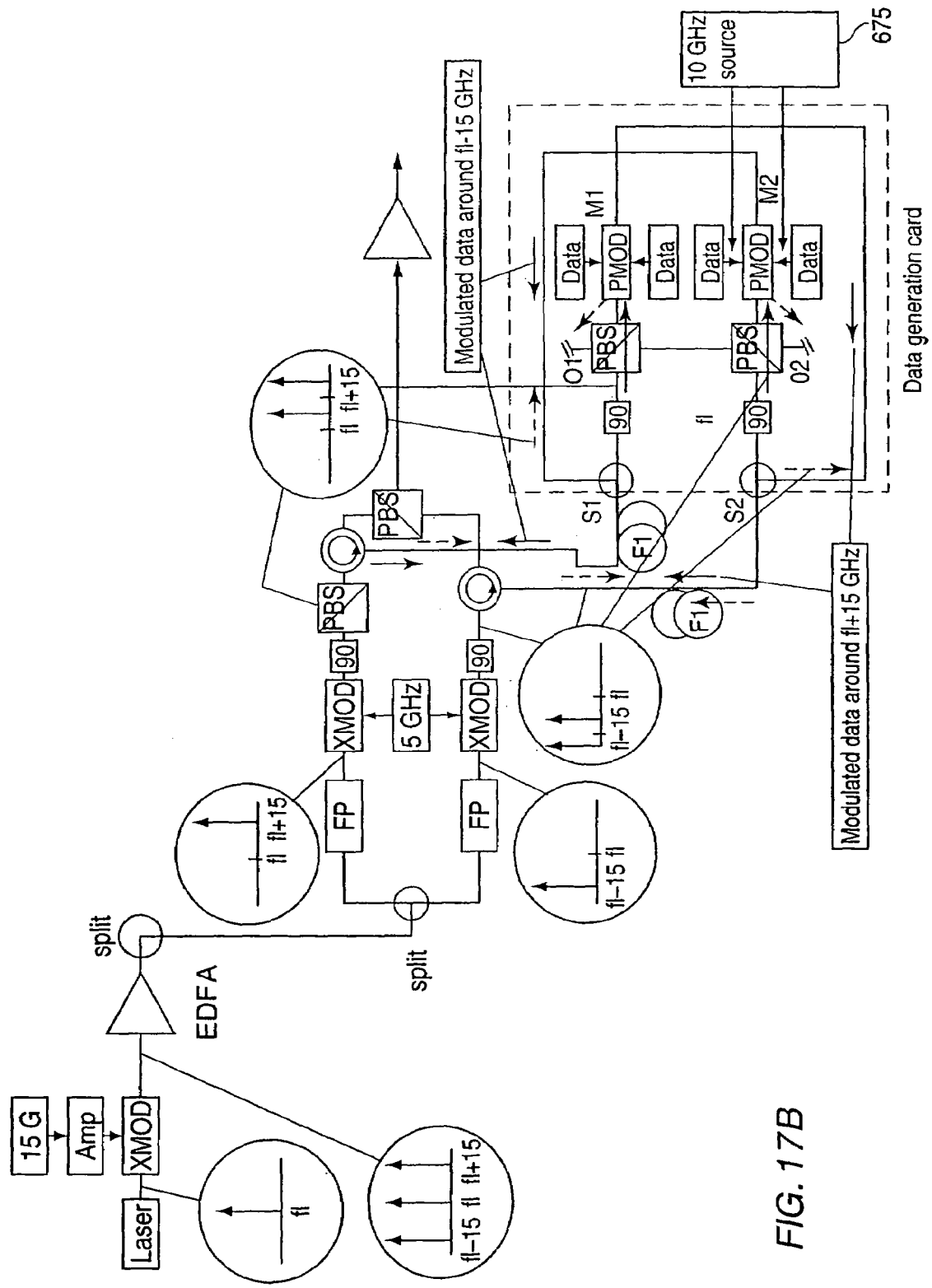
FIG. 17B shows an additional embodiment of the transmitter module depicted in FIG. 17A, including an alternate means of generating a non-offset carrier signal.

FIG. 17B shows a modified version of the transmitter module of FIG. 17A, in which the top portion for generating the carrier, f1, is removed. Instead, a 10 GHz generator 675 is added to the data stream of at least one of the two data modulators (only one 10 GHz modulator is shown). The 10 GHz generator 675 interacts with the carriers at f1−10 and f1−20 GHz in this example to generate a carrier signal at f1 in addition to the modulated data output. An advantage of this version is that it reduces the number of optical components since there is no need to optically filter the carrier f1. This advantage is balanced by the disadvantage that additional frequencies aside from the desired frequency f1 are also generated. These additional frequencies add power to the output spectrum and can interfere to a small degree with the data.

It is noted that while the foregoing discussion has pertained to signal generation within a single 100 GHz bandwidth channel, the foregoing techniques and apparatus can be advantageously applied to multiple channels in a DWDM multichannel optical communication system that incorporates multiple 100 GHz optical channels. The embodiment of a transmitter module shown in FIG. 1 can be adapted for a multiple channel DWDM system according to the present invention in the manner depicted in FIG. 12. In this embodiment, carrier processing functions remain completely separated from data processing functions, so that all wavelength-dependent processing for the entire DWDM system occurs in a single carrier processing section and all data processing functions can be allocated to multiple modular data cards located separately from the carrier processing section.

Figure 12:
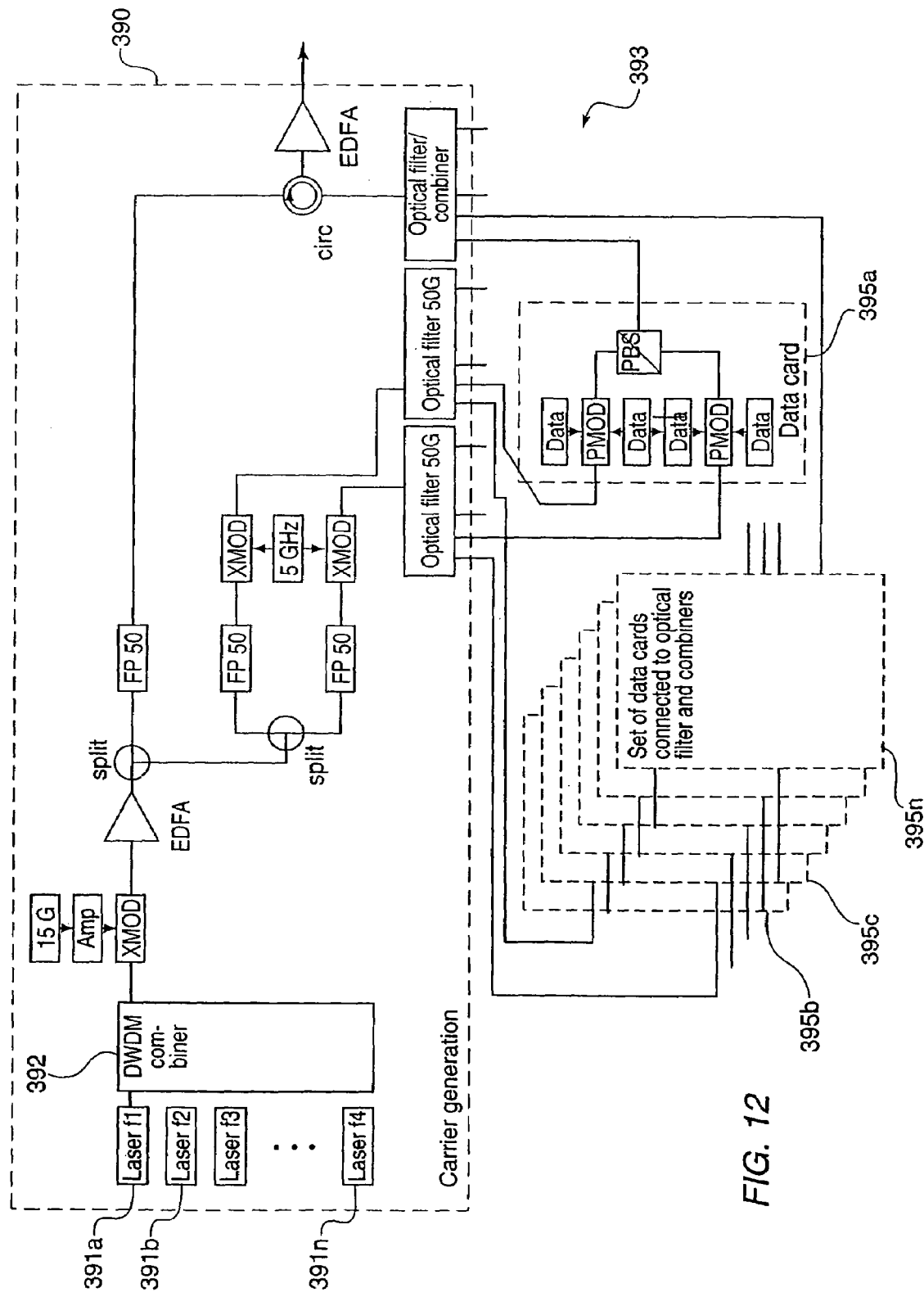
FIG. 12 is an embodiment of the transmitter module of FIG. 11 that incorporates input from multiple data cards according to the present invention.

In FIG. 12, the carrier generation section 390 is identical to the carrier generation section 345 of FIG. 11, except that in FIG. 12, the carrier generation section 390 includes input from multiple laser sources 391a, 391b . . . 391n rather than only two laser sources. Each laser source 391a, 391b . . . 391n can be separated in frequency by approximately 50 GHz. Each source carrier signal emitted by the respective laser source is combined in a multiple-input DWDM multiplexer 392. The remainder of the carrier generation section 390 is identical to the carrier generation section 345 of FIG. 11. The data generation section 393 comprises a multiple set of modular data cards 395a, 395b . . . 395n, where the number of data cards corresponds to the number of source lasers 391a, 391b . . . 391n used in the carrier generation section. Each data card receives two carrier signals and imprints data streams in quadrature on each input signal, amounting to 40 Gbps per data card given a 10 Gbps base data rate.

Enhanced Reception

In accordance with the present invention, several related techniques are provided which improve and enhance reception and detection of data at high data rates. According to one technique, a local pulse-sharpened carrier is generated which is mixed with a QRZ data signal at a detector. By pulsing (and sharpening) the carrier signal, the contribution of noise generated by amplification is reduced by approximately a factor of two and the SNR of the detected signal is accordingly improved by approximately 3 dB. In another technique, a bi-directional Erbium-doped fiber amplifier is used to selectively amplify a carrier signal while limiting fringing effects by sending carrier and data signals along equal optical path lengths. In transmitter/receiver system embodiments, non-linear effects by transmitting carrier signals in an othogonal polarization state with respect to data signals, and PMD effects are compensated for in both single channel and DWDM multi-channel systems by using delay management to cancel phase noise introduced by PMD. In various embodiments, delays introduced by PMD are canceled either through optical delay means or electronic delay means.

Figure 8:
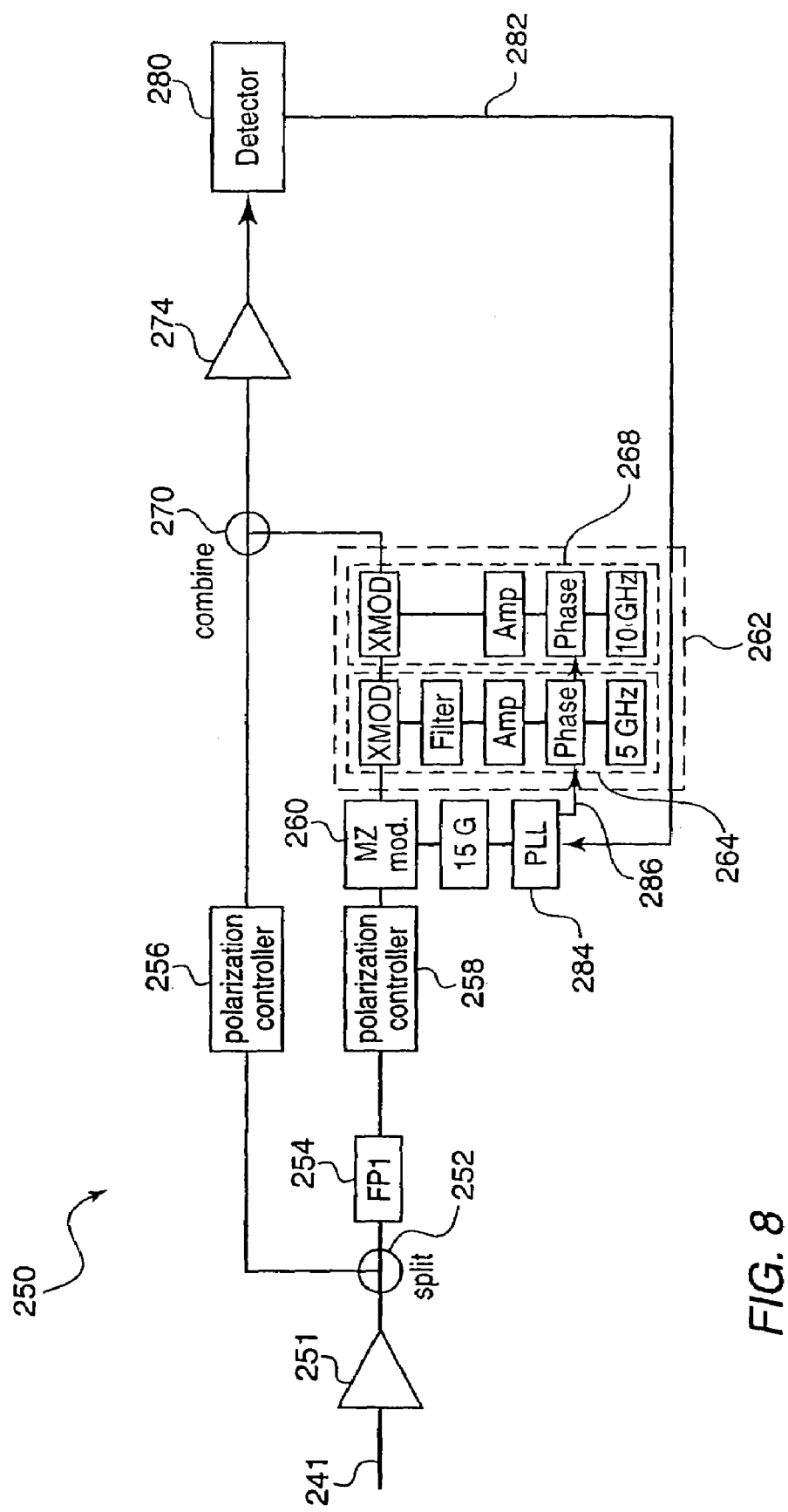
FIG. 8 is a block diagram an embodiment of a receiver for a single DWDM channel that employs local side carrier and pulsed carrier generation according to the present invention.

FIG. 8 shows an embodiment of a receiver for a single DWDM channel that employs local side carrier and pulsed carrier generation according to the present invention. A receiver 250 receives an optical data signal in QRZ format via an optical fiber 241 through an optical amplifier 251 which may be an EDFA or an SOA. The amplified signal is split at splitter 252 into a lower branch fed through an FP filter 254 which passes the carriers in the signal only, and an upper branch supplied to a polarization controller 256. In the lower branch, the carrier signal passed by the FP filter 254 is delivered to a separate polarization controller 258 which can be used to match the signal polarization state to a selected axis of a Mach-Zender (MZ) modulator 260. Alternatively, the modulator 260 can be configured to operate on both polarization axes so that the polarization controller 258 is not needed. The MZ modulator 260 generates side carriers in the center of the data bands as discussed in the previous application Ser. No. 09/871,216. The side carriers are generated at the center of the respective data bands to enable homodyne detection. The generated side carriers are fed through a pulse generation section 262 including a 5 GHz external modulator 264 and a 10 GHz external modulator 268 coupled in series. The external modulators 264, 268 can alternatively be implemented as a single modulator with a different electrical drive. The pair of external modulators 264, 268 generate pulsed, sharpened side carriers with a pulse rate of 10 gigapulses per second as in FIG. 5B. The pulse train output from the pulse generation section 262 is combined with the original data signal from polarization controller 256 at a combiner 270. Before combining, the polarization controller 256 advantageously matches the polarization state of a particular desired data band in the data signal to the polarization state of the pulsed carrier using feedback from the detector, by the technique discussed in application Ser. No. 09/871,216. The combined signal is passed through another optical amplifier 274 to a detector 280, which may be implemented as a photodiode, for example. The detector 280 receives both the pulsed QRZ data signal and the locally generated pulsed carrier signals centered in the data bands of the QRZ data signal in approximately the same polarization state. The signal generated at the detector 280 is used in a feedback loop to control the phase of a phased-locked loop (PLL) 284 which is coupled to the MZ modulator 260 and to the pulse generation section 262. The PLL 284 is used to control the phase of the generated carriers in order to eliminate phase noise between the data-signal received and the locally generated pulsed carrier signal. The PLL 284 is also used to control the pulse phase, i.e., to select between I and Q.

Figure 9:
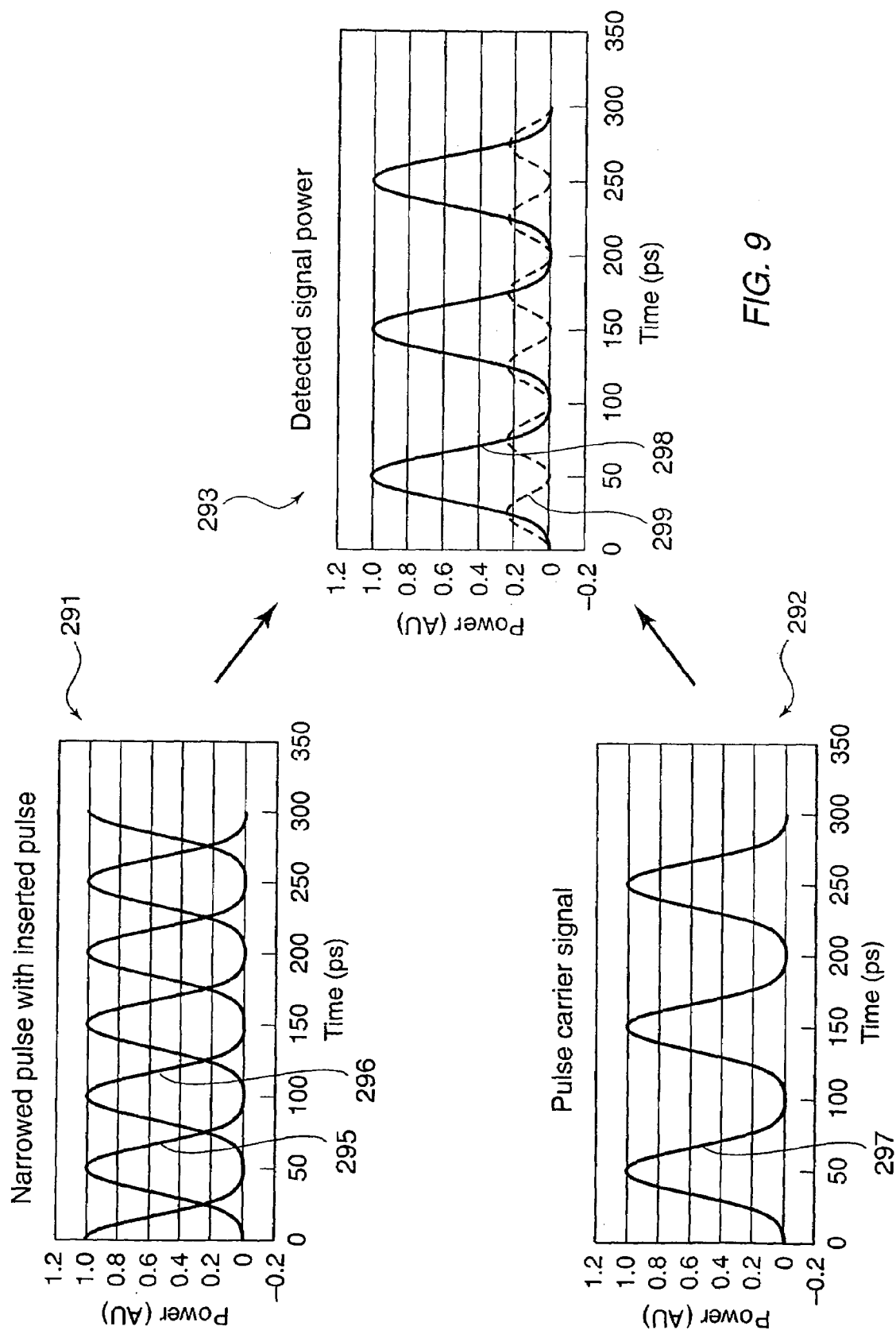
FIG. 9 show graphs of a pulsed carrier and a narrowed, interleaved pulse overtime and illustrates the effect of pulsing the carrier signal on the detected signal output according to the present invention.

FIG. 9 illustrates the effect of pulsing the carrier signal on the signal output at the detector 280. On the left side of FIG. 9, graph 291 shows the power of data signals 295, 296 interleaved in the time domain. Graph 292 depicts the variation of the power of the pulsed carrier signal 297 over time. At the detector 280, the data signals 295, 296 are mixed with the pulsed carrier signal 297. The mixing in the detector 280 effectively multiplies the data signals 295, 296 with the pulsed carrier signal 297. The detected power corresponding to data signals 295, 296 is shown in graph 293 as respective detected signals 298, 299. As shown, the pulsed carrier signal 297 is synchronized with the data signal 295, which is therefore targeted for detection. The detected signal 298 is proportional to the overlap of the pulsed signal 297 and the targeted data signal 295, while the detected signal 299 is proportional to the overlap of the pulsed carrier and data signal 296. Because detected signal 299 is much smaller in amplitude than the targeted detected signal 298 the data signals 295, 296 can be effectively separated. To improve signal discrimination, pulse width and shape can be tuned to maximize the discrimination between the targeted 295 and non-targeted 296 signals. Additionally, the pulse train 297 can be modified to a narrow pulse at twice the pulse rate so that both signals can be detected on the same detector, separated in time by 50 psec. This would effectively double the detection rate at the detector 280. Further pulse narrowing and increase in pulse rate can be applied to boost the detector rate even higher when additional data signals are combined. Each data signal is probed at the moment that the carrier for that signal is active.

It is noted that when the carrier is active, beat noise enters the receiver due to Amplified Spontaneous Emission (ASE) caused by signal amplification. Without reduction measures, ASE beat noise can be a dominant nose source. However, when the pulsed carrier 297 is in an off phase, which is half the time, this beat noise is not generated. Hence, by pulsing the carrier, overall noise generation is reduced by approximately a factor of two, and the signal to noise ratio is accordingly improved up to 3 dB in comparison to receivers that use a continuous wave (CW) carrier. Therefore, even if a second interleaved signal (such as signal 296) is not transmitted, it remains beneficial to pulse the receiver carrier synchronously with the transmitted QRZ bit pattern so that the pulsed carrier is off during data symbol transitions, when there is no data to detect.

Figure 18A:
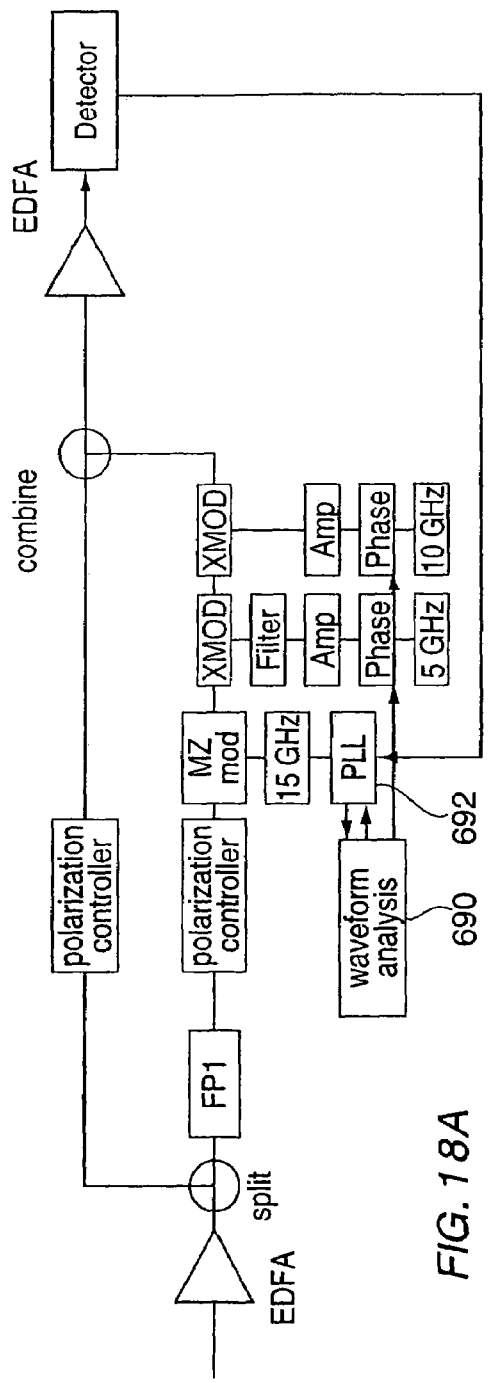
FIG. 18A shows an additional embodiment of the receiver depicted in FIG. 8 which includes a waveform analyzer for pulse polarity detection.
Figure 18B:
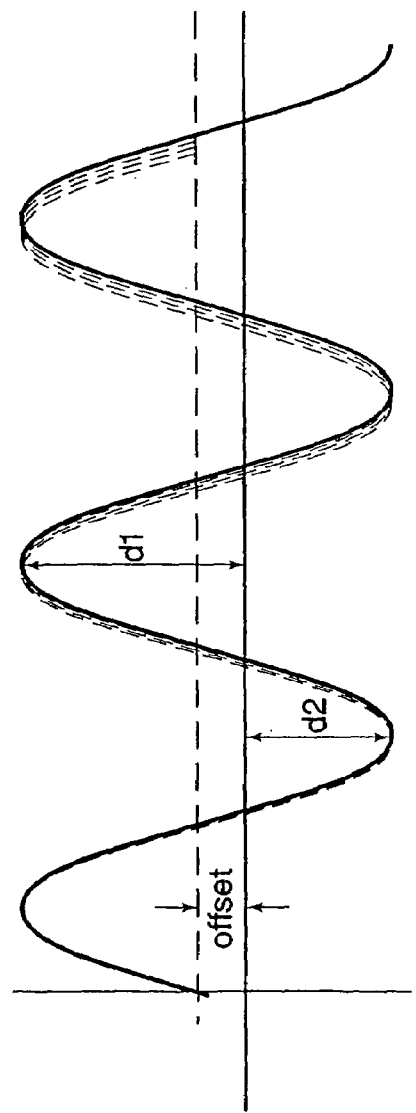
FIG. 18B is a schematic illustration of an offset pulse signal for pulse polarity detection.

FIG. 18A shows a slightly modified version of the receiver shown in FIG. 8 which includes a waveform analyzer 690 for pulse polarity detection. When during transmission, a QRZ signal is generated using a 5 GHz modulator, every second pulse that is generated has an inverse phase. At the transmitter, this phase is known and can be coded by shifting the amplitude balance between pulses of positive and negative sign by offsetting the bias point of this modulator. In other words, by adding an offset or a modulation to the bias electrode a small low-frequency perturbation can be imprinted on this amplitude which can be asymmetric around zero, making the positive and negative excursions of the amplitude slightly different. FIG. 18B schematically illustrates the difference in amplitude between positive an negative excursions of the pulsed signal, with the positive excursion having a maximum amplitude of d1 which is greater than the corresponding maximum amplitude of the negative excursion, d2. By monitoring the detected signal using a waveform analyzer 690, the small low frequency perturbation can be retrieved. The waveform analyzer 690 can be implemented as an electronic control unit. The analyzer 690 can determine from the pattern of the detected positive and negative excursions whether the received pattern in the detected data is correct, or if it is inverted. In the latter case the waveform analyzer 690, which is coupled to the PLL 692 can trigger an adjustment to be made to the PLL phase or, alternatively, the data output can be inverted to restore the original data stream.

Figure 10:
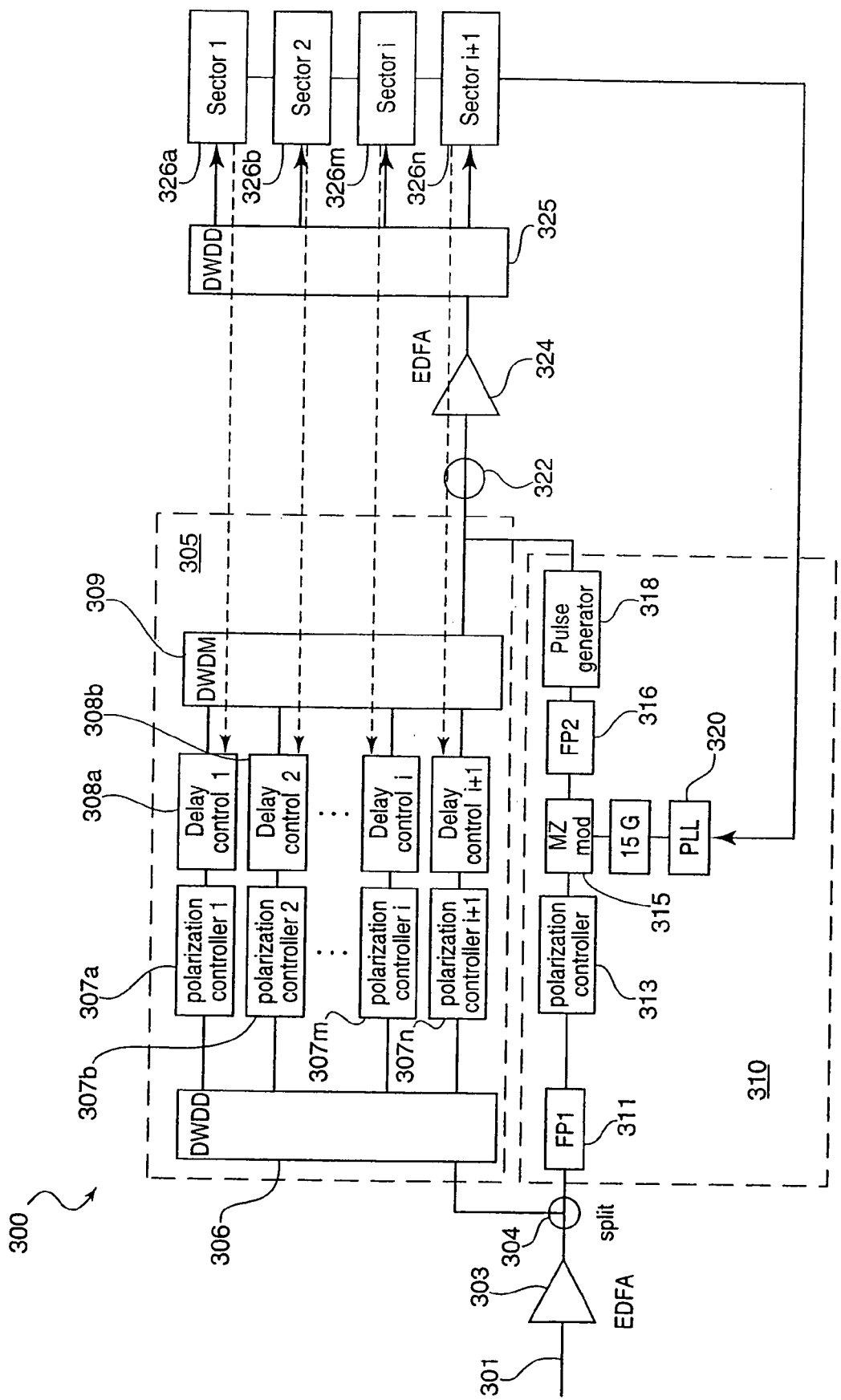
FIG. 10 is a block diagram of an embodiment of a receiver for multiple DWDM channels that incorporates pulsed carrier generation and per channel delay management according to the present invention.

FIG. 10 shows an embodiment of a receiver for multiple DWDM channels that incorporates pulsed carrier generation and per channel delay management. As described in prior application Ser. No. 09/871,216, because of the wide frequency bandwidth used in DWDM systems, the small dependence of PMD on frequency becomes magnified, and each DWDM channel is subject to slightly different PMD. To effectively counter the separate PMD for each channel, per channel polarization state management is used to separately adjust the polarization state of each DWDM channel. In FIG. 10, receiver 300 receives an optical data signal via optical fiber 301. The signal from the fiber 301 is input through optical amplifier 303 and then split at splitter 304 into an upper channel, which delivers a portion of the signal to a per-channel polarization state management section 305, and a lower channel which delivers a second portion of the optical data signal to a carrier management section 310.

The per-channel polarization state management section 305 includes a DWDM demultiplexer 306, which breaks the input optical data signal into i+1 frequency channels, each channel input to a respective polarization controller $307_1$, $307_2$ ... $307_{i+1}$. Each polarization controller $307_1$, $307_2$ ... $307_{i+1}$ fixes the polarization state of the respective input channel with respect to a central polarization state of the composite optical data signal. The output from each polarization controller $307_1$, $307_2$ ... $307_{i+1}$ is input to a respective delay controller $308_1$, $308_2$ ... $308_{i+1}$, which modifies the delay of each channel with respect to a pulsed carrier signal as described above with respect to FIG. 8. Output from each delay controller $308_1$, $308_2$ ... $308_{i+1}$ is fed to an input of a DWDM multiplexer 309 which multiplexes the separate signals into a composite modified data signal.

The carrier management section 310 includes a FP filter 311 that passes carrier signals spaced apart by a selected frequency spacing, such as 100 GHz or 50 GHz, and filters out the data bands of the optical data signal. The carrier signals are then input to an infinite-range polarization controller 313 which fixes the polarization state of each carrier. The infinite-range polarization controller 313 outputs to an MZ modulator 315 that locally generates 15 GHz side bands off each of the carriers. The combined signal composed of carrier signals and side carriers is fed to another FP filter 316 which filters the carrier signals and passes the side carriers. The side carriers are then passed to a pulse generator 318 which generates QRZ pulse trains off of the side carriers.

The pulsed side carriers are then combined with the composite modified data signal at combiner 322. The combined signal is amplified at optical amplifier 324 and fed to another DWDM demultiplexer which separates the channels, each channel input to one of an array of detectors $326a$, $326b$ ... $326_{i+1}$. As discussed above with respect to the embodiment of FIG. 8, the detectors $326a$, $326b$ ... $326_{i+1}$ provide feedback to a phase-locked loop 320 in the carrier management section 310, which controls the phase during side carrier modulation. In addition, each detector $326a$, $326b$ ... $326_{i+1}$ provides feedback to the corresponding delay controller 308a, 308b ... 308$_{i+1}$ for the respective frequency channel which determines the correct delay to match the data signal timing with respect to carrier pulse timing for separable detection as discussed above with respect to FIG. 9.

Figure 19:
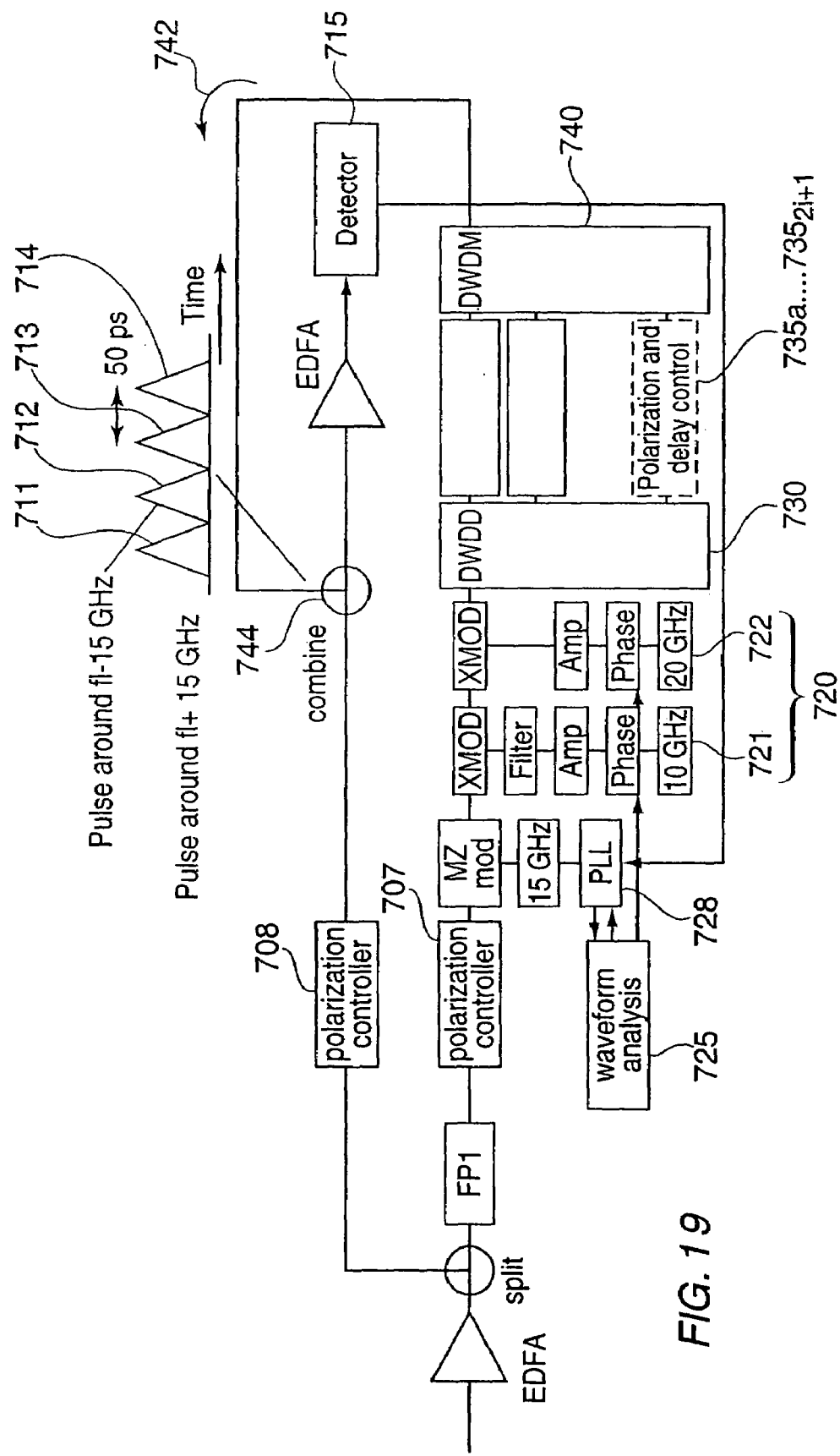
FIG. 19 is a block diagram of an embodiment of a receiver for multiple DWDM channels in which the base data rate input to the detector is doubled according to the present invention.

The receiver of FIG. 19 uses the additional per carrier polarization and delay management discussed with respect to FIG. 10, and furthermore, doubles the base data rate input to the detector. For example if the base data rate is 10 Gbps then the output to the detector is 20 Gbps. In the receiver of FIG. 19, an incoming signal is amplified, split into data (upper) and carrier (lower) portions and input to respective infinite range polarization controllers 708, 707 as in the receivers of FIG. 8 and FIG. 10. In addition, as in the foregoing embodiments, the carrier signal in the lower branch is input to a 15 GHz modulator 728 which generates side carriers centered in the middle of the data bands of the incoming signal. As noted above, for each central frequency f1, two side carriers f1−15 GHz, f1+15 GHz are created. However, instead of generating sharpened pulsed carriers using 5 GHz and 10 GHz modulators in series, in FIG. 19, the carrier signal is input first to a double-rate pulse generator 720 consisting of a 10 GHz modulator 721 followed in series by a 20 GHz pulse-sharpening modulator. The output of the double-rate generator 720 is a pulse train with pulses every 50 picoseconds. This pulse train is schematically illustrated as pulses 711, 712, 713, and 714 shown at the top of the figure. The output pulse train is input to a DWDM demultiplexing device 730 which demultiplexes the signal into a plurality of interleaved frequency channels. The smaller-bandwidth channels provide for the upper and lower side carriers (f1±15 GHz) to be separated from each other into adjacent channels. As shown in FIG. 19, each separated channel is input to a respective polarization and delay controller 735a, 735b ... 735$_{2i+1}$. Adjacent controllers e.g., 735a, 735b each receive one of the side carrier channels generated off a central frequency and adjust the polarization state of the side carrier signal to match the polarization state of the data band using feedback from the detector 715. For example, 735a may receive f1+15 GHz and 735b may receive f1−15 GHz.

To double the effective data rate, one of each pair of adjacent polarization and delay controllers, for example, 735b, 735d, 735f ... 735$_{2N}$ delays the carrier signal 50 picoseconds with respect to the carrier signal in the other adjacent channel. The pairs of adjacent channels are then multiplexed in DWDM multiplexer 740 and output as a combined signal 742 to a combiner 744. The pulse train of output signal 742 is shown in the pulse train 711, 712, 713, 714. Because of the 50 picosecond delay between adjacent channels, pulses 711, 713 contain the carrier f1+15 GHz (and other carriers fn+15 GHz) while pulses 712, 714 contain the carrier f1−15 GHz (all other carriers fn−15 GHz). This scheme is characterized by the fact that every 50 picoseconds one set of carriers, e.g. the set of carriers fn+15 GHz above the central frequency, goes into an "on" state and the adjacent state goes into an "off" state. When the alternatingly on/off carrier pulses are combined with the data signal in 744 and output to the detector 715, in any given 50 picosecond period the detector can detect the data centered at the "on" carriers. For example, at time t1, the carrier signals fn+15 GHz may be "on", so when this signal mixes with the data (in the same polarization) state, the data bands centered at fn+15 GHz can be detected while the data bands centered at fn−15 GHz remain undetected. At time t1+50 ps, the carriers at fn+15 GHz turn off and the carriers at fn−15 GHz turn on and mix with the data bands centered at fn−15 GHz. Therefore, for each channel (neglecting for the moment I and Q channels in quadrature), the detector detects one of the databands in each 50 ps period, providing a data rate of 1 bit/50 ps=20 Gigabits per second.

If on the transmission side the adjacent data streams are interleaved with the same 50 ps relative delay then the receiver carrier pulse streams can be made to coincide with the data valid time in the received bit pattern. In this case a signal is properly detected when the corresponding carrier is on. In alternate implementations the data delay can be controlled on a per channel basis in the receiver. In addition, two or more pulse generators can be included in the receiver to generate different timing for each carrier pulse stream.

Figure 13:
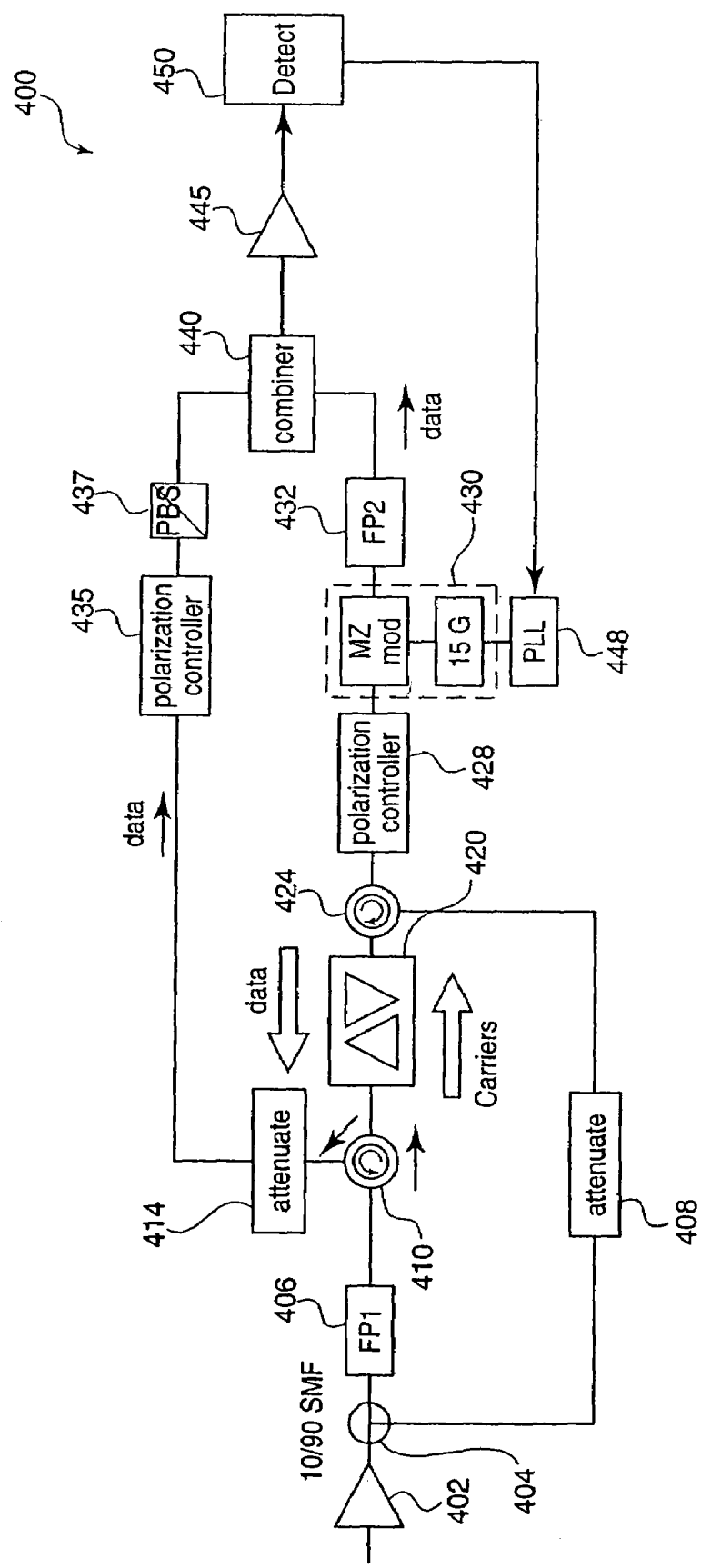
FIG. 13 is a block diagram of a receiver which incorporates a bi-directional erbium-doped fiber amplifier to reduce fringe interference according to the present invention.

FIG. 13 shows an another embodiment of a receiver according to the present invention which has the advantage of reducing fringe interference caused by variable optical phase delay in fiber amplifiers. This makes it possible to amplify carriers and data with an adjustable amount of relative gain without generating damaging fringing effects. In addition, because transmitting pulsed carriers in QRZ format reduces the power of the carrier signal on the transmission side, the ability to amplify carriers on the receiver side without detrimental effects is particularly beneficial when applied to QRZ transmission systems.

In FIG. 13, a receiver 400 receives an input optical data signal to an EDFA 402, which boosts the entire signal (data+carrier) equally. The amplified input signal is split after the first EDFA 402 at a 10/90 splitter such that majoritty of optical power is transmitted to FP filter 406 which passes the carrier signals and filters the data bands. The portion of the optical data signal carrying the data bands is routed through an attenuator 408 which further reduces the power of data-carrying portion of the signal. The carrier signal passed by the FP filter 406 is input to a counter-clockwise circulator 416 which routes the carrier signal to a bi-directional EDFA 420 having an optical path length x, which can be in the range of 20–40 meters long. As the carrier signal is transmitted in a forward direction (and amplified) through the bi-directional EDFA 420, the data-carrying signal output from 408 is routed via circulator 424 through the bi-directional EDFA 420 in a backwards direction. The data signal is amplified in the bi-directional EDFA 420, but after being routed upwards at the circulator 416, is further attenuated at attenuator 414. The combined effect of the attenuators 408, 414 in the optical path of the data signal is to cancel the amplification effect of the bi-directional EDFA 420 on the data signal, so that only the carrier signal is actually amplified. Since the optical path length x of the bi-directional EDFA 420 comprises the significant portion of the optical paths traveled by the data signal and the carrier signal, the optical paths lengths of the data signal and the carrier signals are equal since they both pass through the bi-directional EDFA 420. Because the data and carrier signals have the same optical path lengths, they incur the same amount of optical delay which eliminates fringing effects caused by differences in optical delay. The result is that a portion of the input signal spectrum is amplified with respect to the other in a fiber amplifier, without the fiber amplifier contributing to optical phase delay of the amplified portion with respect to the non-amplified portion.

The amplified carrier signal is routed by circulator 424 to a polarization controller 428 that fixes the polarization state of the carrier signal. The output from the polarization controller 428 is delivered to a 15 GHz side carrier generator 430 and then passed to a FP filter 432 which transmits the side carriers located at the center of the data bands in the data signal and filters out the original carriers. After being attenuated at attenuator 414, the data signal is passed signal to a polarization controller 435 and then to a polarization beam splitter 437 that match the data polarization state to the carrier polarization state. The data and carrier are combined at combiner 440, amplified at EDFA 445, and then mixed to generate a detector signal. Feedback from the detector 450 is used to control the PLL 448 in the carrier generator.

Figure 14A:
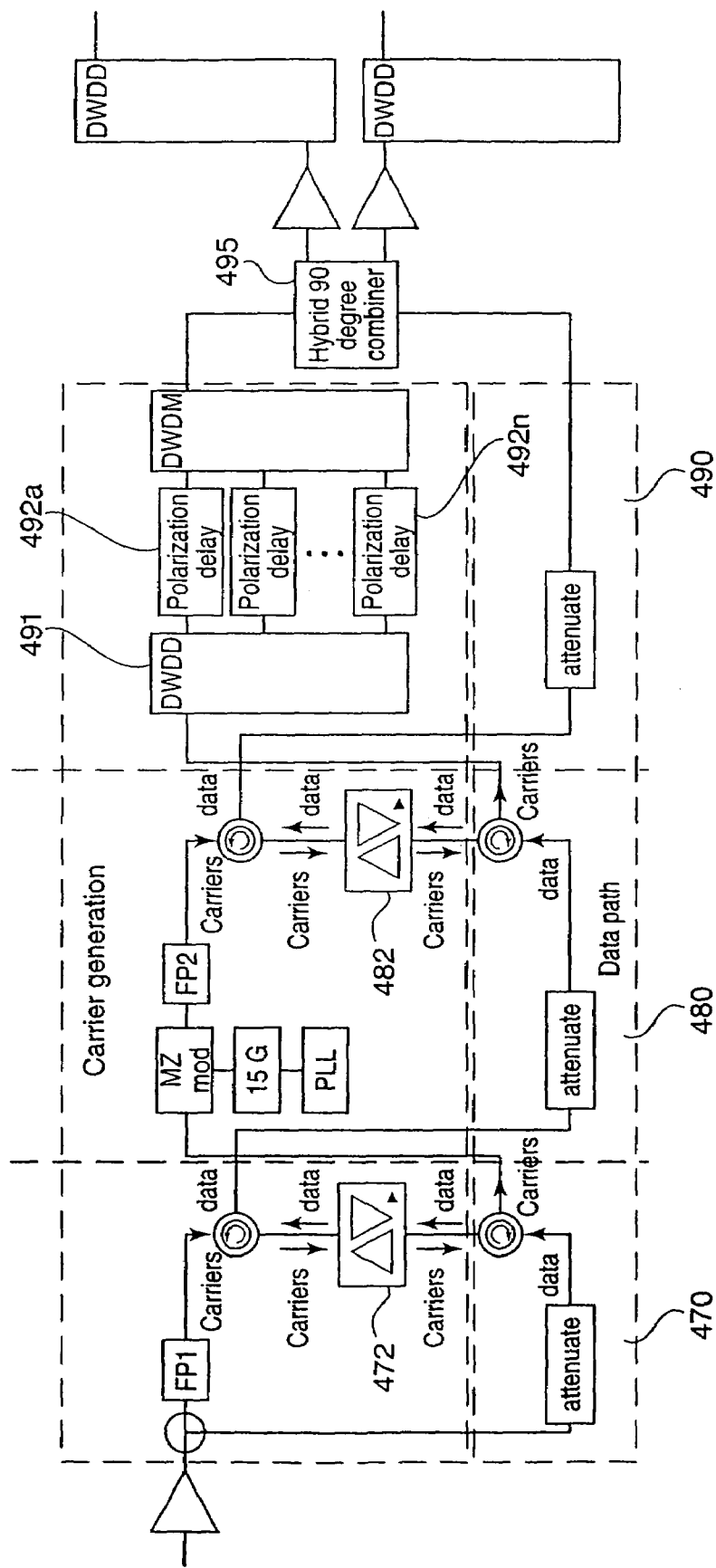
FIG. 14A shows an additional embodiment of the receiver using bi-directional EDFA amplification (FIG. 13) in which carrier signal and data signal paths are differentiated.

FIG. 14A shows an alternative implementation of the receiver using bi-directional EDFA amplification in which the carrier signal and data signal paths are differentiated to a greater degree to facilitate a system-level DWDM approach. According to this embodiment, in a first stage of the receiver 470, all incoming channels are amplified, then separated into respective carrier and data signal paths, the data signal is attenuated in the data path, and then both the data signal and the carrier signal are passed through a bi-directional EDFA 472. In a second stage 480, the carrier signal is modulated in the carrier path, while the data signal is again attenuated in the data path, both carrier and data signals are amplified again in a second bi-directional EDFA 482. In a third stage 490, the data signal is attenuated a third time in the data path, and the carrier signal is demultiplexed at 491 into multiple separate channels. Each channel is input to a polarization and/or delay controller 492a, 492b . . . 492n which matches PMD of the separated side carriers. The side carriers are then multiplexed at 493 in the optical path and input to a hybrid 0/90 degree combiner 495. The data path also enters the hybrid 0/90 degree combiner, allowing the data signal and the modified side carriers to be combined.

Figure 14B:
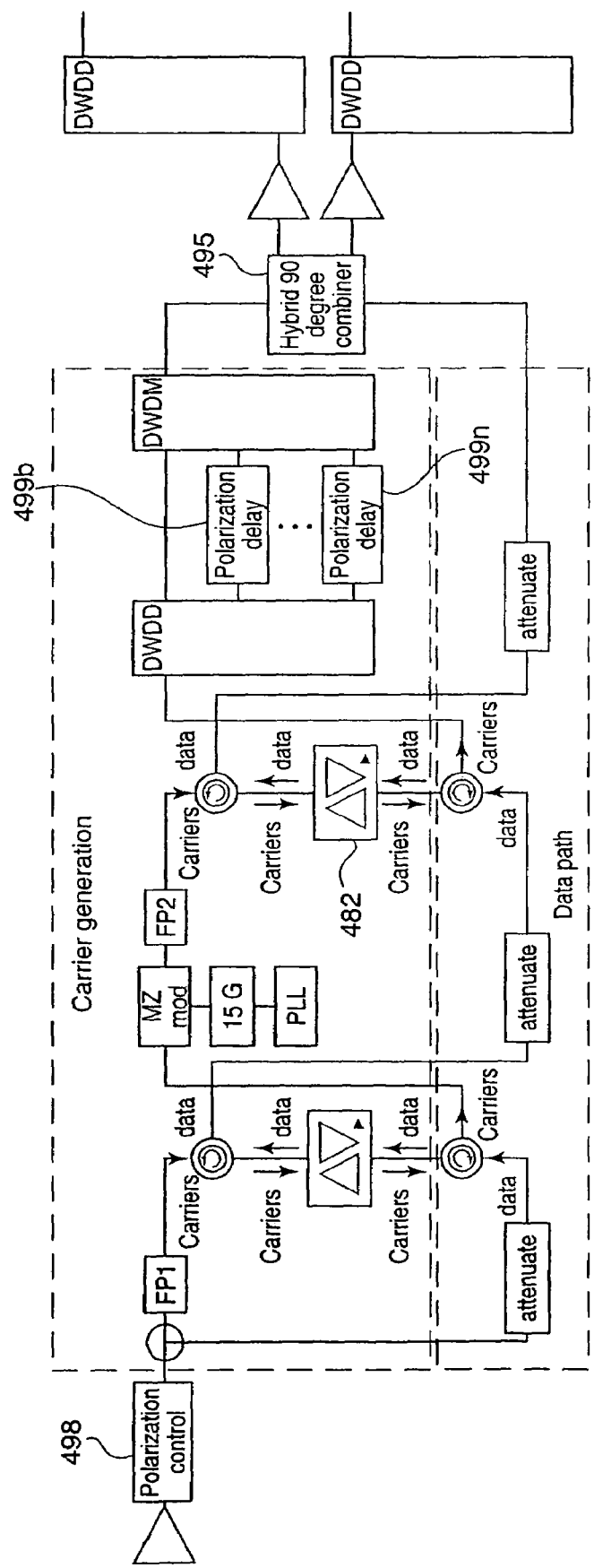
FIG. 14B shows an additional embodiment of the receiver shown in FIG. 14A which employs an input stage infinite-range polarization controller according to the present invention.

FIG. 14B shows a modification of the embodiment of the receiver shown in FIG. 14A. In FIG. 14B, the received optical data signal is first input to an "infinite range" polarization controller 498 that fixes a polarization range of the entire input signal. By using a polarization controller upfront in this manner, the polarization controllers 499a, 499b . . . 499n may be simplified because their effective range can be limited in accordance with the fixed phase range set by the infinite range polarization controller 498.

Figure 20:
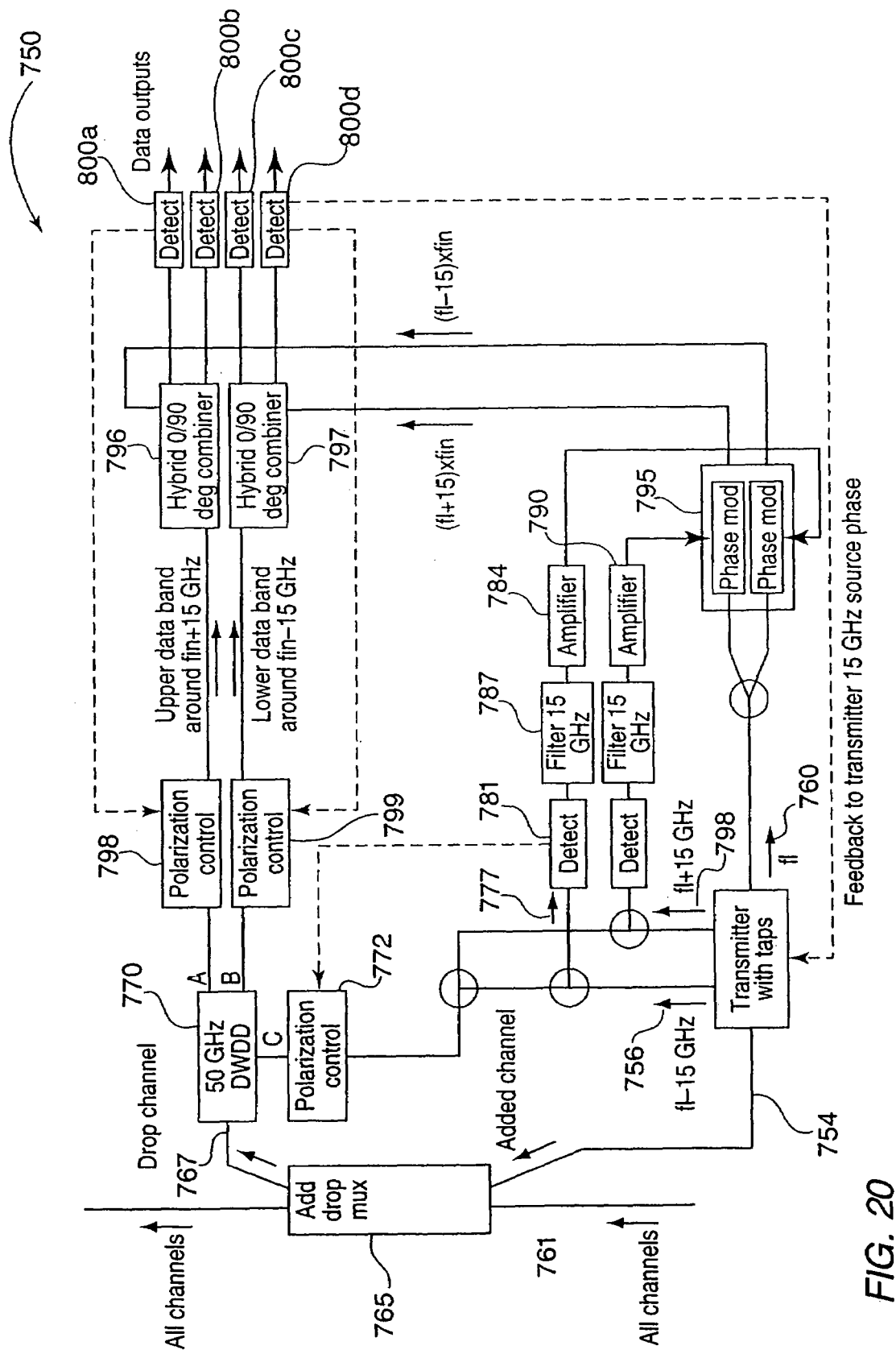
FIG. 20 is a block diagram of a single channel receiver system according to an embodiment of the present invention.
Figure 21:
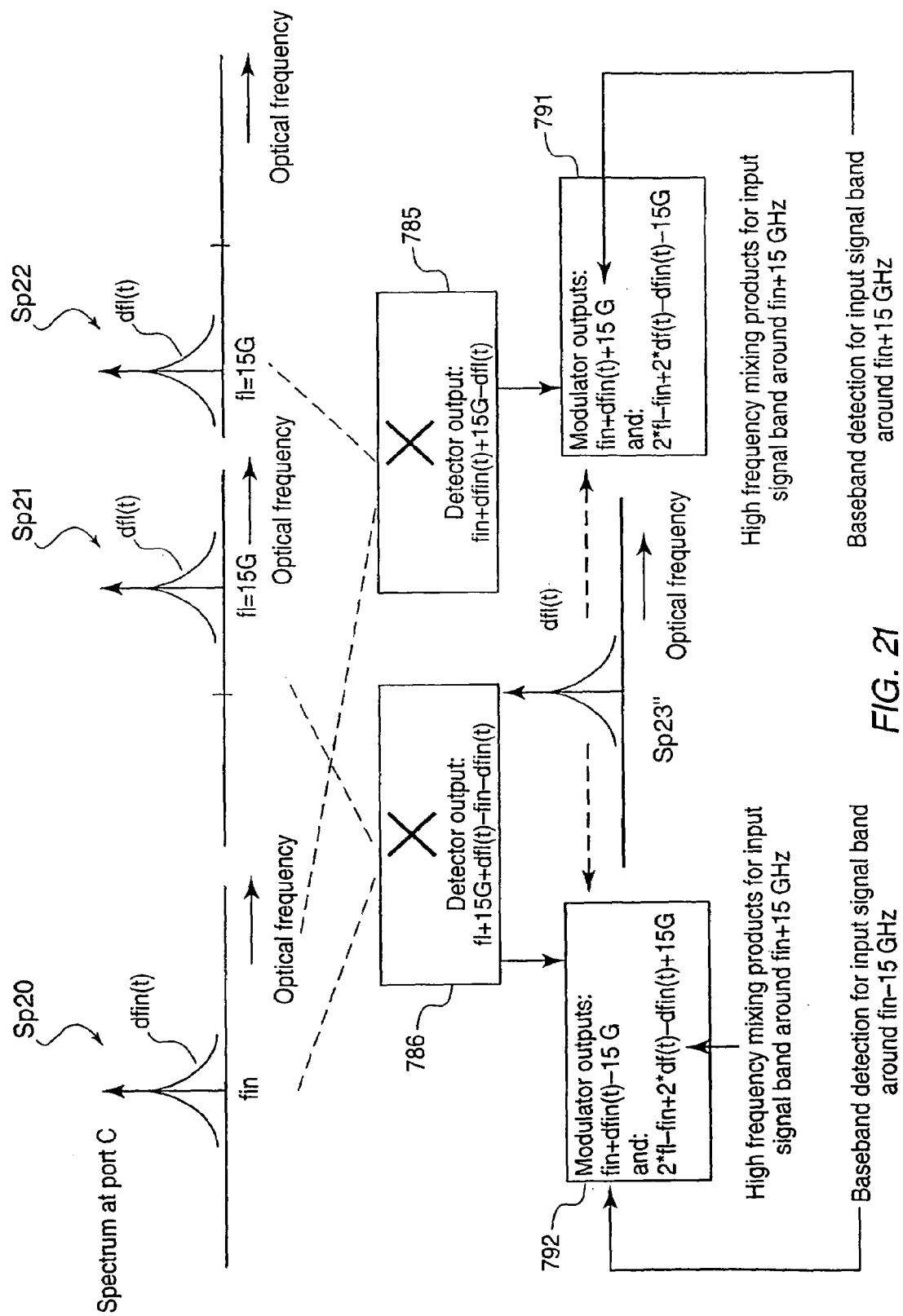
FIG. 21 schematically illustrates the mechanism for phase noise cancellation in the receiver of FIG. 20.

FIG. 20 illustrates a single channel receiver system 750 which provides another technique for obtaining a homodyne optical carrier signal at the receiver with phase noise cancellation. The system includes a carrier generator/transmitter 752, which may be of the type shown in FIG. 17A. The transmitter 752 includes splitters and taps to separately output, from a laser, optical frequency f1 through path 760, f1−15 GHz through path 756 and f1+15 GHz through path 758. In addition, the transmitter 752 transmits each of f1, f1−15, and f1+15 along optical path 754. Both optical path 754 and a multi channel DWDM signal stream 761 are fed into a modified add drop multiplexer 765 which splits out a single drop channel, centered near f1, along drop path 767. Importantly, the channel that is split off from the DWDM stream is centered at a frequency fx where fx is close to, but not necessarily equal to, f1. The signal in the drop channel 767 includes both the dropped DWDM channel frequencies and the transmitter output from path 754. This combination is first passed through a 50 GHz optical splitter 770 that separates upper and lower frequency bands into outputs A and B and the non-passed frequencies are fed to output C. The spectrum at Output C, shown at Sp20 in FIG. 21, includes the frequency fx with a time-dependent phase noise contribution dfx(t). This output is fed through a polarization controller 772, split at splitter 774, and then combined with the f1−15 GHz into signal 777 and combined with f1+15 GHz into signal 778 from respective optical paths 756 and 758. The spectra of the signals on optical paths 756 and 758 are shown in spectra Sp22 and Sp21 respectively. Each of Sp21 and Sp22 shows a phase noise contribution df1(t) acquired from the transmitter 752. Combined signals 777 and 778 are fed to respective detectors 781 and 782. The output from detector 781 is shown in box 785 in FIG. 21 and the output from detector 782 is shown in box 786 in FIG. 21. The detector outputs in boxes 785, 786 show the contributions from f1, fx, 15 GHz components, and phase noise contributions dfx(t) and df1(t). The detector outputs are then fed to 15 GHz filters 787, 788 which select out the 15 GHz components in the detected signal for amplification. It is noted that the other components in the detector output are also passed, but not amplified. The detectors 781, 782 also provide feedback to the polarization control circuit 772 to ensure maximum detection.

The 15 GHz signals from filters 787, 788 are used to drive phase modulator block 795 that includes two phase modulators. The center frequency f1 from transmitter 752 is also input to the phase modulators block 795 via optical path 760. The spectrum of the of this input is shown in Sp23. The phase modulator block modulates the input from optical path 760 with the 15 GHz signals supplied from amplifiers 789, 790. The dual output from the phase modulators, shown in blocks 791, 792 of FIG. 21, include fx+dfx(t)±15 GHz and high-frequency mixing products around fx±15 GHz. Hence, the phase noise of the input signal, dfx(t) is exactly replicated at frequencies located exactly in the center of the data bands to be detected, i.e., fx±15 GHz. Base band detection is possible, despite the high-frequency mixing products because these frequencies are located far away from the data bands and therefore generate only high frequency signals when detected. These high frequencies can be rejected by the limited frequency response of the detector itself or by including an electrical filter following the detector. Such filters can be low-pass filters, for example.

The dual outputs of the phase modulators fx+/−15 GHz are fed to respective 0/90 degree hybrid combiners 796, 797. Outputs A and B, which carry the respective data bands centered at fx+15 GHz and fx−15 GHz also supply hybrid combiners 796, 797. The data signals are fed through polarization controllers 798, 799 which receive feedback from detectors 800a, b, c, d at the output of the 90 degree hybrids. The hybrid detectors provide for quadrature detection by the 90 shifts applied to the carrier signals. The 4 detectors 800a, b, c, d provide 4×10 GBs output streams. The 15 GHz source in the transmitter 752 can also be coupled to the outputs from detectors 800a, b, c, d to ensure phase lock between the transmitters and receivers in this system.

Figure 22:
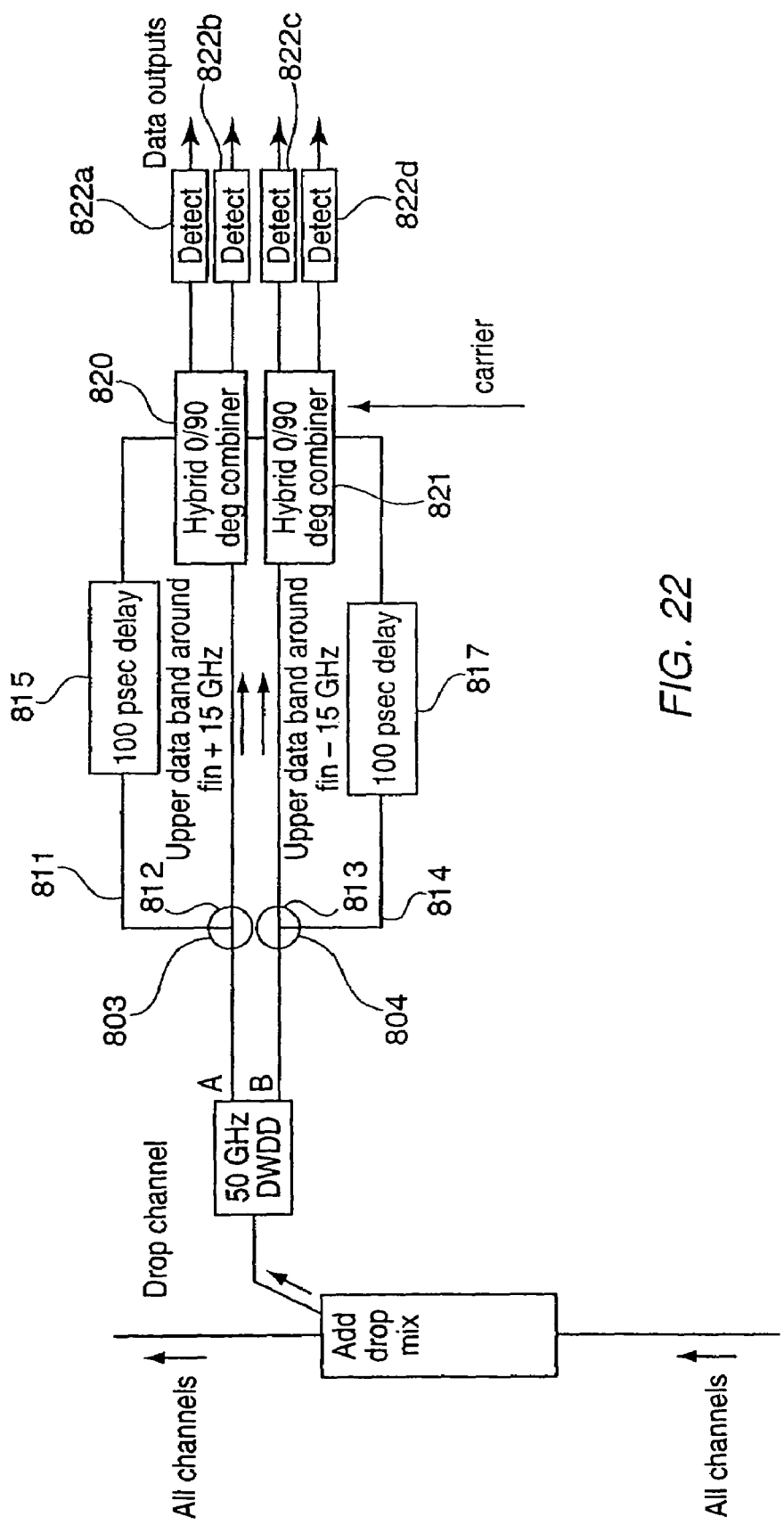
FIG. 22 is a block diagram of an autocorrelation single drop receiver according to an embodiment of the present invention.

An alternative method of reception that uses autocorrelation to cancel phase noise is shown in FIG. 22. This alternative technique has the advantage that it can be implemented simply without many optical components because there is no manipulation of carrier signals. The relative disadvantage of this approach is that because carrier signals are not used to detect phase data, signal-to-noise ratios cannot be boosted by amplifying the carrier signal.

In FIG. 22, as in FIG. 20, a data signal is picked off by an add-drop demuliplexer and passed through a 50 GHz DWDM demultiplexer, which separates upper and lower data bands. The upper and lower data signal outputs are split at respective splitters 803, 804 into two sub-branches, the upper output being split into sub-branches 811, 812 and the lower output being split into sub-branches 813, 814. Sub-branch 811 is input to a 100 picosecond delayer 815 and sub-branch 814 is input to a separate 100 picosecond delayer 817. Each picosecond delayer effectively generates a delayed version of the input data signal. The outputs from the delayers are each fed to a respective hybrid 0/90 degree combiner 820, 821. Sub-branch 812 is input directly into hybrid combiner 820 and combined with the delayed version of itself from delayer 815. Similarly, sub-branch 813 is input directly to combiner 821 and combined with the output from delayer 817. Each hybrid combiner 820, 821 outputs I and Q data signals to detectors 822a, b, c, d. The I signals correspond to combined signals of data symbols with previous data symbols, and the Q signals correspond to combined signals of data symbols with previous data symbols with a 90 degree phase shift. At the detectors, the delayed data signals are mixed with the undelayed data signals. Since the delayed and undelayed signals have equal phase noise, the mixing action at the detectors cancels the phase noise. The value of the detected data symbols depends upon the relative-optical phase difference between data symbols and previous data symbols, which can be 0, 90, 180 or 270 degrees.

Figure 23:
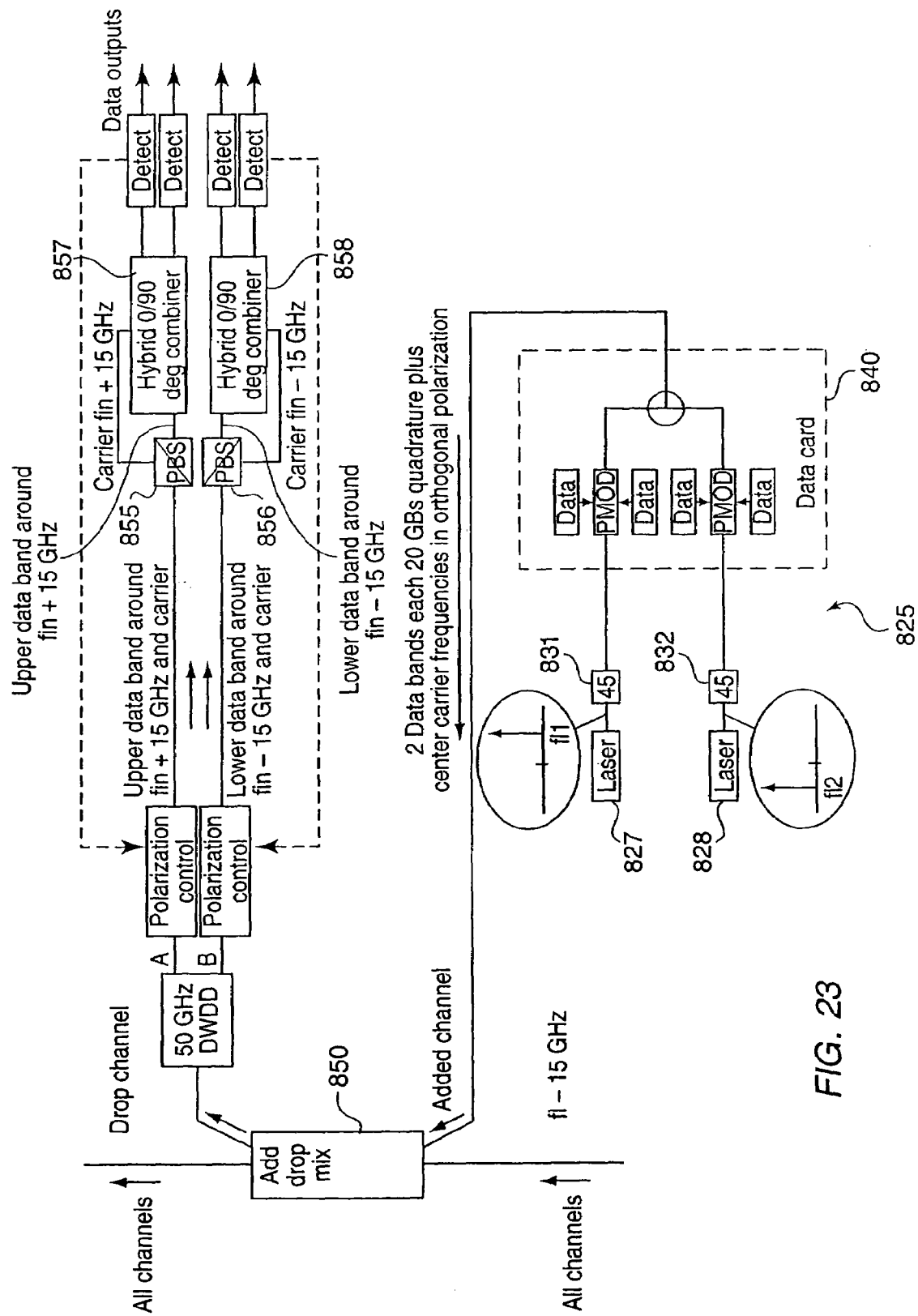
FIG. 23 is a block diagram of an embodiment of a transmitter/receiver system that employs orthogonal polarization of carrier and data signals according to the present invention.

FIG. 23 shows a transmitter/receiver system that employs orthogonal polarization of carriers to separate I and Q channels and to cancel phase noise. In FIG. 23, at a transmitter 825, a first laser 827 transmits a laser at frequency fl1 in x-polarization state to a 45 degree polarization rotator 831, while a second laser 828 transmits a laser at frequency fl2 in x-polarization state to a second 45 degree polarization rotator 832. The polarization rotators 831, 832 as their name suggests, rotate the polarization of the lasers at fl1, fl2 by 45 degrees with the result that the laser signal has equal projections in the x and y directions. The lasers are input to a data card 840 having two phase modulators which imprint data bands in quadrature onto each of the laser frequencies in x-polarization. Since the phase modulators are relatively inefficient in modulating the orthogonal y-polarization, the components of each laser frequency in y-polarization pass through the data card in an unmodulated state. Therefore, the transmitted signal contains data bands at fl1 and fl2 in x-polarization and an unmodulated carriers at fl1 and fl2 in y-polarization.

The data signal and carrier signal are fed as an added channel to an add-drop multiplexer/demultiplexer 850 and then dropped at a 50 GHz DWDM filter that splits the data band at fl1 (at A) from the data band at fl2 (at B). The output at A contains the upper data band centered around a channel center frequency fx+15 GHz in a first polarization state (derived from x-polarization) plus the carrier signal at fx+15 GHz in a second polarization (derived from y-polarization) and the output at B contains the lower data band centered around the channel center frequency fx−15 GHz in the first polarization state plus the carrier signal at fx−15 GHz in the second polarization state. The output from A and B are passed through polarization controllers (as described above, provided with feedback from the detectors) which align the first and second polarization states with the orthogonal polarization states of respective polarization beam splitters 855, 856 to which the output signals are in turn delivered. The polarization beam splitters 855, 856 pass the data bands in the first polarization state along first paths (shown as horizontal paths) to first inputs of respective hybrid 0/90 combiners 857, 858. The beam splitter 855, 856 also split out the carrier components in the second polarization state from the data signal and shift these carrier components from the second polarization state to the first polarization state. These separated carrier signals are input to second inputs of the respective hybrid 0/90 combiners. At the hybrid 0/90 degree combiners 857, 858, a portion of the carrier signals (at fx±15 GHz) are phase-shifted by 90 degrees and the remaining portion is not shifted. The zero-degree and 90-degree shifted carriers are sent to different (I,Q) outputs of the hybrid 0/90 combiners and recombined with the data signals. The transmitter/receiver of FIG. 23 advantageously accomplishes homodyne reception of a DWDM channel by separate processing of carrier signal and data signals using orthogonal polarization as a method of means to distinguish between the carriers and the data bands.

Figure 24:
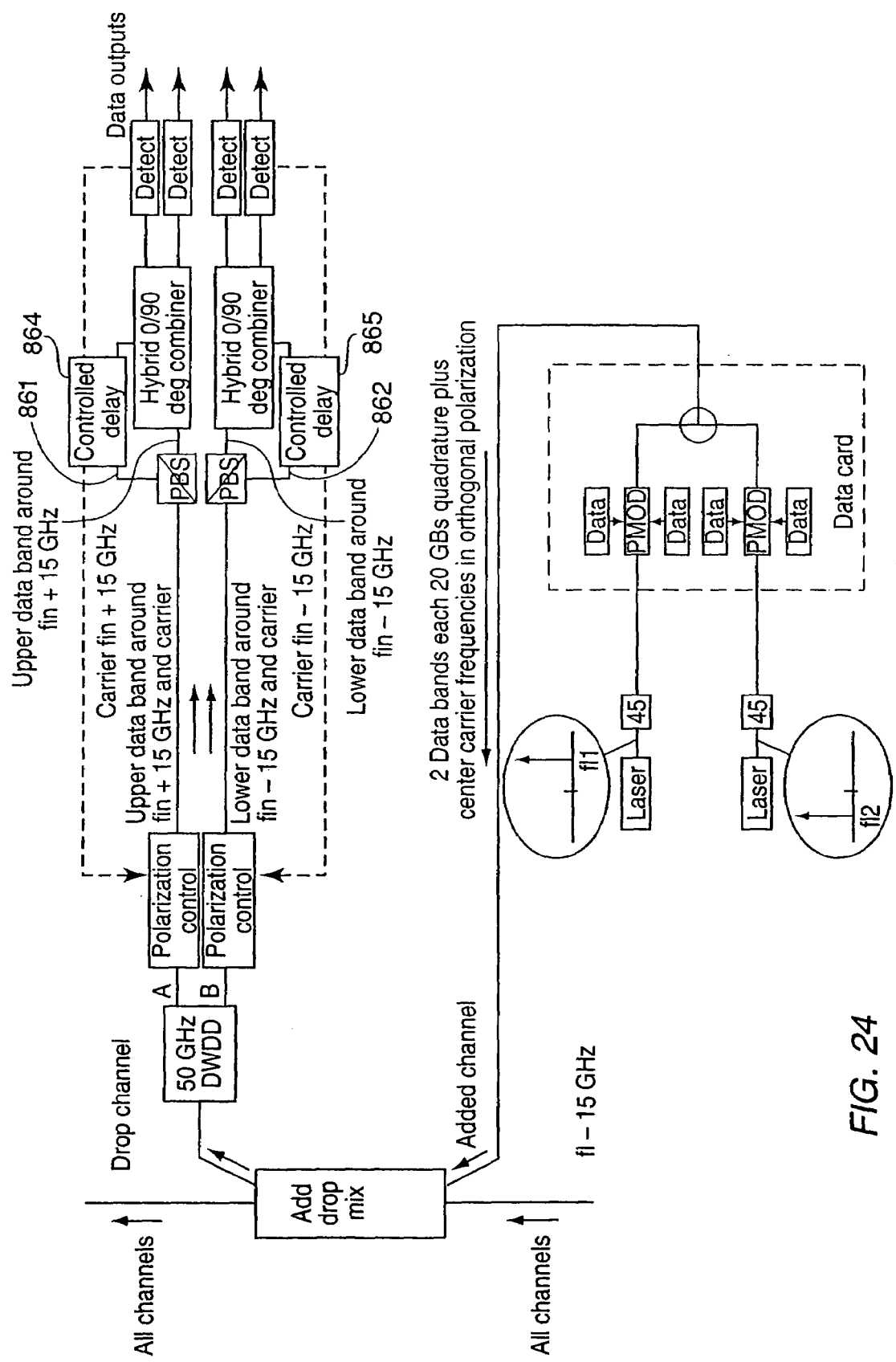
FIG. 24 shows an additional embodiment of the transmitter/receiver system of FIG. 23 that incorporates carrier delay management according to the present invention.

FIG. 24 depicts an additional embodiment of the transmitter/receiver of FIG. 23 including the feature of carrier delay management used to compensate for any differences in delay between the first and second polarization states caused by PMD. The delay difference caused by PMD alters the original relationship between the carrier and data signals. As indicated in the figure, delay controllers 864, 865 are placed in the second optical paths 861, 862 between the splitter outputs of the polarization beam splitters and the second inputs of the hybrid 0/90 combiners. In this position, the delay controllers receive only the carrier signals from the polarization splitters and alter the carrier delay, or phase, over a wide range to restore the original phase relationship between the carrier and data. Restoration of the original phase relationship between the carrier and data signals enables quadrature detection.

Figure 25A:
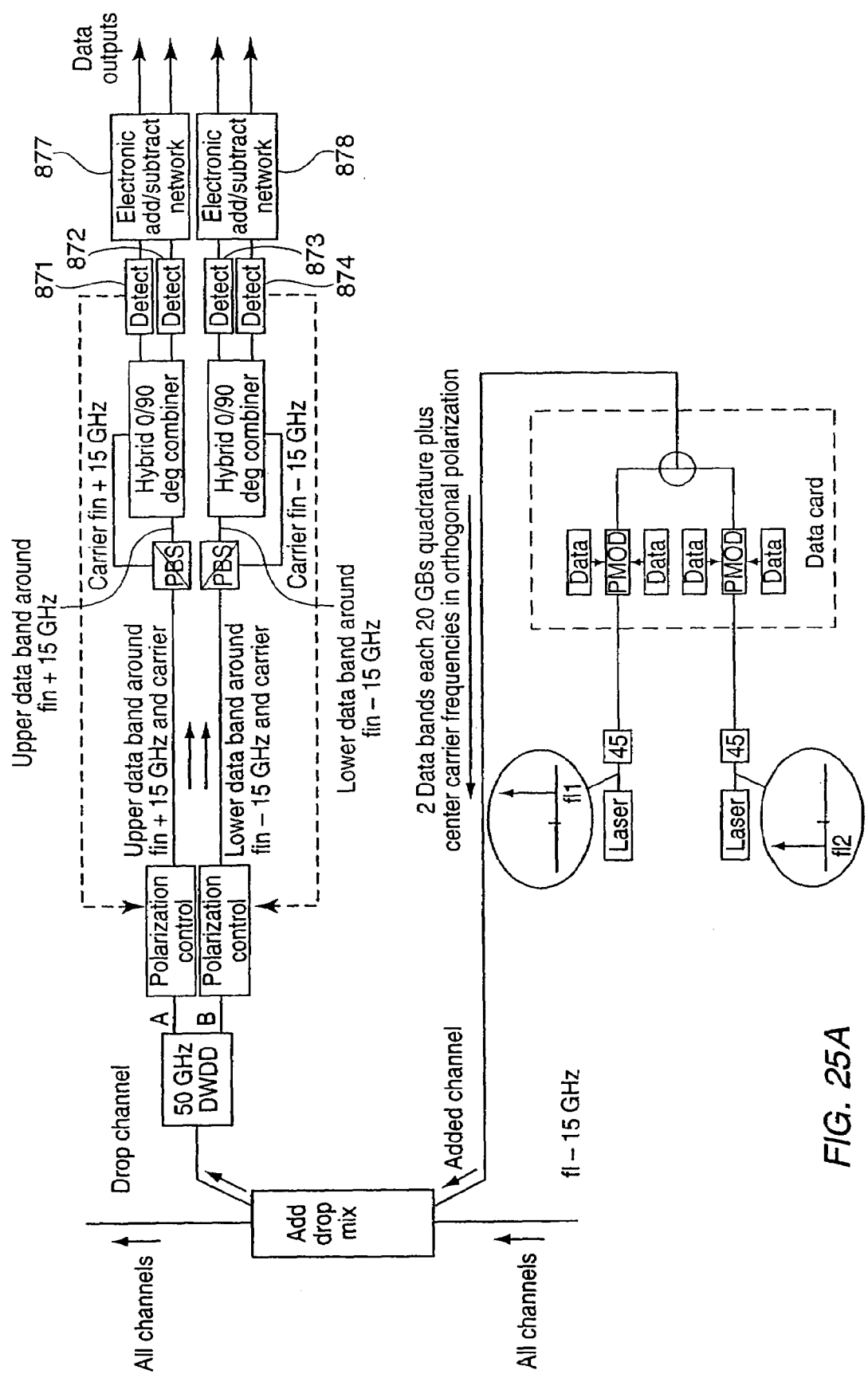
FIG. 25A shows a further embodiment of the transmitter/receiver system of FIG. 23 in which electronic phase management is employed in lieu of optical delay management according to the present invention.

In a further embodiment of the transmitter/receiver system of FIG. 23, shown in FIG. 25A, electronic phase management is employed in lieu of the optical delay management technique discussed above with respect to FIG. 24 to restore the original phase relationship between the carrier and data signals. As shown in FIG. 25A, electronic add/subtract networks 877, 878 receive as inputs the output from the paired detectors 871, 872, 873, 874. Due to the fact that the variation in carrier phase due to PMD can be visualized as a rotation of an I, Q constellation, as is known in the art, electronic compensation can be achieved by applying the following transform function to the input signals:

$$I = \cos(f)*\text{Input1} - \sin(f)*\text{Input2}$$

$$Q = \sin(f)*\text{Input1} + \cos(f)*\text{Input2} \quad (1)$$

where f is a rotation angle, Input1 and Input2 are the detector output signals, and I and Q represent the in-phase and quadrature output signals of the electronic add/subtract networks 877, 878. Significantly, the angle f can be adjusted without limitation over an infinite range to compensating for any degree of phase variation of the carrier signals.

Figure 25B:
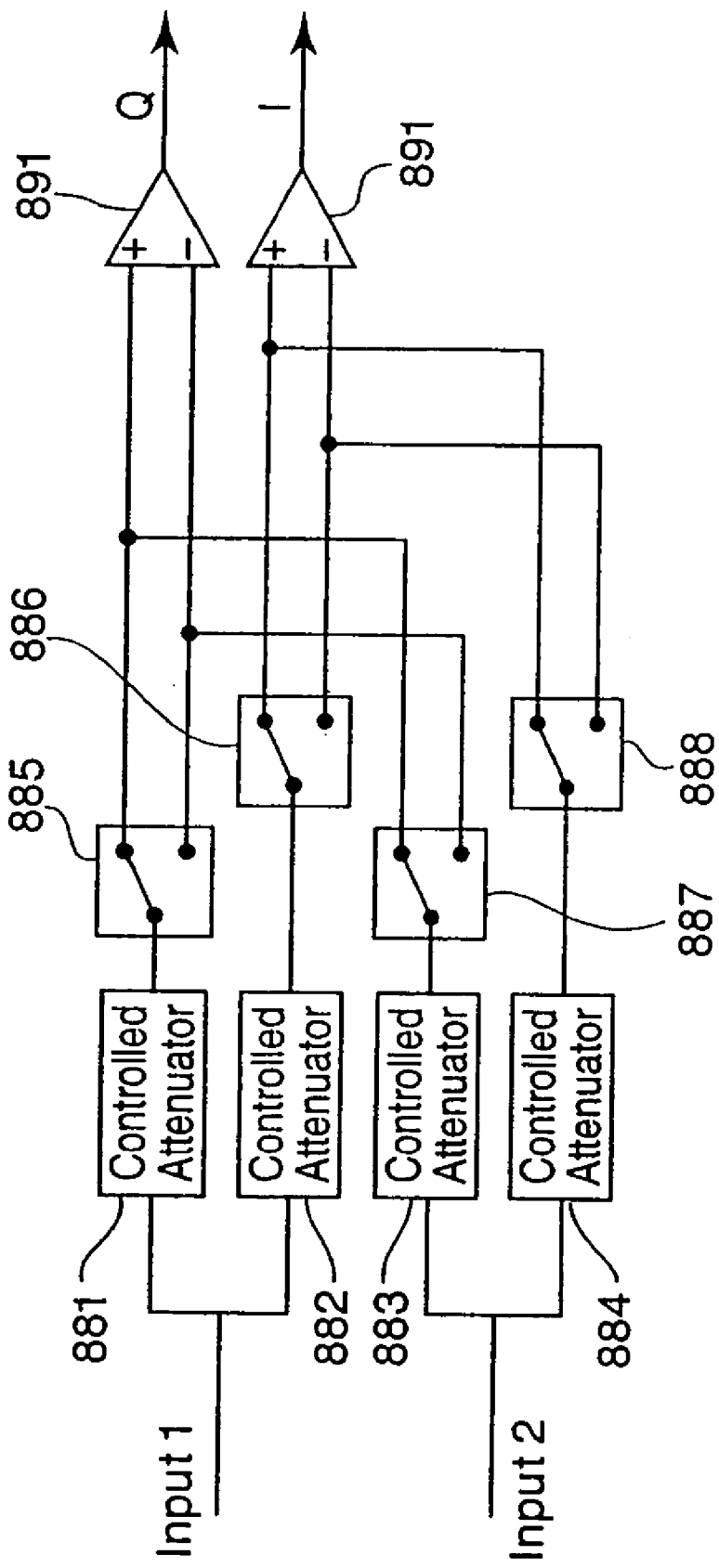
FIG. 25B shows an exemplary embodiment of an add/subtract network used in the transmitter/receiver of FIG. 25A.

FIG. 25B shows an exemplary embodiment of an add/subtract network used in the embodiment of FIG. 25A. Electronic Input 1 from a detector is divided into two channels, each channel being input to a respective controlled attenuator 881, 882. Similarly, electronic Input 2 from the other paired detector is also split and input to respective controlled attenuators 883, 884. The controlled attenuator 881 applies an attenuation factor A to the Input 1, which according to the implementation discussed above, is equal to the cosine of a rotation angle f. Output from the controlled attenuator is passed to a switch 885, which switches connection between the positive (non-inverting) and negative (inverting) inputs of a differential amplifier 891. In the embodiment shown, the pole switch 885 connects the output from the controlled attenuator 881 to the positive input of differential amplifier 891. Controlled attenuator 882 applies an attenuation factor C equal to the sine of the rotation angle f, and passes output to a further switch 886 which connects the output to either the positive (shown) or negative inputs of differential amplifier 892.

In like manner, controlled attenuators 883 and 884 apply sine (factor B) and cosine (factor D) functions to Input 2 respectively. The output of controlled attenuator 883 is passed to swich 887 and coupled to the positive and negative terminals of amplifier 891, while the output of controlled attenuator 884 is passed to switch 888 and coupled to the positive and negative terminals of differential amplifier 892. The sign of each of the attenuation terms is determined by the respective switches which direct the signals to either a non-inverting or inverting input of the differential amplifiers 891, 892. As depicted in FIG. 25B, switch 887 couples the output of controlled attenuator 883 to the inverting terminal of differential amplifier 891 so that the attenuating factor C (=sin(f)) is inverted and becomes a factor of −sine(f) as indicated above in equation (1).

Figure 26A:
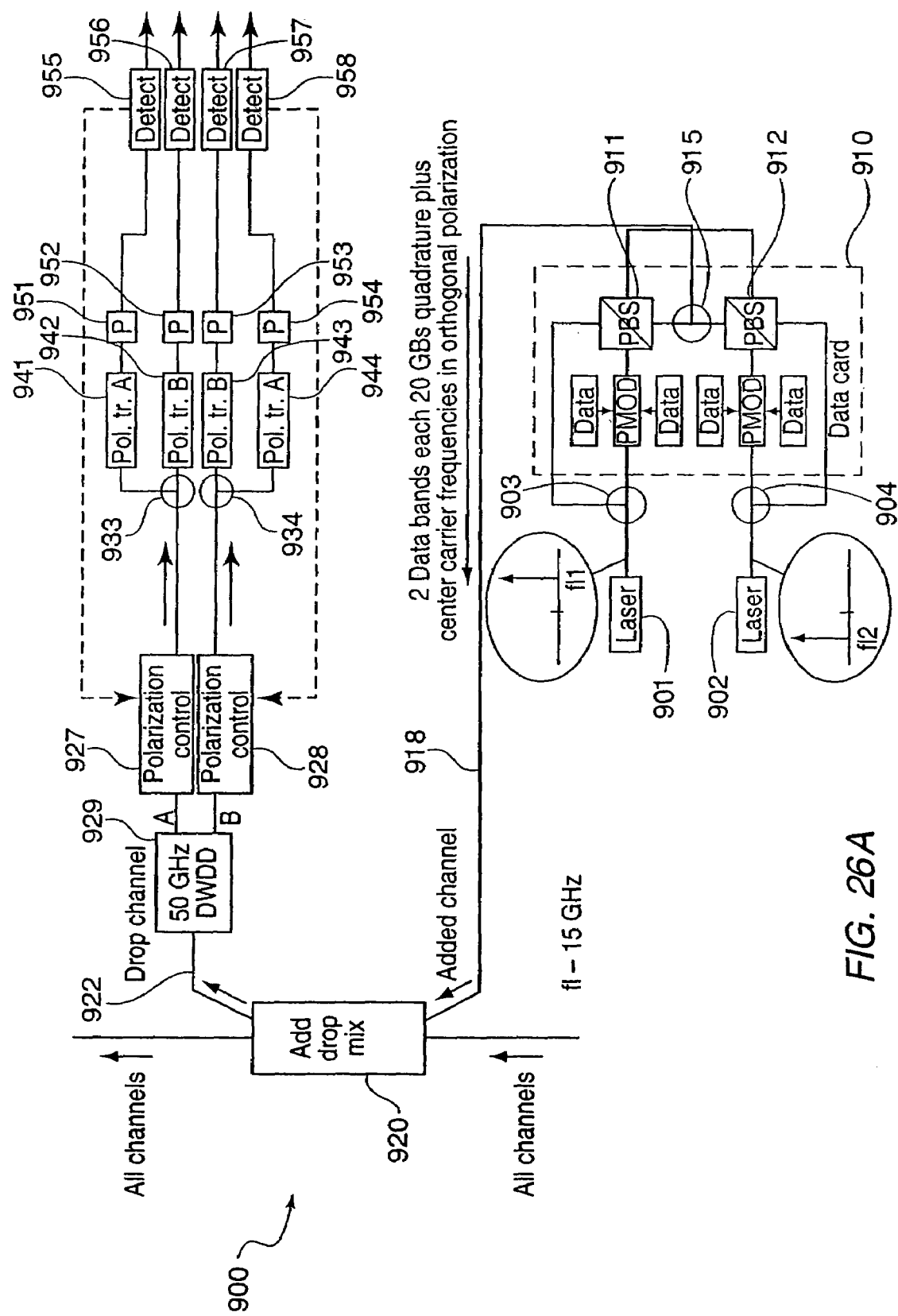
FIG. 26A shows a further embodiment of the transmitter/receiver system of FIG. 23 in which orthogonal carrier and data signals are transformed into outputs having the carrier and data at 0 and 90 degree relative phase shifts according to the present invention.

FIG. 26A depicts an embodiment of a transmitter/receiver system that, rather than using hybrid 0/90 degree combiners, employs a set of polarization beam splitters within the transmitter, and a set of polarization transformers in series with a set of polarizers in the receiver, to achieve detection of both I and Q streams by generating carrier signals in both 0 and 90 degree relative phase.

In FIG. 26A, two lasers 901, 902 emit laser carrier signals at respective frequencies f1 and f2 in an x-polarization state to splitters 903, 904. The carrier signals at the splitters 903, 904 are split, with both outputs of each splitter entering a data card, but with one of the outputs from each of the splitters being input to a data modulator, and the other outputs input directly to a second input of polarization beam splitters 911, 912. The data modulators imprint data streams onto the laser carrier signals and output data signals to the first inputs of polarization beam splitter/combinerss 911, 912. At polarization beam splitter/combiners 911, 912 the polarization state of the unmodulated carrier signals are shifted to an orthogonal y-polarization and then combined with the data signals which remain in x-polarization. The combined (carrier in y-pol+data in x-pol) outputs of both of the polarization beam splitter/combiners 911, 912 are in turn combined in optical combiner 915 and then transmitted along optical path 918. The optical path 918 is coupled to add/drop multiplexer 920 where the transmitted data+carrier signals are input as an added channel to a DWDM system. At the output of the add/drop multiplexer 920, the frequency band of transmitted data+carrier signal is dropped off in a drop channel 922 and then input to a 50 Ghz-wide demultiplexer which splits off the laser frequency f1 (and accompanying data) into channel A and the laser frequency f2 (and accompanying data) to channel B. Channel A is coupled to a first polarization controller 927 and channel B is coupled to a second polarization controller 928.

As in the other embodiments discussed above, electrical feedback from the detectors is used to control the polarization controllers 927, 928 that are used to align the orthogonal polarization states of the incoming data signal and the incoming carrier to a polarization transformation network 941, 942, 943, 944. The output of polarization controller 927 is split at splitter 933 in upper and lower branches, with the upper branch being input to an A-type polarization transformer 941 and the lower branch being input to a B-type polarization transformer 942. Similarly, the output of polarization controller 928 is also split at another splitter 934 into upper and lower branches, with the upper branch being input to an A-type polarization transformer 943, and the lower branch being input to a B-type polarization transformer 944. The polarization transformers of A-type 941, 943 maintain an identical phase between the incoming data signal and the incoming carrier signal, while the polarization transformers of B-type cause a 90 degree phase difference to be formed between the incoming data signal and the incoming carrier signal. Output from each polarization transformer 941, 942, 943, 944 is supplied to a respective polarizer 951, 952, 953, 954 at which the incoming data signals and the incoming carrier signals, which are mutually orthogonally polarized, are brought into the same polarization state. The outputs from the polarizers 951, 952, 953, 954 are delivered to respective detectors 955, 956, 957, 958. At the detectors following an A-type polarization transformer 955, 957, data signals are mixed with carrier signals having a zero degree phase shift, enabling detection of the I data streams, and at the detectors following the B-type polarization transformers 956, 959, the data signals are mixed with carrier signals having a 90 degree phase shift, enabling detection of the Q data streams. The detectors 955, 956, 957, 958 also provide feedback in a manner such that at the outputs of the polarizers 951, 952, 953, 953, an equal fraction of optical power is distributed between the incoming data signals and incoming carrier signals.

Figure 26B:
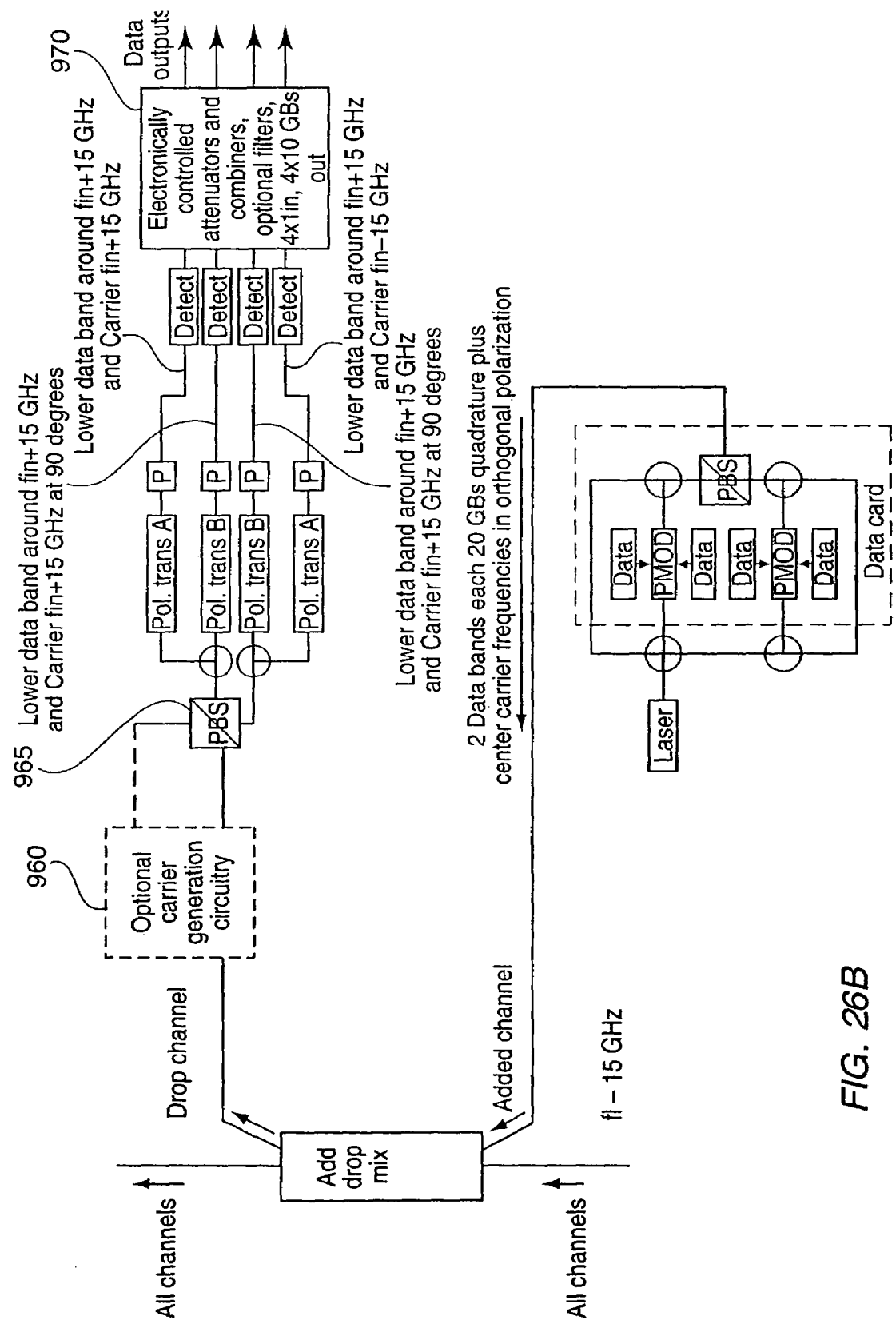
FIG. 26B shows an additional embodiment of the transmitter/receiver of FIG. 26A which includes additional means for phase noise, PMD, and chromatic dispersion compensation according to the present invention.

In a variant of the transmitter/receiver system of FIG. 26A shown in FIG. 26B, the polarization controllers at the input of receiver are replaced by carrier generation circuit 960 which can be a carrier boosting arrangement or a local laser as shown in the other embodiments. In this embodiment, the receiver input includes a polarization beam combiner/splitter 965 where the local carrier is combined with the received input signal. The polarization beam combiner/splitter 965 has upper and lower outputs. The upper output contains the portion of the input signal in x polarization (i.e., the data signal) and the portion of the carrier in y-polarization (the received carrier). The lower output contains the portion of the input signal in y-polarization (the received carrier). The polarization transformers and polarizers following the polarization beam combiner splitter 965 have the same function (90 degree hybrid combining) as in the embodiments of FIG. 26A and FIG. 26B. After detection, electronic circuitry 970 can be used to compensate for PMD or chromatic dispersion as discussed in the prior application Ser. No. 09/871,216.

Figure 27:
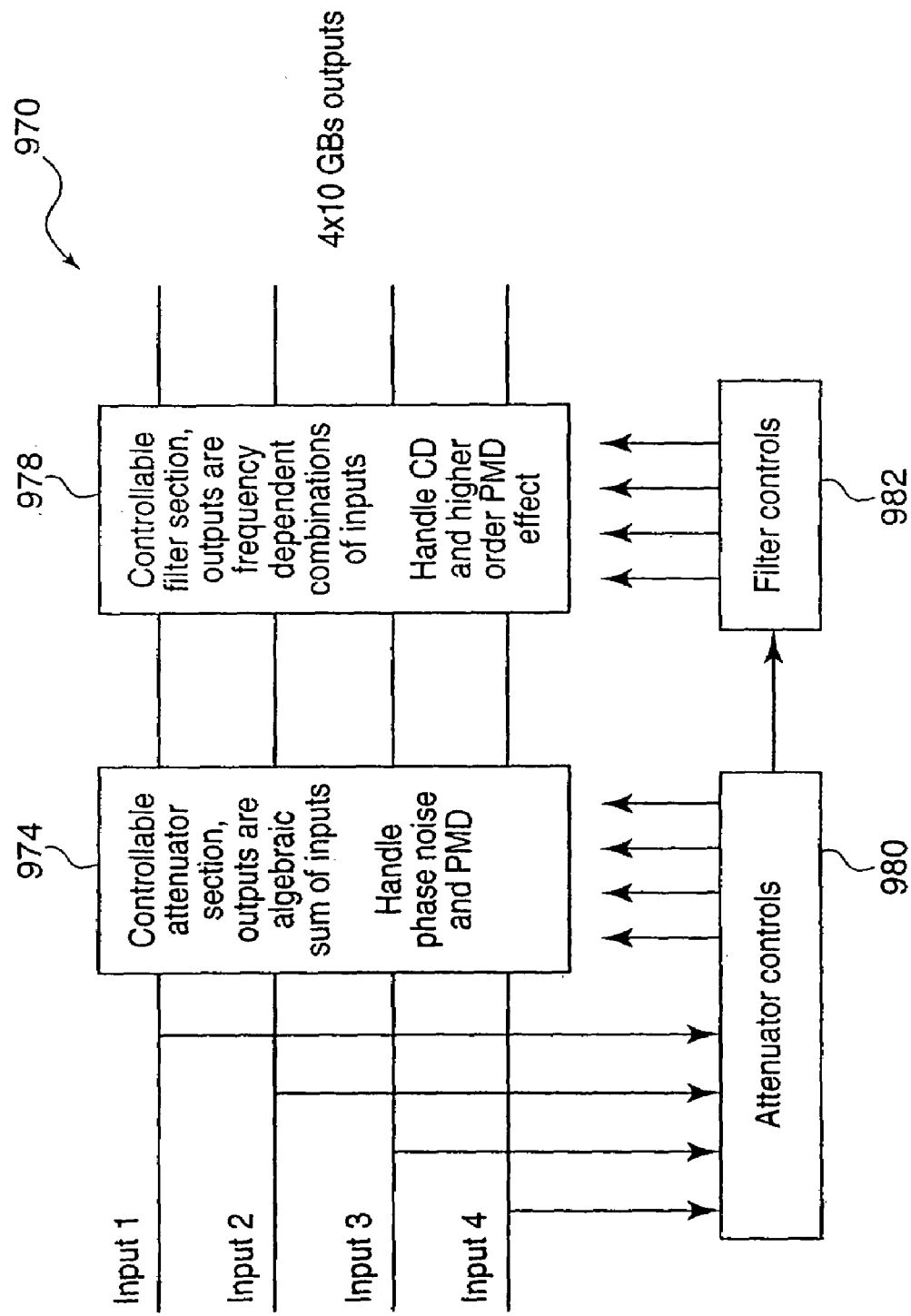
FIG. 27 shows a block diagram of the electronic circuitry used in FIG. 26B to compensate for phase noise, PMD, and chromatic dispersion-according to an embodiment of the present invention.

FIG. 27 shows an exemplary embodiment of the electronic circuitry 970 in greater detail. The electronic circuitry 970 receives inputs (Input 1, Input 2, Input 3, Input 4) from each of the detectors in the receiver. The electronic circuitry includes two stages: a first stage 974 which handles phase noise, first-order PMD and carrier phase; and a second stage 978 which handles frequency-dependent chromatic dispersion and higher-order PMD effects. As shown, each of the inputs from the detectors is to attenuator control circuitry 980 and also to the first stage 974. The attenuator control circuitry is used to control attenuators within the first stage circuitry 974 and also to adjust filter controls 982. At the first stage 974, the attenuators output algebraic sum signals from the input signals and compensate for phase noise and first-order PMD. Outputs from the first stage are delivered to the second stage 978 which includes controllable filters. Via the filter controls 982 the filters within the second stage are adjusted to compensate for higher-PMD and chromatic disperion effects.

Figure 28:
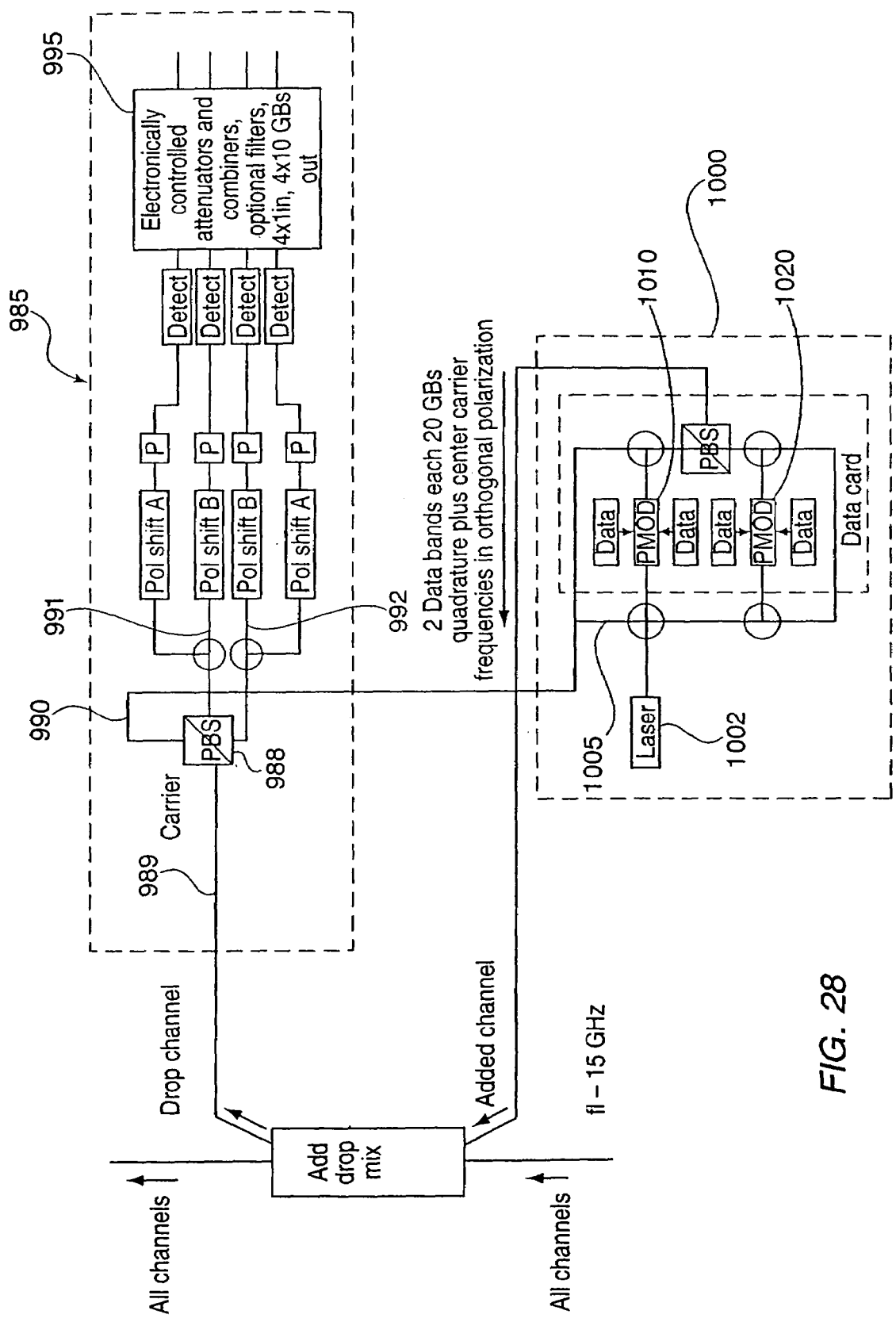
FIG. 28 shows an additional embodiment of the transmitter/receiver system of FIG. 26B in which a local oscillator is used to provide a carrier signal for quadrature detection according to the present invention.

FIG. 28 depicts a further embodiment of a transmitter/receiver system in which a laser carrier from a nearby transmitter having a frequency at approximately the center of a drop channel of an add/drop multiplexer is used to provide a carrier for quadrature detection. In the receiver 985 of this system, a polarization beam combiner/splitter 988 has two inputs and receives both the drop channel 989 and the transmitted carrier via a direct path 990. At the polarization beam combiner/splitter 988, as in the above-discussed embodiments, the combined signal is output into upper 991 and lower 992 branches. The upper branch output 991 includes the portion of the received signal from the drop channel 989 in x-polarization as well as the portion of the local laser carrier from path 990 in y-polarization. The lower branch output 992 includes the portion of the received signal from the drop channel 989 in y-polarization as well as the portion of the local laser carrier in x-polarization. The upper and lower outputs 991, 992 are split and fed to polarization transformers and polarizers in the same manner discussed above with respect to FIG. 26A and FIG. 26B.

After detection, I and Q data streams are input to electronic circuitry 995 that is used to compensate for PMD and chromatic dispersion in the electronic domain as discussed in FIG. 26B and FIG. 27. Furthermore, the electronic circuitry 995 can be used to detect the phase noise difference between the received carrier and the local carrier by detecting the low-frequency mixing product between the local laser carrier and the received carriers from the detectors. Since both carrier sources have a limited linewidth generally no greater than 1 MHz, the phase noise difference accordingly has a limited linewidth on the order of tens of MHz. The limited linewidth of the phase noise difference makes it possible to treat the phase noise difference as momentary rotations of the I,Q constellation and to thereby compensate for the momentary rotations by driving the electronic circuitry to counter-rotate with a bandwidth of magnitude comparable to the phase noise linewidth. Hence, in this embodiment, the phase noise difference and the optical frequency difference between the carriers can be readily cancelled in the electronic domain without additional optical means.

Figure 29A:
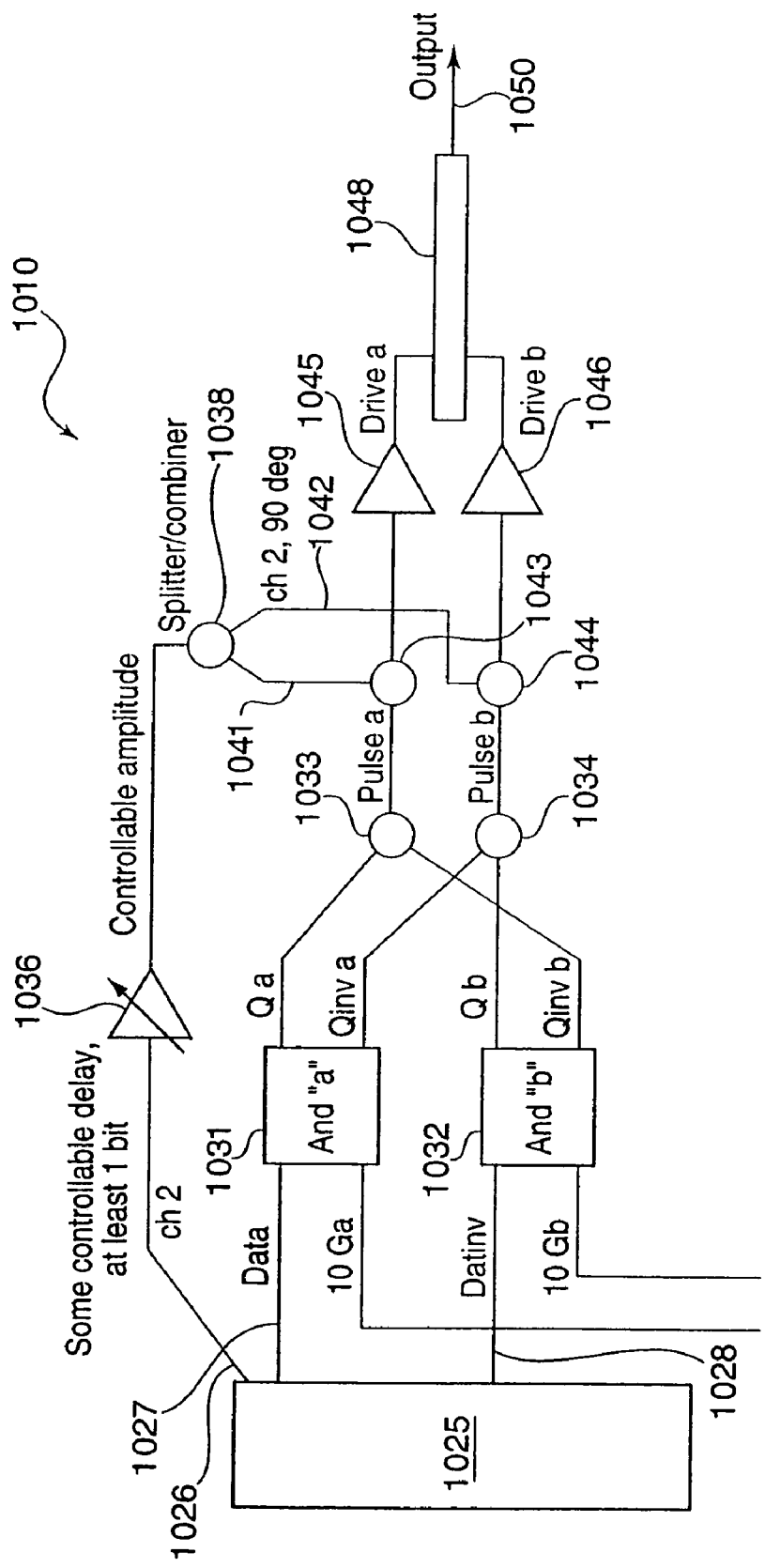
FIG. 29A is a block diagram of an embodiment of a quadrature data modulator in the transmitter/receiver system of FIG. 28 that generates a QRZ signal according to the present invention.

The transmitter 1000 of the system shown in FIG. 28 includes two quadrature data modulators 1010, 1020. The laser 1002 at the transmitter sends a local carrier signal that bypasses the modulators along path 1005. To prevent interference between the carrier signal and the data at the data modulators, a frequency band around the local carrier is cleared using a data modulation format in which low frequencies are eliminated. An embodiment of a data modulator 1010, 1020 that provides for low carrier/data interference in this manner is shown in FIG. 29A.

Figure 29B:
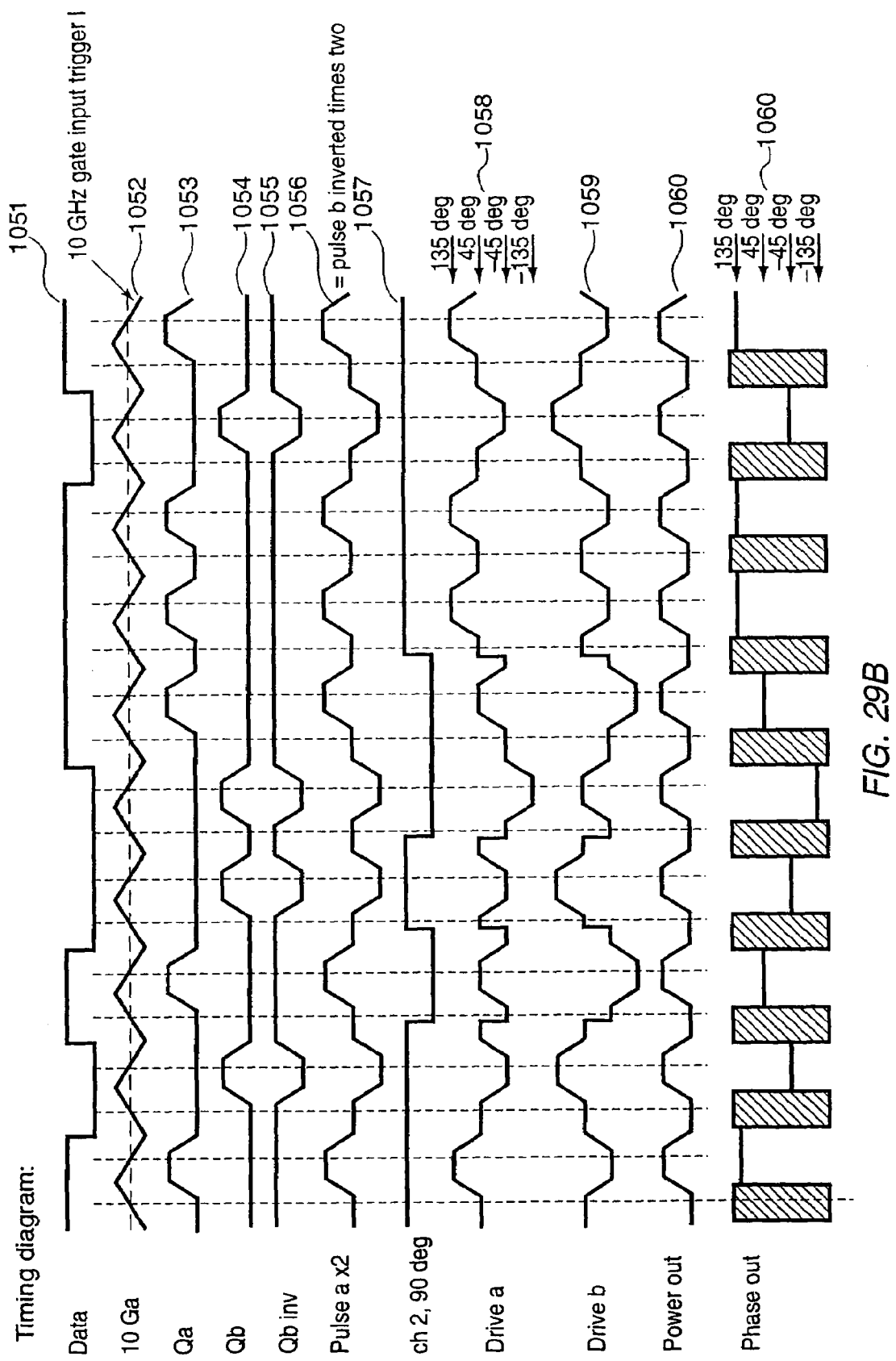
FIG. 29B shows an exemplary set of waveforms, or timing diagrams, of the variation of several outputs in the circuit of FIG. 29A over time according to the present invention.

As shown, a data generator 1025 has two data output lines 1026, 1027 and an inverse data output line 1028. An exemplary squarewave digital data waveform on the data output 1027 is shown at waveform 1051 of FIG. 29B. Both the data output on line 1027 and the inverse data output on line 1028 are fed to respective and gates 1031, 1032, which can be, for example, NLG 4119 gates by NEL. The AND gates 1031, 1032 also receive input from a 10 GHz clock wave shown schematically as waveform 1052 of FIG. 29B. AND gate 1031 has non-inverted output Qa (shown at waveform 1053) and inverted output Qinva, while AND gate 1032 has non-inverted output Qb (shown at waveform 1054) and inverted output Qbinv (shown at waveform 1055). Output Qa is combined with Qbinv at combiner 1033, yielding output "Pulse a", and output Qb is combined with Qainv at combiner 1034, yielding output "Pulse b." "Pulse a" is shown in waveform 1056. The data output line 1026 is sent via channel 2 (ch. 2) to an amplitude controller 1036 and then to a splitter/combiner 1038 where the data is split into a first output 1041 and a second output 1042, the second output being shifted 90 degrees with respect to the first output 1041. Output 1042 is shown at waveform 1057. "Pulse a" is then combined with the first output 1041 at combiner 1043 and "Pulse b" is combined with the second output 1042 at combiner 1044. The output of combiner 1043 is fed through an amplifier 1045, which outputs an amplified drive signal, "Drive a." Similarly, the output of combiner 1044 is fed to another amplifier 1046 which outputs an amplified drive signal, "Drive b." Signals "Drive a" and "Drive b" are shown at waveforms 1058 and 1059 of FIG. 29B, respectively. Signals "Drive a" and "Drive b" are then fed to inputs of a push/pull Mach-Zender type modulator 1048. In accordance with the operational principles of the push/pull modulator 1048, as is known in the art, both difference signals and common signals are generated. The difference signal between drive a and drive b determines the output power and the sign of the complex amplitude of the opto-electric field vector at the output 1050 of the modulator 1048, while the common (sum) signal determines an additional phase shift to the complex amplitude of the opto-electric field vector of the output. The waveform of the output power is shown at waveform 1060 and the waveform of the output phase is shown schematically at 1061. As can be discerned in waveforms 1060, 1061, the output from the modulator 1010 is a train of pulses of equal power, with each pulse having a phase that varies in steps of 90 degrees, i.e., a Quadrature-Return-to-Zero (QRZ) signal is generated by the modulator.

Reflective Modulator

Figure 15:
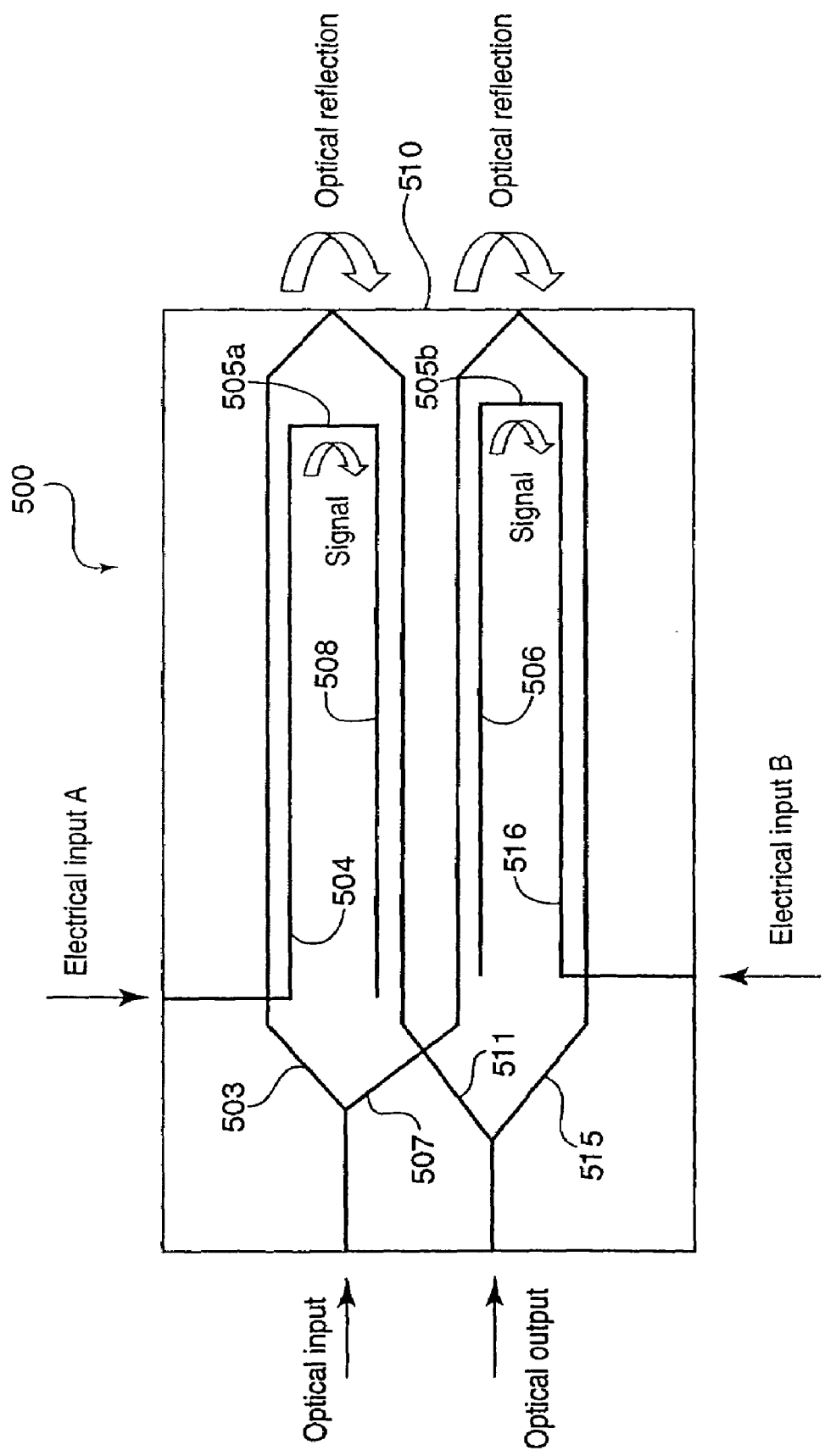
FIG. 15 is a schematic diagram of an embodiment of a reflective modulator according to the present invention.

FIG. 15 depicts an embodiment of a reflective modulator that can be used in place of the MZ modulators in the transmitter and receiver modules. The reflective modulator 500 shown has an optical input and optical output located on the same side in contrast to typical optical modulators which are transmissive devices with inputs and outputs located on opposite sides. The reflective modulator can be formed from a Lithium Niobate crystal, or other materials having similar electro-optic properties. An input signal fed in to the optical input is split into a first path 503 and a second path 507. Each of the paths may be formed by a waveguide, which may be made from In-diffused titanium, for example. A portion of optical path 503 runs substantially parallel to a traveling wave electrode 504 that is coupled to an electrical input A. The electrical impulses conducted by electrode 504 exert an electro-optic effect on the Lithium Niobate which alters the refractive index within the crystal, causing light traveling down path 503 to be modulated in sympathy with the electrical field in the electrode.

Since the velocity of the propagating light in path 503 is faster than that of the first electrical signal in electrode 504, a phase offset builds up along the parallel length along the propagation paths, which reduces the efficiency of modulation. Optical path 503 and electrode 504 end at reflective surfaces 510 and 505a respectively. The reflection occurs in the electrode path at 505a before the reflection in the optical path at 510, which lengthens the optical path with respect to the electrical path. The longer optical path provides a larger delay which realigns the timing of the optical and first electrical signals, allowing the reflected electrical signal in electrode 508 to interact effectively with the reflected light in optical path 511 propagating backwards toward the output. Thus, a double use of the first electrical signal is facilitated which doubles the modulation efficiency of the device 500. Furthermore, the device is folded and shorter in length than the typical transmissive modulator.

In a similar manner, a second optical path 507 runs substantially parallel to an electrode 506 that carries a second electrical signal from electrical input B. Both optical path 507 and electrode 506 end at respective reflective surface 510, 505b, with an optical delay built in to the optical path to allow for realignment of the optical and electrical signals. Input optical signals on path 507 cross signals on the output path 511. The optical signals are crossed towards the input and combined to form a combined quadrature output. Crossing is possible with almost no penalty in the optical domain. Thus, a short, cost effective and electrically effective phase modulator is created. The optical reflection at the end of the waveguide can optionally include other elements such as a directional element that allows light propagation in only one direction.

Multi-Wavelength Generator

In DWDM transmitter/receiver systems, which operate on several frequency channels simultaneously, Fabry-Perot (FP) filters are used because such filters have a repetitive frequency response with exact and predictable spacing between the response peaks. However, proper operation of the transmitter/receiver systems often requires that transmitter lasers be locked exactly to the "grid" of the repetitive FP response peaks. Generally, the FP's will be chosen such that the grid corresponds to the ITU grid. However, maintaining precise grid spacing can be difficult to achieve in practice.

Figure 30:
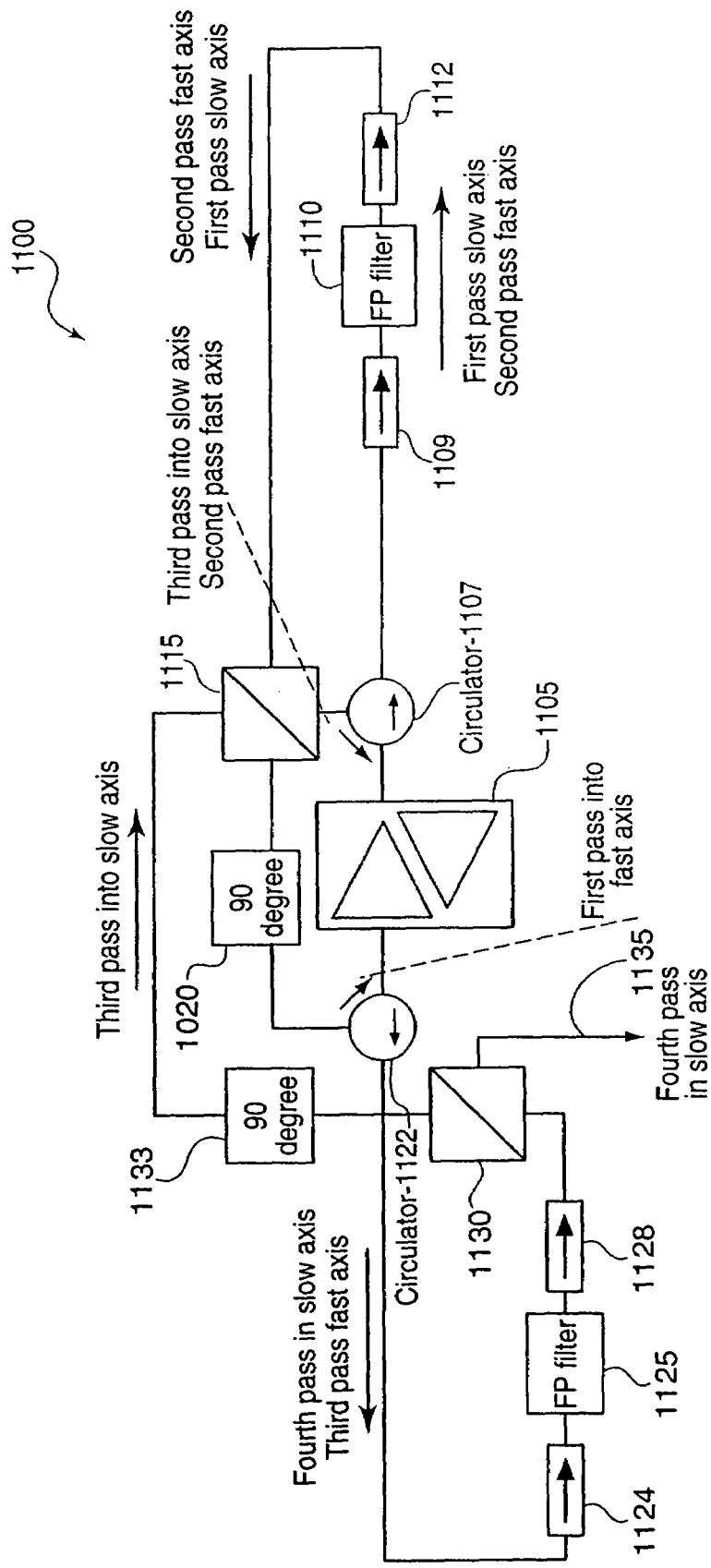
FIG. 30 is a block diagram of an embodiment of a multiwavelength generator according to the present invention.

FIG. 30 depicts a multiwavelength generator 1100 that generates precise grid-spaced frequencies from the natural amplified spontaneous emission of a bi-directional amplifier by passing a pilot signal several times through filtering stages and amplification stages. In FIG. 30, spontaneous noise generated at a bi-directional polarization preserving amplifier 1105, such as an EDFA, is passed via a circulator 1107, and an isolator 1109 to a first FP filter 1110. The noise is randomly polarized, and has orthogonal projections along both a slow polarization axis and a faster polarization axis. The FP filter 1110 passes the spontaneous emission of the amplifier 1105 that is aligned with the resonance frequencies of the FP filter. The output signal from the FP filter 1110 signal is then fed to a PBS 1115 via an isolator 1112. The PBS 1115 passes the slow polarization axis of the signal into a 90 degree polarization rotator 1120 and the fast polarization axis into the upper input of circulator 1107. The 90 degree polarization rotator 1120 output rotates the signal in the slow axis to the fast axis and then passes the fast-axis signal into circulator 1122 which delivers the signal back into the amplifier 1105 where it is again amplified. The amplifier 1105 output in the fast axis passes through the FP filter 1110 again and to the PBS 1115 which directs the re-amplified fast axis signal to the circulator 1107. The circulator 1107 passes the fast axis signal backwards through the amplifier 1105 into the circulator 1122 at the other side of the amplifier. At this point the signal has passed through the amplifier 1105 three times and the filter twice. The circulator 1122 passes the fast axis signal into a second. FP filter 1125 (via isolator 1124) which in turn passes the filtered signal via isolator 1128 into a second PBS 1130. The second PBS 1130 passes the fast axis to a 90 degree polarization rotator 1133 that creates a slow axis signal at its output. The 90 degree polarization rotator 1133 outputs the slow axis signal to another input of the first PBS 1115 that passes the slow axis signal to upper input of circulator 1107. The circulator 1107 redirects the slow axis signal backwards for another pass through the amplifer towards the second FP 1125. After the slow axis signal is filtered through the second FP 1125, the signal has been reamplified three times and filtered four times. The slow axis output from the second FP 1125 is then fed to the second PBS 1130 which directs the slow axis signal to the output 1135. In the embodiment described the spontaneous emission from the amplifier 1105 has made four passes through FP filter and has been reamplified three times. The successive amplification stage yield a very high gain (up to between 80 and 120 dB), which provides a clean filtered output spectrum with perfect frequency spacing. Thus, the need for transmitter lasers exactly locked to a grid is eliminated.

What is claimed is:

1. A method of QRZ data modulation comprising the steps of
    clocking a first data signal and an inverted data signal using gates;
    outputting non-inverted and inverted versions of both the clocked data signal and the clocked inverted data signal;
    combining the output signals into a combined signal;
    inputting the combined signal to a first modulator operated in push pull mode; and
    inputting a second data signal to a second modulator, the second data signal having first and second portions, the second portion shifted 90 degrees in phase with respect to the first portion.

2. The method of claim 1, wherein the first and second modulators are combined in a single modulator having a dual drive input, the method further including the steps of:
    providing the combined signal in differential mode; and
    providing the second data signal in common mode.

* * * * *